United States Patent
Said et al.

(10) Patent No.: US 12,556,707 B2
(45) Date of Patent: Feb. 17, 2026

(54) COMPRESSION OF BITSTREAM INDEXES FOR WIDE SCALE PARALLEL ENTROPY CODING IN NEURAL-BASED VIDEO CODECS

(71) Applicant: QUALCOMM Incorporated, San Diego, CA (US)

(72) Inventors: Amir Said, San Diego, CA (US); Hoang Cong Minh Le, Santee, CA (US); Farzad Farhadzadeh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 18/608,802

(22) Filed: Mar. 18, 2024

(65) Prior Publication Data

US 2024/0364890 A1    Oct. 31, 2024

Related U.S. Application Data

(60) Provisional application No. 63/496,930, filed on Apr. 18, 2023.

(51) Int. Cl.
| | |
|---|---|
| *H04N 19/13* | (2014.01) |
| *H04N 19/146* | (2014.01) |
| *H04N 19/167* | (2014.01) |
| *H04N 19/184* | (2014.01) |
| *H04N 19/91* | (2014.01) |

(52) U.S. Cl.
CPC ........... *H04N 19/13* (2014.11); *H04N 19/146* (2014.11); *H04N 19/167* (2014.11); *H04N 19/184* (2014.11); *H04N 19/91* (2014.11)

(58) Field of Classification Search
CPC ............................ H04N 19/13; H04N 19/146
USPC ......................................................... 375/240
See application file for complete search history.

(56) References Cited

U.S. PATENT DOCUMENTS

| 11,375,242 B1 | 6/2022 | Said |
| 2011/0248872 A1 | 10/2011 | Korodi et al. |

OTHER PUBLICATIONS

International Search Report and Written Opinion—PCT/US2024/020599—ISA/EPO—Jun. 20, 2024.
Lindstrom P., "Universal Coding of the Reals Using Bisection", 20190313 - 20190314, Mar. 13, 2019, XP058435002, 10 pages, abstract, section 2.

*Primary Examiner* — Justin W Rider
(74) *Attorney, Agent, or Firm* — Polsinelli

(57) ABSTRACT

Systems and techniques are described herein for processing video data. For example, an encoding device can obtain a sequence of video data and determine a minimum value in the sequence of video data. The encoding device can, based on the minimum value, identify positions in the sequence of video data associated with entry points for individually entropy codable parcels of a parallel entropy codable sequence of video data. The encoding device can generate the parallel entropy codable sequence of video data. The encoding device can further generate an index for the parallel entropy codable sequence of video data, the index identifying the individually entropy codable parcels within the parallel entropy codable sequence of video data.

29 Claims, 25 Drawing Sheets

1450

Obtain A Stream Of Encoded Video Data Including An Index And A Parallel Entropy Codable Sequence Of Video Data, The Parallel Entropy Codable Sequence Of Video Data Including Individually Entropy Codable Parcels Identifiable Using The Index
1452

Decode The Index For Data Associated With The Individually Entropy Codable Parcels
1454

Identify The Individually Entropy Codable Parcels From The Stream Of Encoded Video Data Using The Data From The Index And A Minimum Value Associated With The Parallel Entropy Codable Sequence Of Video Data
1456

Decode The Individually Entropy Codable Parcels From The Stream Of Encoded Video Data In Parallel Using The Data As Decoded From The Index
1458

FIG. 14B

COMPRESSION OF BITSTREAM INDEXES FOR WIDE SCALE PARALLEL ENTROPY CODING IN NEURAL-BASED VIDEO CODECS

CROSS-REFERENCE TO RELATED APPLICATIONS

This application claims priority to U.S. Provisional Patent Application No. 63/496,930, filed Apr. 18, 2023, which is hereby incorporated by reference, in its entirety and for all purposes.

FIELD OF THE DISCLOSURE

The present disclosure generally relates to image and video coding, including encoding (or compression) and decoding (decompression) (referred to herein collectively as "coding") of images and/or video. For example, aspects of the present disclosure relate to systems and techniques for providing improved compression of bitstream indexes for wide scale parallel entropy coding (e.g., in machine learning-based video coder-decoders, or codecs, such as neural network-based video codecs).

BACKGROUND

Many devices and systems allow video data to be processed and output for consumption. Digital video data includes large amounts of data to meet the demands of consumers and video providers. For example, consumers of video data desire high quality video, including high fidelity, resolutions, frame rates, and the like. As a result, the large amount of video data that is required to meet these demands places a burden on communication networks and devices that process and store the video data.

Video coding techniques may be used to compress video data. A goal of video coding is to compress video data into a form that uses a lower bit rate, while avoiding or minimizing degradations to video quality. With ever-evolving video services becoming available, encoding techniques with better coding efficiency are needed.

SUMMARY

Systems and techniques are described for coding (e.g., encoding and/or decoding) image and/or video content. In one illustrative example, an apparatus for encoding video data is provided that includes at least one memory configured to store video data and at least one processor (e.g., implemented in circuitry) coupled to the at least one memory. The at least one processor is configured to: obtain a sequence of video data; determine a minimum value in the sequence of video data; based on the minimum value, identify positions in the sequence of video data associated with entry points for individually entropy codable parcels of a parallel entropy codable sequence of video data; generate the parallel entropy codable sequence of video data; and generate an index for the parallel entropy codable sequence of video data, the index identifying the individually entropy codable parcels within the parallel entropy codable sequence of video data.

In another example, a method of encoding video data is provided. The method includes: obtaining a sequence of video data; determining a minimum value in the sequence of video data; based on the minimum value, identifying positions in the sequence of video data associated with entry points for individually entropy codable parcels of a parallel entropy codable sequence of video data; generating the parallel entropy codable sequence of video data; and generating an index for the parallel entropy codable sequence of video data, the index identifying the individually entropy codable parcels within the parallel entropy codable sequence of video data.

In another example, a non-transitory computer-readable medium is provided, which has stored thereon instructions that, when executed by one or more processors, cause the one or more processors to: obtain a sequence of video data; determine a minimum value in the sequence of video data; based on the minimum value, identify positions in the sequence of video data associated with entry points for individually entropy codable parcels of a parallel entropy codable sequence of video data; generate the parallel entropy codable sequence of video data; and generate an index for the parallel entropy codable sequence of video data, the index identifying the individually entropy codable parcels within the parallel entropy codable sequence of video data.

In another example, an apparatus for processing video data is provided. The apparatus includes: means for obtaining a sequence of video data; means for determining a minimum value in the sequence of video data; means for based on the minimum value, identifying positions in the sequence of video data associated with entry points for individually entropy codable parcels of a parallel entropy codable sequence of video data; means for generating the parallel entropy codable sequence of video data; and means for generating an index for the parallel entropy codable sequence of video data, the index identifying the individually entropy codable parcels within the parallel entropy codable sequence of video data.

In another illustrative example, an apparatus for decoding video data is provided. The apparatus includes at least one memory and at least one processor coupled to the at least one memory and configured to: obtain a stream of encoded video data including an index and a parallel entropy codable sequence of video data, the parallel entropy codable sequence of video data including individually entropy codable parcels identifiable using the index; decode the index for data associated with the individually entropy codable parcels; identify the individually entropy codable parcels from the stream of encoded video data using the data from the index and a minimum value associated with the parallel entropy codable sequence of video data; and decode the individually entropy codable parcels from the stream of encoded video data in parallel using the data as decoded from the index.

In another illustrative example, a method of decoding video data is provided. The method includes: obtaining a stream of encoded video data including an index and a parallel entropy codable sequence of video data, the parallel entropy codable sequence of video data including individually entropy codable parcels identifiable using the index; decoding the index for data associated with the individually entropy codable parcels; identifying the individually entropy codable parcels from the stream of encoded video data using the data from the index and a minimum value associated with the parallel entropy codable sequence of video data; and decoding the individually entropy codable parcels from the stream of encoded video data in parallel using the data as decoded from the index.

In another illustrative example, a computer-readable storage medium is provided that stores instructions which, when executed, cause one or more processors to: obtain a stream of encoded video data including an index and a parallel entropy codable sequence of video data, the parallel entropy codable sequence of video data including individually entropy codable parcels identifiable using the index; decode the index for data associated with the individually entropy codable parcels; identify the individually entropy codable parcels from the stream of encoded video data using the data from the index and a minimum value associated with the parallel entropy codable sequence of video data; and decode the individually entropy codable parcels from the stream of encoded video data in parallel using the data as decoded from the index.

In another illustrative example, an apparatus for decoding video data is provided, the apparatus includes: means for obtaining a stream of encoded video data including an index and a parallel entropy codable sequence of video data, the parallel entropy codable sequence of video data including individually entropy codable parcels identifiable using the index; means for decoding the index for data associated with the individually entropy codable parcels; means for identifying the individually entropy codable parcels from the stream of encoded video data using the data from the index and a minimum value associated with the parallel entropy codable sequence of video data; and means for decoding the individually entropy codable parcels from the stream of encoded video data in parallel using the data as decoded from the index.

In some aspects, one or more of the apparatuses described herein is, is part of, or includes a mobile device (e.g., a mobile telephone or so-called "smart phone", a tablet computer, or other type of mobile device), a wearable device, an extended reality (XR) device (e.g., a virtual reality (VR) device, an augmented reality (AR) device, or a mixed reality (MR) device), a vehicle (or a computing device of a vehicle), a personal computer, a laptop computer, a video server, a television (e.g., a network-connected television), or other device. In some aspects, the apparatus(es) can include at least one camera for capturing one or more images or video frames. For example, the apparatus(es) can include a camera (e.g., a red-green-blue (RGB) camera) or multiple cameras for capturing one or more images and/or one or more videos including video frames. In some aspects, the apparatus(es) can include a display for displaying one or more images, videos, notifications, or other displayable data. In some aspects, the apparatus(es) can include at least one transmitter (or at least one transceiver) configured to transmit one or more video frame and/or syntax data over a transmission medium to at least one device. In some aspects, the at least one processor of the apparatus noted above includes a neural processing unit (NPU), a neural signal processor (NSP), a central processing unit (CPU), a digital signal processor (DSP), a graphics processing unit (GPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures:

FIG. 14B is a flowchart illustrating another example of a process for processing video data, in accordance with some examples;

DETAILED DESCRIPTION

Figure 1:
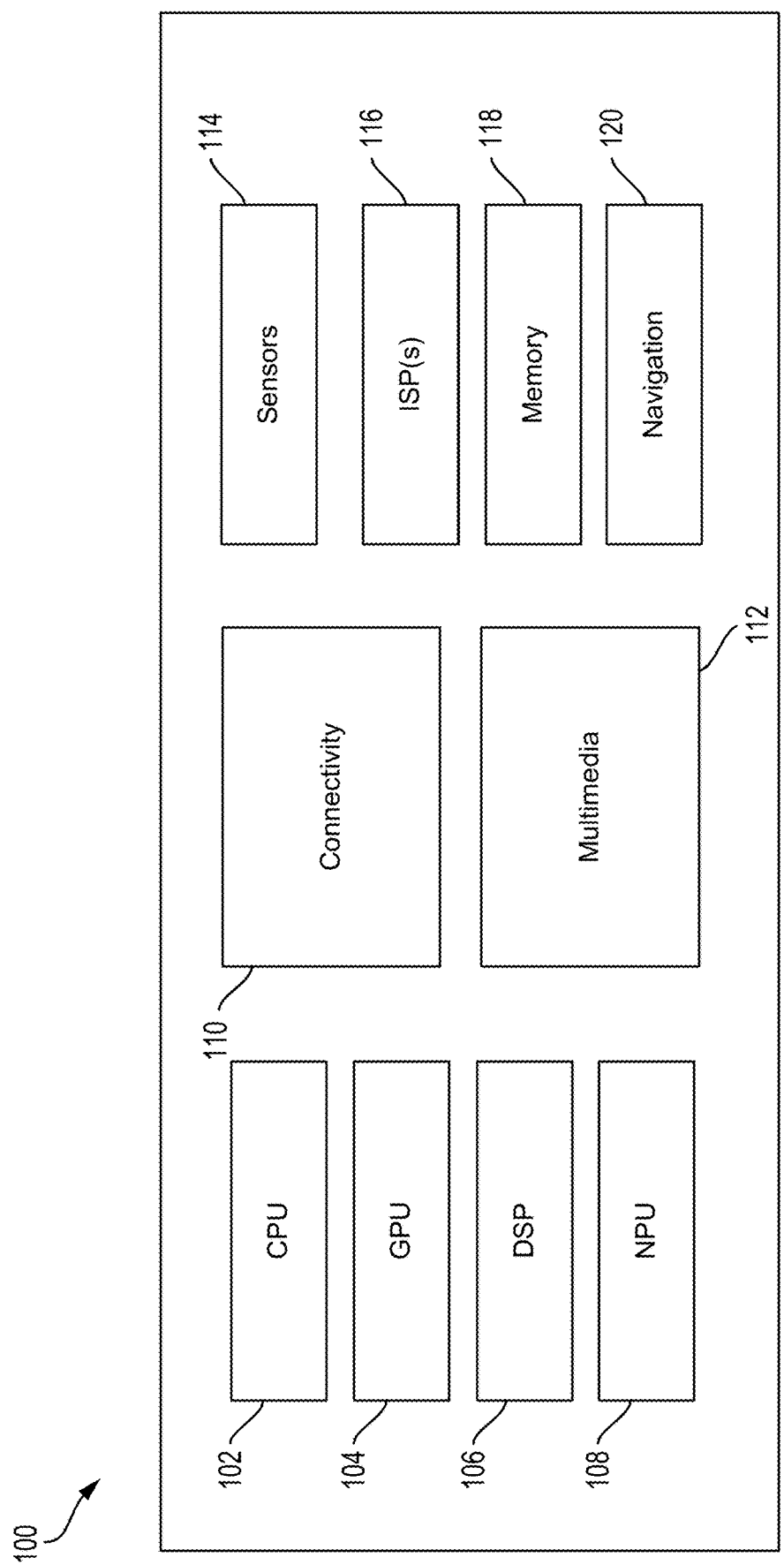
FIG. 1 illustrates an example implementation of a system-on-a-chip (SOC), in accordance with some aspects.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

Digital video data can include large amounts of data, particularly as the demand for high quality video data continues to grow. For example, consumers of video data typically desire video of increasingly high quality, with high fidelity, resolution, frame rates, and the like. However, the large amount of video data required to meet such demands can place a significant burden on communication networks as well as on devices that process and store the video data.

Various techniques can be used to code video data. Video coding can be performed according to a particular video coding Standard or can be performed using one or more machine learning systems or algorithms. Example video coding Standards include versatile video coding (VVC), high-efficiency video coding (HEVC), advanced video coding (AVC), moving picture experts group (MPEG) coding (e.g., MPEG-5 Essential Video Coding (EVC) or other MPEG-based coding), AOMedia Video 1 (AV1), among others. Video coding often uses prediction methods such as inter-prediction or intra-prediction, which take advantage of redundancies present in video images or sequences. A common goal of video coding techniques is to compress video data into a form that uses a lower bit rate, while avoiding or minimizing degradations in the video quality. As the demand for video services grows and new video services become available, coding techniques with better coding efficiency, performance, and rate control are needed.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data, and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, and/or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill). Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction can be determined as the difference between the pixel values in the block being encoded and the predicted block. The prediction error can also be referred to as the residual. The video encoder may also apply a transform to the prediction error using transform coding (e.g., using a form of a discrete cosine transform (DCT), a form of a discrete sine transform (DST), or other suitable transform) to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy code syntax elements, thereby further reducing the number of bits needed for their representation.

A video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

Arithmetic coding is used by many video compression Standards, including VVC, HEVC, VP9, and AV1. Such wide use is due, at least in part, to arithmetic coding enabling powerful data modeling and yielding compression that is very close to theoretical limits. One problem with using arithmetic coding for video coding/compression is that, as video resolutions and frame rates continue to increase, sequential coding creates a throughput bottleneck that can increase costs to a point reaching the limits of current hardware. One solution to offset such a problem is to employ parallelization by, for example, dividing the bitstream into independent data blocks that can be processed concurrently. Further, new coding (encoding and decoding) methods based on machine learning techniques (e.g., using neural networks or other machine learning tools) are being developed to satisfy coding requirements. Such machine learning techniques can also employ arithmetic coding and/or parallelization. While dividing the bitstream into data blocks enables concurrent processing of the data, it can severely degrade compression. For example, when arithmetic coding is terminated, extra bits are needed to guarantee correct decoding and in some cases for padding to the next byte boundary.

As described in more detail below, systems, apparatuses, methods (also referred to as processes), and computer-readable media (collectively referred to as "systems and techniques") are described herein for providing improved compression of bitstream indexes for wide scale parallel entropy coding, such as in machine learning-based video coder-decoders, also referred to as "codecs" (e.g., neural network-based video codecs). The systems and techniques described herein can significantly reduce the above-noted overhead and resulting compression loss.

Various aspects of the present disclosure will be described with respect to the figures. FIG. 1 illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the CPU 102 may comprise code to search for a stored multiplication result in a lookup table (LUT) corresponding to a multiplication product of an input value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input value and the filter weight when a lookup table miss of the multiplication product is detected.

SOC 100 and/or components thereof may be configured to perform video compression and/or decompression (also referred to as video encoding and/or decoding, collectively referred to as video coding) using Standards-based video coding and/or using machine learning techniques. Examples of Standards-based and machine learning-based video coding systems are described with respect to FIG. 2 and FIG. 3.

Figure 2:
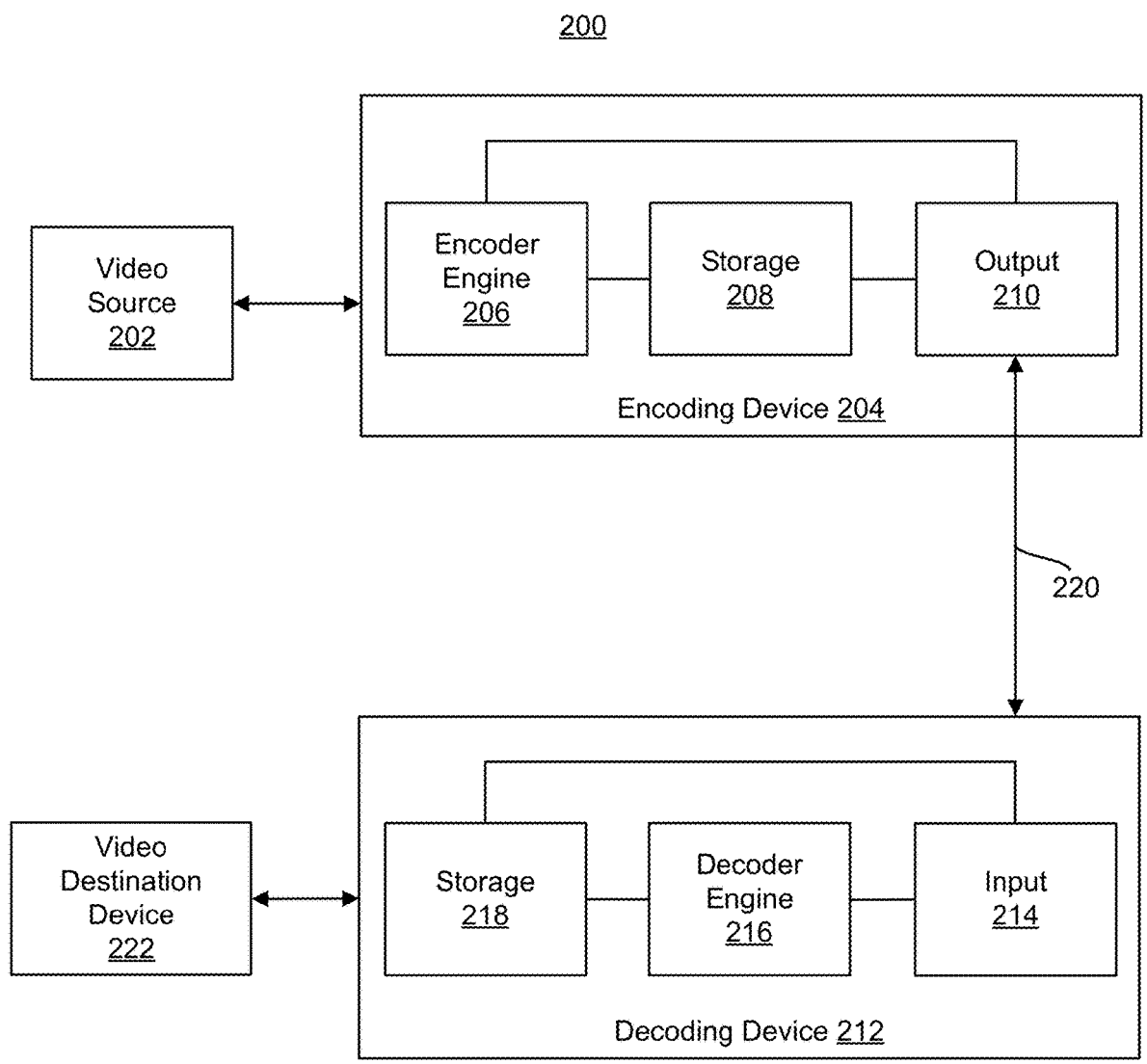
FIG. 2 is a block diagram illustrating an encoding device and a decoding device, in accordance with some aspects.

FIG. 2 is a block diagram illustrating an example of a system 200 including an encoding device 204 and a decoding device 212 that can respectively encode and decode video data accordance with examples described herein. In some examples, the encoding device 204 and/or the decoding device 212 can include the SOC 100 of FIG. 1. The encoding device 204 may be part of a source device, and the decoding device 212 may be part of a receiving device (also referred to as a client device). In some examples, the source device can also include a decoding device similar to the decoding device 212. In some examples, the receiving device can also include an encoding device similar to the encoding device 204. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, an Internet Protocol (IP) camera, a server device in a server system including one or more server devices (e.g., a video streaming server system, or other suitable server system), a head-mounted display (HMD), a heads-up display (HUD), smart glasses (e.g., virtual reality (VR) glasses, augmented reality (AR) glasses, or other smart glasses), or any other suitable electronic device.

The components of the system 200 can include and/or can be implemented using electronic circuits or other electronic hardware, which can include the SOC 100 and/or one or more programmable electronic circuits (e.g., microprocessors, graphics processing units (GPUs), digital signal processors (DSPs), central processing units (CPUs), neural processing units (NPUs), and/or other suitable electronic circuits), and/or can include and/or be implemented using computer software, firmware, or any combination thereof, to perform the various operations described herein.

While the system 200 is shown to include certain components, one of ordinary skill will appreciate that the system 200 can include more or fewer components than those shown in FIG. 2. For example, the system 200 can also include, in some instances, one or more memory devices other than the storage 208 and the storage 218 (e.g., one or more random access memory (RAM) components, read-only memory (ROM) components, cache memory components, buffer components, database components, and/or other memory devices), one or more processing devices (e.g., one or more CPUs, GPUs, NPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 2.

The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 200 can support one-way or two-way video transmission to support applications such as video conferencing, video streaming, video playback, video broadcasting, gaming, and/or video telephony.

In some examples, the encoding device 204 (or encoder) can be used to encode video data using a video coding Standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, High Efficiency Video Coding (HEVC) or ITU-T H.265, Versatile Video Coding (VVC) or ITU-T H.266, and/or other video coding Standards. One or more of the video coding Standards have extensions associated with other aspects of video coding. For instance, various extensions to HEVC deal with multi-layer video coding, including the range and screen content coding extensions, 3D video coding (3D-HEVC) and multiview extensions (MV-HEVC) and scalable extension (SHVC).

Many aspects described herein can be performed using video codecs such as VVC, HEVC, AVC, and/or extensions thereof. However, the techniques and systems described herein may also be applicable to other coding standards, such as MPEG, JPEG (or other coding standard for still images), VP9, AV1, extensions thereof, or other suitable coding standards already available or not yet available or developed, such as the machine learning based video coding described below. Accordingly, while the techniques and systems described herein may be described with reference to a particular video coding standard, one of ordinary skill in the art will appreciate that the description should not be interpreted to apply only to that particular standard.

Referring to FIG. 2, a video source 202 may provide the video data to the encoding device 204. The video source 202 may be part of the source device, or may be part of a device other than the source device. The video source 202 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 202 may include one or more input pictures. Pictures may also be referred to as "frames." A picture or frame is a still image that, in some cases, is part of a video. In some examples, data from the video source 202 can be a still image that is not a part of a video. In HEVC, VVC, and other video coding specifications, a video sequence can include a series of pictures. A picture may include three sample arrays, denoted $S_L$, $S_{Cb}$, and $S_{Cr}$. $S_L$ is a two-dimensional array of luma samples, $S_{Cb}$ is a two-dimensional array of Cb chrominance samples, and $S_{Cr}$ is a two-dimensional array of Cr chrominance samples. Chrominance samples may also be referred to herein as "chroma" samples. In other instances, a picture may be monochrome and may only include an array of luma samples.

The encoder engine 206 (or encoder) of the encoding device 204 encodes the video data to generate an encoded video bitstream. In some examples, an encoded video bitstream (or "video bitstream" or "bitstream") is a series of one or more coded video sequences. According to HEVC, a coded video sequence (CVS) includes a series of access units (AUs) starting with an AU that has a random access point picture in the base layer and with certain properties (e.g., a RASL flag (e.g., NoRaslOutputFlag) equal to 1) up to and not including a next AU that has a random access point picture in the base layer and with certain properties. An AU includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. VCL NAL units include coded picture data forming a coded video bitstream. For example, a sequence of bits forming the coded video bitstream is present in VCL NAL units. A VCL NAL unit can include one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). In some cases, each slice or other portion of a bitstream can reference a single active PPS, SPS, and/or VPS to allow the decoding device 212 to access information that may be used for decoding the slice or other portion of the bitstream.

NAL units may contain a sequence of bits forming a coded representation of the video data (e.g., an encoded video bitstream, a CVS of a bitstream, or the like), such as coded representations of pictures in a video. The encoder engine 206 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

In HEVC, the slices are partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some aspects, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to HEVC, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may be quantized by the encoder engine 206.

Once the pictures of the video data are partitioned into CUs, the encoder engine 206 predicts each PU using a prediction mode. The prediction unit or prediction block is subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

As noted above, in some cases the encoder engine 206 and decoder engine 216 (described in more detail below) may be configured to operate according to VVC. According to VVC, a video coder (such as encoder engine 206 and/or decoder engine 216) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning per HEVC, QTBT partitioning, MTT partitioning, or other partitioning structures. For illustrative purposes, the description herein may refer to QTBT partitioning. However, it should be understood that the techniques of the disclosure may also be applied to video coders configured to use quadtree partitioning, or other types of partitioning as well.

As noted above, intra-picture prediction utilizes the correlation between spatially neighboring samples within a picture. There are a plurality of intra-prediction modes (also referred to as "intra modes"). In some examples, the intra prediction of a luma block includes 35 modes, including the Planar mode, DC mode, and 33 angular modes (e.g., diagonal intra prediction modes and angular modes adjacent to the diagonal intra prediction modes). The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 1

Specification of intra prediction mode and associated names

| Intra-prediction mode | Associated name |
|---|---|
| 0 | INTRA_PLANAR |
| 1 | INTRA_DC |
| 2 ... 34 | INTRA_ANGULAR2 ... INTRA_ANGULAR34 |

Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction, two sets of motion parameters ($\Delta x_0$, $y_0$, refIdx$_0$ and $\Delta x_1$, $y_1$, refIdx$_1$) are used to generate two motion compensated predictions (from the same reference picture or possibly from different reference pictures). For example, with bi-prediction, each prediction block uses two motion compensated prediction signals, and generates B prediction units. The two motion compensated predictions are combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction, one set of motion parameters ($\Delta x_0$, $y_0$, refIdx$_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

After performing prediction using intra- and/or inter-prediction, the encoding device 204 can perform transformation and quantization. For example, following prediction, the encoder engine 206 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., using inter-prediction or intra-prediction), the encoder engine 206 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform (DCT), discrete sine transform (DST), an integer transform, a wavelet transform, other suitable transform function, or any combination thereof. In some cases, one or more block transforms (e.g., a kernel of size 32×32, 16×16, 8×8, 4×4, or other suitable size) may be applied to residual data in each CU. In some examples, a TU may be used for the transform and quantization processes implemented by the encoder engine 206. A given CU having one or more PUs may also include one or more TUs. As described in further detail below, the residual values may be transformed into transform coefficients using the block transforms, and may be quantized and scanned using TUs to produce serialized transform coefficients for entropy coding.

In some aspects following intra-predictive or inter-predictive coding using PUs of a CU, the encoder engine 206 may calculate residual data for the TUs of the CU. The PUs may comprise pixel data in the spatial domain (or pixel domain). As previously noted, the residual data may correspond to pixel difference values between pixels of the unencoded picture and prediction values corresponding to the PUs. The encoder engine 206 may form one or more TUs including the residual data for a CU (which includes the PUs), and may transform the TUs to produce transform coefficients for the CU. The TUs may comprise coefficients in the transform domain following application of a block transform.

The encoder engine 206 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may be entropy encoded by the encoder engine 206. In some examples, the encoder engine 206 may utilize a predefined scan order to scan the quantized transform coefficients to produce a serialized vector that can be entropy encoded. In some examples, encoder engine 206 may perform an adaptive scan. After scanning the quantized transform coefficients to form a vector (e.g., a one-dimensional vector), the encoder engine 206 may entropy encode the vector. For example, the encoder engine 206 may use context adaptive variable length coding, context adaptive binary arithmetic coding, syntax-based context-adaptive binary arithmetic coding, probability interval partitioning entropy coding, or another suitable entropy encoding technique.

The output 210 of the encoding device 204 may send the NAL units making up the encoded video bitstream data over the communications link 220 to the decoding device 212 of the receiving device. The input 214 of the decoding device 212 may receive the NAL units. The communications link 220 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 204 may store encoded video bitstream data in storage 208. The output 210 may retrieve the encoded video bitstream data from the encoder engine 206 or from the storage 208. Storage 208 may include any of a variety of distributed or locally accessed data storage media. For example, the storage 208 may include a hard drive, a storage disc, flash memory, volatile or non-volatile memory, or any other suitable digital storage media for storing encoded video data. The storage 208 can also include a decoded picture buffer (DPB) for storing reference pictures for use in inter-prediction. In a further example, the storage 208 can correspond to a file server or another intermediate storage device that may store the encoded video generated by the source device. In such cases, the receiving device including the decoding device 212 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection. The access may include a wireless channel (e.g., a Wi-Fi connection), a wired connection (e.g., DSL, cable modem, etc.), or a combination of both that is suitable for accessing encoded video data stored on a file server. The transmission of encoded video data from the storage 208 may be a streaming transmission, a download transmission, or a combination thereof.

The input 214 of the decoding device 212 receives the encoded video bitstream data and may provide the video bitstream data to the decoder engine 216, or to storage 218 for later use by the decoder engine 216. For example, the storage 218 can include a DPB for storing reference pictures for use in inter-prediction. The receiving device including the decoding device 212 can receive the encoded video data to be decoded via the storage 208. The encoded video data may be modulated according to a communication standard, such as a wireless communication protocol, and transmitted to the receiving device. The communication medium for transmitted the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 216 may decode the encoded video bitstream data by entropy decoding (e.g., using an entropy decoder) and extracting the elements of one or more coded video sequences making up the encoded video data. The decoder engine 216 may rescale and perform an inverse transform on the encoded video bitstream data. Residual data is passed to a prediction stage of the decoder engine 216. The decoder engine 216 predicts a block of pixels (e.g., a PU). In some examples, the prediction is added to the output of the inverse transform (the residual data).

The video decoding device 212 may output the decoded video to a video destination device 222, which may include a display or other output device for displaying the decoded video data to a consumer of the content. In some aspects, the video destination device 222 may be part of the receiving device that includes the decoding device 212. In some aspects, the video destination device 222 may be part of a separate device other than the receiving device.

In some aspects, the video encoding device 204 and/or the video decoding device 212 may be integrated with an audio encoding device and audio decoding device, respectively. The video encoding device 204 and/or the video decoding device 212 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 204 and the video decoding device 212 may be integrated as part of a combined encoder/decoder (codec) in a respective device.

The example system shown in FIG. 2 is one illustrative example that can be used herein. Techniques for processing video data using the techniques described herein can be performed by any digital video encoding and/or decoding device. Although generally the techniques of the disclosure are performed by a video encoding device or a video decoding device, the techniques may also be performed by a combined video encoder-decoder, typically referred to as a "CODEC." Moreover, the techniques of the disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

As noted above, in some examples, the SOC 100 and/or components thereof may be configured to perform video compression and/or decompression (also referred to as video encoding and/or decoding, collectively referred to as video coding) using machine learning techniques. For instance, the encoding device 204 (or encoder) can be used to encode video data using a machine learning system with a deep learning architecture (e.g., by utilizing the NPU 108 of the SOC 100 of FIG. 1). In some cases, using deep learning architectures to perform video compression and/or decompression can increase the efficiency of video compression and/or decompression on a device. For example, the encoding device 204 can use a machine learning based video coding technique to compress video more efficiently, can transmit the compressed video to the decoding device 212, and the decoding device 212 can decompress the compressed video using the machine learning based techniques.

A neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input. The connections between layers of a neural network may be fully connected or locally connected. Various examples of neural network architectures are described below with respect to FIG. 15A-FIG. 16.

Figure 3:
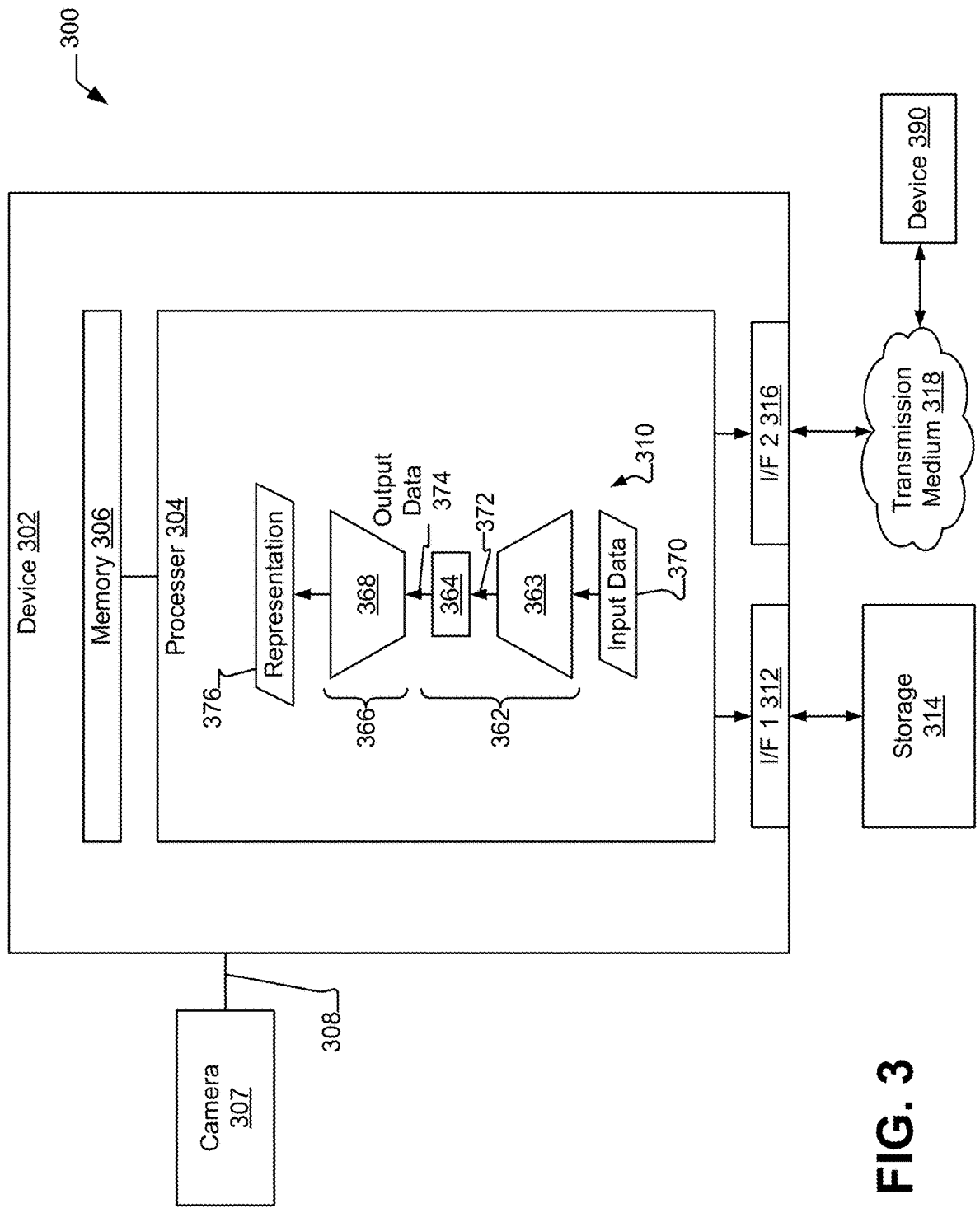
FIG. 3 is a diagram illustrating an example of a system including a device operable to perform image and/or video coding (encoding and decoding) using a neural network-based system, in accordance with some aspects.

FIG. 3 depicts a system 300 that includes a device 302 configured to perform video encoding and decoding using a machine learning coding system 310. The device 302 is coupled to a camera 307 and a storage medium 314 (e.g., a data storage device). In some implementations, the camera 307 is configured to provide the image data 308 (e.g., a video data stream) to the processor 304 for encoding by the machine learning coding system 310. In some implementations, the device 302 can be coupled to and/or can include multiple cameras (e.g., a dual-camera system, three cameras, or other number of cameras). In some cases, the device 302 can be coupled to a microphone and/or other input device (e.g., a keyboard, a mouse, a touch input device such as a touchscreen and/or touchpad, and/or other input device). In some examples, the camera 307, the storage medium 314, microphone, and/or other input device can be part of the device 302.

The device 302 is also coupled to a second device 390 via a transmission medium 318, such as one or more wireless networks, one or more wired networks, or a combination thereof. For example, the transmission medium 318 can include a channel provided by a wireless network, a wired network, or a combination of a wired and wireless network. The transmission medium 318 may form part of a packet-based network, such as a local area network, a wide-area network, or a global network such as the Internet. The transmission medium 318 may include routers, switches, base stations, or any other equipment that may be useful to facilitate communication from the source device to the receiving device. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

The device 302 includes one or more processors (referred to herein as "processor") 304 coupled to a memory 306, a first interface ("I/F 1") 312, and a second interface ("I/F 2") 316. The processor 304 is configured to receive image data 308 from the camera 307, from the memory 306, and/or from the storage medium 314. The processor 304 is coupled to the storage medium 314 via the first interface 312 (e.g., via a memory bus) and is coupled to the transmission medium 318 via the second interface 316 (e.g., a network interface device, a wireless transceiver and antenna, one or more other network interface devices, or a combination thereof).

The processor 304 includes the machine learning coding system 310. The machine learning coding system 310 includes an encoder portion 362 and a decoder portion 366. In some implementations, the machine learning coding system 310 can include one or more auto-encoders. The encoder portion 362 is configured to receive input data 370 and to process the input data 370 to generate output data 374 at least partially based on the input data 370.

In some implementations, the encoder portion 362 of the machine learning coding system 310 is configured to perform lossy compression of the input data 370 to generate the output data 374, so that the output data 374 has fewer bits than the input data 370. The encoder portion 362 can be trained to compress input data 370 (e.g., images or video frames) without using motion compensation based on any previous representations (e.g., one or more previously reconstructed frames). For example, the encoder portion 362 can compress a video frame using video data only from that video frame, and without using any data of previously reconstructed frames. Video frames processed by the encoder portion 362 can be referred to herein as intra-predicted frame (I-frames). In some examples, I-frames can be generated using traditional video coding techniques (e.g., according to HEVC, VVC, MPEG-4, or other video coding Standard). In such examples, the processor 304 may include or be coupled with a video coding device (e.g., an encoding device) configured to perform block-based intra-prediction, such as that described above with respect to the HEVC Standard. In such examples, the machine learning coding system 310 may be excluded from the processor 304.

In some implementations, the encoder portion 362 of the machine learning coding system 310 can be trained to compress input data 370 (e.g., video frames) using motion compensation based on previous representations (e.g., one or more previously reconstructed frames). For example, the encoder portion 362 can compress a video frame using video data from that video frame and using data of previously reconstructed frames. Video frames processed by the encoder portion 362 can be referred to herein as intra-predicted frame (P-frames). The motion compensation can be used to determine the data of a current frame by describing how the pixels from a previously reconstructed frame move into new positions in the current frame along with residual information.

As shown, the encoder portion 362 of the machine learning coding system 310 can include a neural network 363 and a quantizer 364. The neural network 363 can include one or more convolutional neural networks (CNNs), one or more fully-connected neural networks, one or more gated recurrent units (GRUs), one or more Long short-term memory (LSTM) networks, one or more ConvRNNs, one or more ConvGRUs, one or more ConvLSTMs, one or more GANs, any combination thereof, and/or other types of neural network architectures that generate(s) intermediate data 372. The intermediate data 372 is input to the quantizer 364. The quantizer 364 can be implemented using a machine learning system (e.g., using a neural network system) or can be implemented using a Standards-based quantization and/or entropy coding techniques (e.g., arithmetic coding). For instance, in some cases, the encoder portion 362 can compress the input data 370 using the neural network techniques described herein, and can output the intermediate data 372 to the quantizer 364 for performing Standards-based quantization and/or entropy coding (e.g., arithmetic coding).

The quantizer 364 is configured to perform quantization and in some cases entropy coding of the intermediate data 372 to produce the output data 374. The output data 374 can include the quantized (and in some cases entropy coded) data. The quantization operations performed by the quantizer 364 can result in the generation of quantized codes (or data representing quantized codes generated by the machine learning coding system 310) from the intermediate data 372. The quantization codes (or data representing the quantized codes) can also be referred to as latent codes or as a latent (denoted as z). The entropy model that is applied to a latent can be referred to herein as a "prior". In some examples, the quantization and/or entropy coding operations can be performed using existing quantization and entropy coding operations that are performed when encoding and/or decoding video data according to existing video coding Standards. In some examples, the quantization and/or entropy coding operations can be done by the machine learning coding system 310. In one illustrative example, the machine learning coding system 310 can be trained using supervised training, with residual data being used as input and quantized codes and entropy codes being used as known output (labels) during the training.

The decoder portion 366 of the machine learning coding system 310 is configured to receive the output data 374 (e.g., directly from quantizer 364 and/or from the storage medium 314). The decoder portion 366 can process the output data 374 to generate a representation 376 of the input data 370 at least partially based on the output data 374. In some examples, the decoder portion 366 of the machine learning coding system 310 includes a neural network 368 that may include one or more CNNs, one or more fully-connected neural networks, one or more GRUs, one or more Long short-term memory (LSTM) networks, one or more ConvRNNs, one or more ConvGRUs, one or more ConvLSTMs, one or more GANs, any combination thereof, and/or other types of neural network architectures.

The processor 304 is configured to send the output data 374 to at least one of the transmission medium 318 or the storage medium 314. For example, the output data 374 may be stored at the storage medium 314 for later retrieval and decoding (or decompression) by the decoder portion 366 to generate the representation 376 of the input data 370 as reconstructed data. The reconstructed data can be used for various purposes, such as for playback of video data that has been encoded/compressed to generate the output data 374. In some implementations, the output data 374 may be decoded at another decoder device that matches the decoder portion 366 (e.g., in the device 302, in the second device 390, or in another device) to generate the representation 376 of the input data 370 as reconstructed data. For instance, the second device 390 may include a decoder that matches (or substantially matches) the decoder portion 366, and the output data 374 may be transmitted via the transmission medium 318 to the second device 390. The second device 390 can process the output data 374 to generate the representation 376 of the input data 370 as reconstructed data.

The components of the system 300 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

While the system 300 is shown to include certain components, one of ordinary skill will appreciate that the system 300 can include more or fewer components than those shown in FIG. 3. For example, the system 300 can also include, or can be part of a computing device that includes, an input device and an output device (not shown). In some implementations, the system 300 may also include, or can be part of a computing device that includes, one or more memory devices (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 3.

In some implementations, the system 300 can be implemented locally by and/or included in a computing device. For example, the computing device can include a mobile device, a personal computer, a tablet computer, a virtual reality (VR) device (e.g., a head-mounted display (HMD) or other VR device), an augmented reality (AR) device (e.g., an HMD, AR glasses, or other AR device), a wearable device, a server (e.g., in a software as a service (SaaS) system or other server-based system), a television, and/or any other computing device with the resource capabilities to perform the techniques described herein.

In one example, the machine learning coding system 310 can be incorporated into a portable electronic device that includes the memory 306 coupled to the processor 304 and configured to store instructions executable by the processor 304, and a wireless transceiver coupled to an antenna and to the processor 304 and operable to transmit the output data 374 to a remote device.

As described above, entropy coding is one of the final stages (and in some cases the final stage) of encoding (compression), when information is translated into bits that form a compressed bitstream. For example, entropy coding can be performed to determine the values and number of bits to be added to the compressed data bitstream (e.g., a video bitstream). Modern Standards-based video encoding methods (e.g., VVC, HEVC, AV1, etc.) employ adaptive arithmetic coding to enable high quality compression performance. Bitstreams generated by adaptive arithmetic coding can only be encoded and decoded sequentially, as compressed-data bits depend not only on the information elements being coded (data-source symbols), but also on encoder/decoder states, which depend on the values of previously coded symbols. For example, a data element can only be recovered by first decoding all previous elements, since the decoder needs to reach the same state that the encoder had when it coded that element. Thus, random access may be achieved, to some degree, by splitting the bitstream and creating access positions ("entry points")

corresponding to where the encoder and decoder states are reset to a pre-defined initial value. Furthermore, the state transitions related to encoding a symbol do not translate into integer number of output bits.

In some aspects, parallel entropy coding can be performed, where throughput requirements are divided to be processed by less-complex circuitry. In some cases, for parallel entropy decoding to operate, a decoder can have access to multiple bitstreams that can be decoded independently, in which case some form of random access should be enabled. Thus, to enable parallel entropy coding, the compressed data can be separated into independently encoded bitstream segments, which can be encoded and decoded concurrently. Such independently encoded bitstream segments are referred to herein as data parcels or parcels. It is assumed that a parcel can be decoded without information from any other parcel (this requirement is with respect to the decoding process; the interpretation of the data in a parcel can depend on information from another parcel), and that each parcel is extended to an integer number of bytes.

Whenever there is more than one bitstream to be decoded concurrently, in addition to using the compressed data, information indicating entry points (e.g., the byte positions in a data structure from where decoding can start) can be provided for decoding. The data structure (e.g., an array or other data structure) including the entry points (and/or the number of bytes in each parcel) is referred to herein as a parcel index. An entry point indicates the array position (e.g., a byte position in the array) where a parcel starts. In some cases, the parcel index including the entry points can be included in a header of the video data, in a parameter set (e.g., a video parameter set (VPS), a sequence parameter set (SPS), a picture parameter set (PPS), etc.), and/or in any other message or signaling associated with the video data. Using the information in the parcel index, parcel decoding can be executed concurrently.

Machine learning-based (e.g., neural network-based) image and video compression can be used to encode image or video data, and machine learning-based (e.g., neural network-based) image and video decompression can be used to decode the encoded image or video data in real time (e.g., on a mobile device or other computing device). To achieve real-time video decoding, an implementation needs to support very high data throughputs, which may not be feasible without parallelizing entropy coding. In one illustrative example, for a highest speed, a processor (e.g., a Graphics Processing Unit (GPU) or other processor) may need to separate arithmetic coding into 16,384 concurrent execution threads. This level of wide scale parallelization may only be possible with machine learning-based (e.g., neural network-based) encoder-decoders (codecs). Specialized bitstream organization may also be needed. Using the 16,384 concurrent execution threads in the prior example and using a native 32-bit representation to indicate the 16,384 decoder entry points in the bitstream results in an overhead of 0.25 bits/pixel per 1920×1080 frame, which may be unacceptable because it can more than double the bit rate of the compressed video.

As noted previously, systems and techniques are described herein for providing improved compression of bitstream indexes for wide scale parallel entropy coding, such as in machine learning-based video codecs (e.g., neural network-based video codecs). In some aspects, the systems and techniques can be used to efficiently compress entry-point arrays, and can reduce this overhead to much lower values. As described herein, two new compression methods are provided, referred to as Single Lower Bound Range Tree Coding (RTC-S) and Double Bounded Range Tree Coding (RTC-D). Experimental results are also provided below, illustrating that the new compression methods can significantly improve compression of entry-point arrays, making prior techniques more efficient in more cases, and extending application to more forms of parallel entropy coding.

Figure 4A:
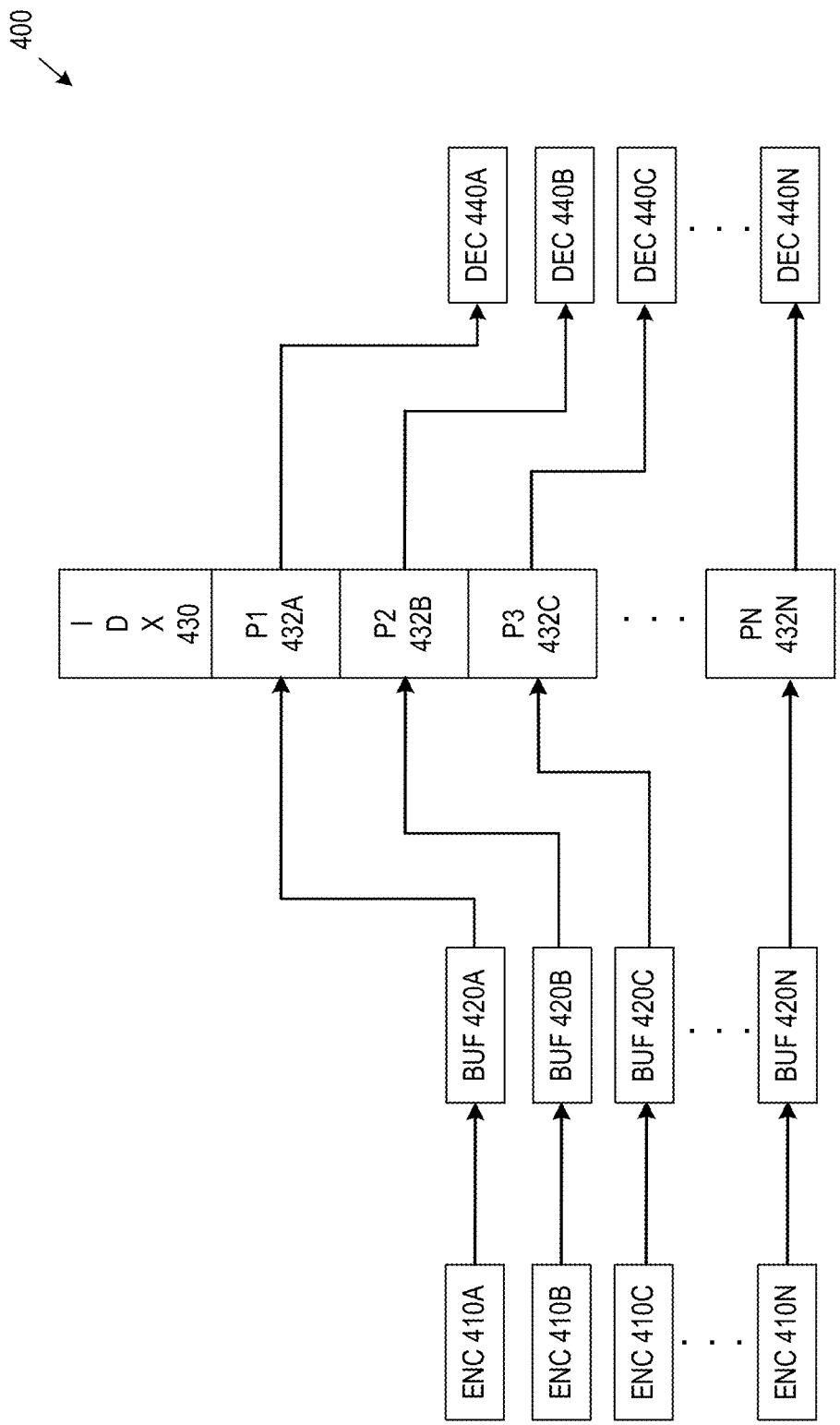
FIG. 4A is a diagram illustrating aspects of parallel entropy coding for independently entropy codable parcels, in accordance with aspects described herein.

FIG. 4A is a diagram illustrating aspects of parallel entropy coding for independently entropy codable parcels in accordance with aspects described herein. As shown in FIG. 4A, a structure 400 includes multiple encoder units 410A, 410B, 410C, through 410N (where N is a positive integer number), each configured to perform parallel encoding of independently entropy codable parcels. Buffers 420A, 420B, 420C, through 420N correspond to the encoder units, and can buffer data for storage, transmission, or any processing used to generate index 430. Each encoder unit and buffer pair outputs a corresponding parcel during a single parallel processing operation, with the parcels shown as parcel 432A, 432B, 432C, through 432N. Each encoder unit can process any number of parcels for a given sequence of video data. For example, if a sequence of video data is divided into 10,000 parcels, and a parallel encoding system uses 50 encoder units, each encoder unit can generate an average of 200 independently entropy codable parcels. During operation, if some encoder units encode longer or shorter parcels, a unit may encode more or fewer parcels than other encoding units, depending on the structure of the system.

The structure 400 supports parallel entropy encoding and decoding, with the compressed data bitstream divided into parcels (e.g., including parcels 432A-N). The number of bytes in each parcel is random or pseudorandom to accommodate the internal reliance or codability of each parcel. Just as with single threaded coding described above where division of the single thread can break codability, the parcels are not simply a fixed number of bits since certain divisions can make a segment of video data uncodable (e.g., if the divisions are not entry points as described above). With a random or pseudorandom number of encoded bits per parcel, the encoded bits are saved to separate memory buffers, and when encoding of an individually entropy codable parcel is finished, the data for the parcel can be copied contiguously to a single compressed-data byte array for storage or transmission. In some examples, different structures other than a single compressed-data byte array can be used as long as the integrity of individually entropy codable parcels and the relationships between the parcels as identified by the index 430 are maintained.

The parcel index 430 is used to describe the relationships between parcels, and to maintain the integrity of the compressed data, even as the data is segmented into parcels that can be coded independently in parallel. When the data is decoded from storage or received as part of a transmission, the information in index 430 is used to manage decoding of parcels using decoder units such as decoder units 440A, 440B, 440C, through 440N. As shown, encoder units send data to a particular decoder unit (e.g., encoder unit 410A sending parcel 432A to decoder unit 440A). However, in various examples, parcels from a single encoder unit can be decoded by any number of different decoder units (e.g., three parcels encoded by encoder unit 410B can be decoded in parallel by decoder units 440A, 440C, through 440N, for example).

Figure 4B:
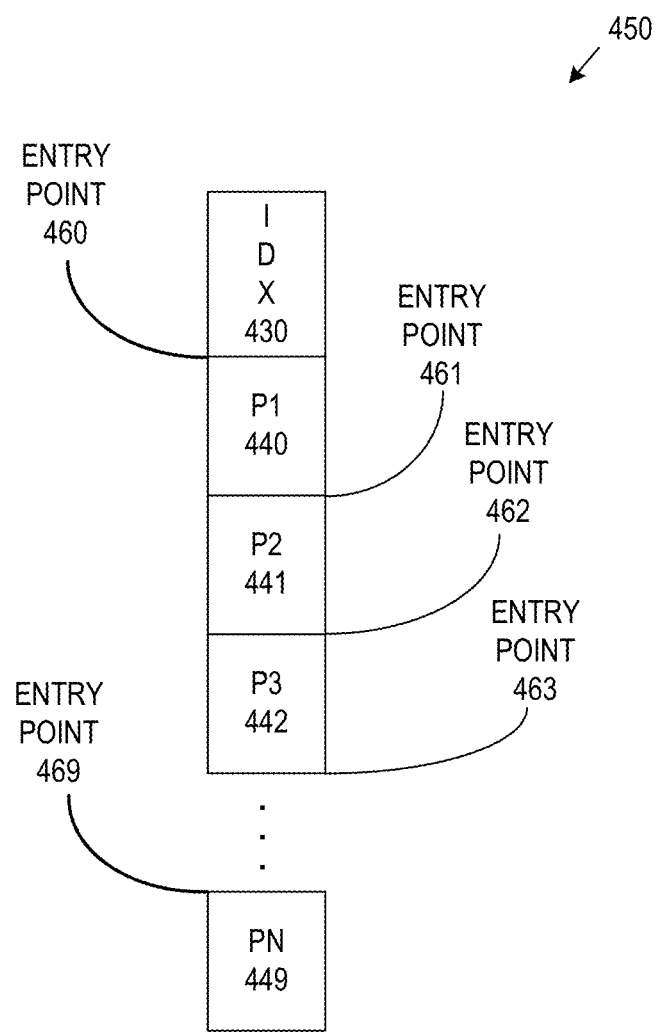
FIG. 4B is a diagram illustrating aspects of an index describing decoding entry point positions separating independently entropy codable parcels for parallel entropy coding, in accordance with aspects described herein.

FIG. 4B is a diagram illustrating aspects of an encoded bitstream 450 with index 430 (e.g., a parcel index) describing entry points separating independently entropy codable parcels for parallel entropy coding in accordance with aspects described herein. Encoded bitstream 450 of FIG. 4B may, for example, included parcels 432A-N of FIG. 4A arranged for storage or transmission as described above, or can be any such video data coded for parallel coding in accordance with examples described herein. Encoded bitstream 450 includes parcels 440, 441, 442, and 449. Other examples of an encoded bitstream created from a sequence of video data can have any number of parcels. Each parcel has an associated entry point. As illustrated, entry point 460 corresponds to parcel 440, entry point 461 corresponds to parcel 441, entry point 462 corresponds to parcel 442, and entry point 469 corresponds to parcel 449. Entry point 463 corresponds to the parcel following parcel 442, which is not shown. Each entry point is associated with a position in the encoded bitstream where a state for decoding is knowable by a decoder configured in accordance with the examples described herein, allowing the parcels to be independently decodable in parallel by decoder units. Index 430 is a data structure that, in some examples, contains the number of bytes in each parcel or equivalently, the array position of each entry point. The parcel index 430 data can then be used to identify the parcels from a stored or transmitted encoded bitstream 450, as well as to reassemble the sequence of video data used to generate the encoded bitstream 450.

Since the parcel index 430 is needed to decode the encoded bitstream 450, the index 430 is kept with the parcels of the encoded bitstream 450. Any decoding begins with decoding of the index 430 to identify information related to the independently decodable parcels. Additionally, to effectively identify the parcels, the number of bits used to encode parcel entry points are added to the total number of bits needed for encoding that parcel. Identification of parcels in index 430 thus uses entry points in the encoded bitstream to account for the encoding, or for the number of bits and position in the bitstream for each parcel to similarly accommodate any bits used for encoding. In some examples, for effective parallelization, a video bitstream may result in many parcels with a relatively small number of bytes. In such examples, the overhead of coding the index can degrade compression, in addition to the limited ability to use prediction with small parcel sizes. For example, to simplify hardware design and minimize costs, some examples can have parcel sizes limited to a range of 16-64 bytes. In other examples, other threshold limitations or ranges can be used. For parcels of that size overheads of a few bytes per parcel translate into significantly worse compression.

Examples described herein provide a technical solution to the technical problem of how to limit the added overhead by limiting the number of bits used to encode the whole parcel index. Assuming N parcels, the information to be coded is the sequence with the random number of bytes used by each parcel, represented by $$\mathcal{L} = (l_1, l_2, l_3, \ldots, l_N). \qquad (1)$$

Since parcel data decoding relies on these numbers, the decoding is not able to start before the number are decoded, and use of a low-complexity method for coding the numbers provides improved device performance when decoding. In addition, examples described herein can use a single coding method that can be used for any type of statistical distribution and any range of magnitudes to allow a benefit of compatibility across many different systems.

Universal codeword sets are applicable to integers of any size. Among universal codeword sets, the Elias gamma code, also known as an "exp-Golomb" code, is used in several video compression standards because it is simple to implement and allows acceptable device performance. The number of bits the Elias gamma code uses for coding a positive integer number n is $$B_\gamma = 2\lfloor \log_2 n \rfloor + 1 \qquad (2)$$

The Elias delta code can code positive integer numbers with an asymptotically smaller number of bits, equal to $$B_\delta = \lfloor \log_2 n \rfloor + 2\lfloor \log_2(\lfloor \log_2 n \rfloor + 1) \rfloor + 1 \qquad (3)$$

However, in practice this code is not commonly used to code large number of integers because it uses two logarithm computations for each number.

Other coding methods, like Huffman coding, are more complicated to implement because they can only be applied to finite sets of integers, requiring special strategies for dealing with numbers outside the sets (e.g., extra coding definitions for dealing with overflows), and can only be optimized to pre-known probability distributions.

Aspects described herein use operations described as Extended Nested Bisection Coding (ENBC) that can also be universally used. Such ENBC operations can improve the operations of a device when compared to general universal codeword set use described above, without depending on any assumption about the statistics of the numbers, or their magnitude range (e.g., it works equally well for small or very large numbers). While the NBC technique is very effective for coding sequences of numbers with wide distribution of values (which can be considered a worst-case), it is less effective when the values are similar and the sequence has lower entropy, and thus can be compressed with a smaller number of bits.

For example, one fundamental limitation of universal codeword sets is that they are meant to be used without any prior information associated with the integer number to be coded. Thus, some additional bits are needed to encode information associated with the magnitude of the number, followed by the bits of the number's binary representation, when general universal codeword structures are used. Examples described herein further improve device operation when compared to general universal codeword usage by exploiting the fact that video data parcels as described above are data sets with many non-negative integers. More specifically, examples described herein provide benefits based on the use of information associated with magnitude that is shared by all the numbers to be coded, and some similarity between magnitudes (e.g., extreme cases like $l_1=1$, $l_2=10^9$ are not expected to be common). To enforce conditions leading to the benefits from examples described herein threshold limitations can be applied by a coding system to parcels structured for parallel coding. For example, some implementations can include a threshold limit on the size difference between parcels (e.g., a minimum size of 32 bits and a maximum size of 128 bits, or a minimum size of 16 bits and a maximum size of 64 bits, etc.). Additional information used to provide a benefit in the examples described herein include that the example coding operations are implicitly defined by a simple and efficient algorithm, instead of pre-defined sets of binary codewords, and the operations include an accumulation of information during the encoding process. Additionally, as an improvement over nested bisection coding, ENBC provides better coding of sequences of similar non-negative values, such as by first encoding a minimum value, and then using it for constraining the compression.

Together, the above properties enable operations to improve the function of coding devices with parallel entropy coding having limited overhead. To be able to use all the above-described properties, in one illustrative example the following monotonic sequence is defined:

$$p_k = \sum_{i=1}^{k} l_i, \; k = 0, 1, 2, \ldots, N, \qquad (4)$$

with $$S = p_N = \sum_{i=1}^{N} l_i, \qquad (5)$$

and define the sequence of byte positions where parcels start as $$\mathcal{P} = (p_0 = 0, p_1, p_2, \ldots, p_N = S). \qquad (6)$$

Encoding the integers in sequence $\mathcal{P}$ is equivalent to encoding the numbers in sequence $\mathcal{L}$.

The integer numbers in sequence $\mathcal{P}$ can be coded sequentially, with a process to collect some information after each value is coded to improve coding of the next value. The information can be efficiently collected in a hierarchical manner.

The example coding operations (e.g., entropy coding operations) performed according to the Extended Nested Bisection Coding (ENBC) uses two nested applications of bisection. In a first nested application of bisection, referred to as outer bisection enumeration, the order in which the elements of sequence $\mathcal{P}$ are encoded is determined, along with aggregation of coding information according to a tree data structure. A second nested application of bisection, referred to as an inner bisection search, encodes information while determining the integer values using bracketed searches, in intervals defined from previously coded values.

In some aspects, the bisection searches can be performed in two types of integer sets, one open interval for indexes (i) and one closed interval for positions (p), which can be represented as:

$$(i_{min}, i_{max}), [p_{min}, p_{max}] \qquad (7)$$

where $$(i_{min}, i_{max}) = \{i_{min} + 1, i_{min} + 2, \ldots, i_{max} - 2, i_{max} - 1\}, \qquad (8)$$

and $$[p_{min}, p_{max}] = \{p_{min}, p_{min} + 1, \ldots, p_{max} -, p_{max}\}. \qquad (9)$$

Defining the minimum value in the whole sequence as:

$$l_{min} = \min\{l_1, l_2, l_3, \ldots, l_N\}. \qquad (10)$$

if the minimum value $l_{min}$ is known, then $l_{min}$ can be used to further constrain values as follows:

$$i \in (i_{min}, i_{max}) \Rightarrow p_i \in [p_{min} + (i - i_{min}) \cdot l_{min}, p_{max} - (i_{max} - i) \cdot l_{min}]. \quad (11)$$

Figure 5:
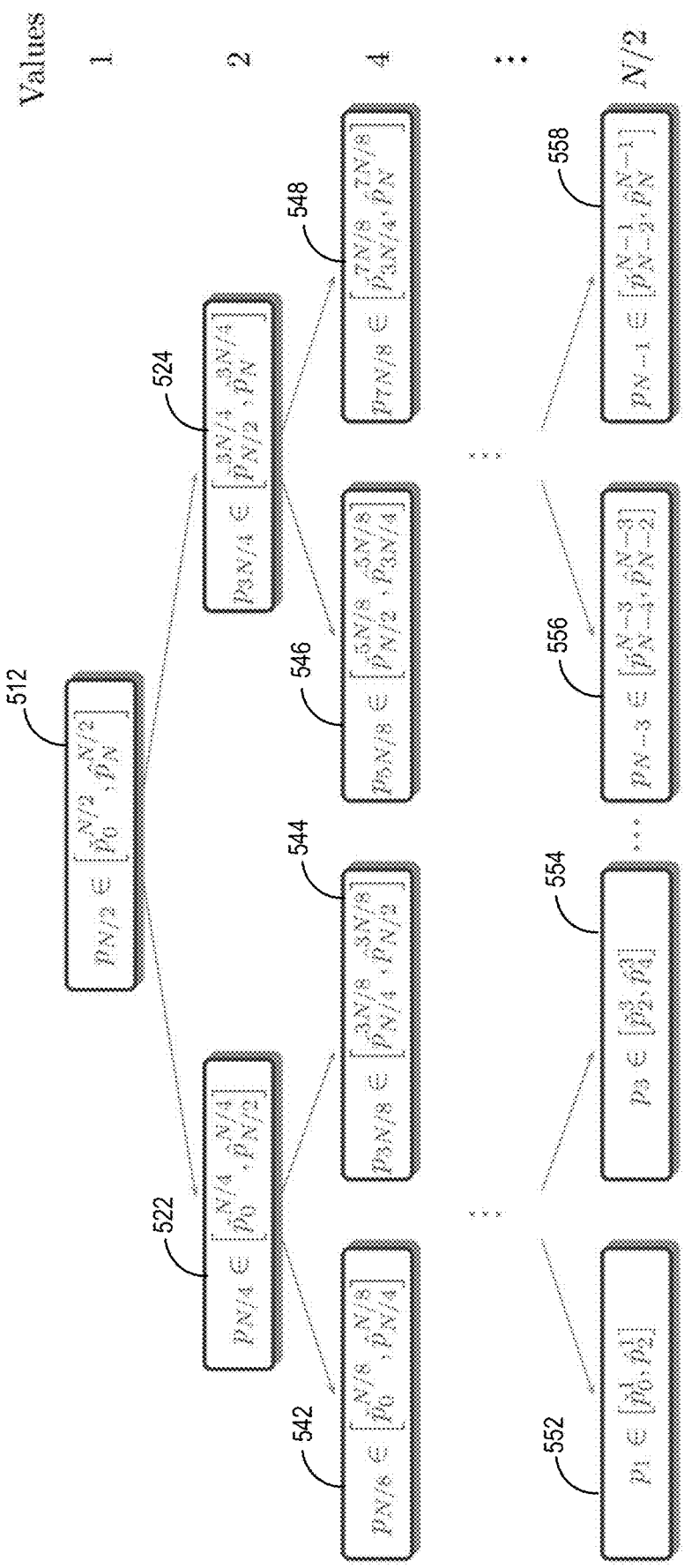
FIG. 5 is a diagram illustrating a tree structure illustrating an outer bisection enumeration of an Extended Nested Bisection Coding (ENBC) technique, in accordance with aspects described herein.

FIG. 5 illustrates tiers of a tree structure associated with information collection during coding (e.g., entropy coding). For instance, the information collection during coding (e.g., entropy coding) can be represented by the tree structure of FIG. 5, where each box represents coding one value of sequence P (for simplicity, in the example of FIG. 5, N is assumed to be a power of two). The tree structure of FIG. 5 is one example related to the accumulation of information during the coding process, where the following notation is used:

$$\hat{p}_i^j = p_j + (j - i) \cdot l_{min}, \hat{p}_k^j = p_k - (k - j) \cdot l_{min}, i < j < k, \quad (12)$$

to represent interval limits defined in eq. (11).

Each box 512, 522, 524, 542, 544, 546, 548, 552, 554, 556, and 558 of FIG. 5 is associated with an entry point of a coded bitstream as associated with a position in the encoded bitstream. When each value in a box is coded following a pre-order tree traversal sequence, the value can use the previously coded values to reduce the uncertainty about the number range for a parcel that is defined between two values when all values are determined, and thus make coding more efficient. Boxes at the top tiers of the tree need more bits to be coded, but the overhead is relatively small because the number of boxes grows exponentially with tree depth. Values 510 illustrate the number of values at each tier, which starts at a single value for box 512 at a first tier, and doubles at every tier.

The operations of the outer bisection enumeration can also be considered as follows. Starting with a sequence (e.g., sequence sequence $\mathcal{P}$ ) of video data, the sequence is split into two subsequences by selecting a position in the sequence of video data (e.g., bisecting the sequence of video data). The selected position will be associated with an entry point in the encoded video bitstream. The first selected position is associated with the first box 512 at the first position in the tree structure of FIG. 5. The two subsequences are then bisected to select the two values associated with box 522 and 524 of the second tier. The second-tier bisections result in four subsequences, which can then be similarly bisected to identify the values for boxes 542, 544, 546, and 548. Just as above, each of the values is associated with what will become an entry point in the coded video bitstream. The process is repeated by bisecting tiers of subsequences of the sequence of video data to generate additional subsequences defined by additional entry points between the additional sequences and additional entry points between two parcels of the sequence of video data to generate individually codable parcels for the sequence of video data, where the individually codable parcels are identified by the entry points for the sequence of video data. At a final tier, every point identified when subsequences are bisected is associated with an entry point, and the data between the points is the data for the individually codable parcels. The bisection operation can use rules to identify appropriate points in the data for entry points. As described above, the bisection position ends up random or pseudorandom due to the segments not being split consistently, but based on characteristics of the data (e.g., along codable boundaries in the data). The pseudorandom characteristics can result, for example, in one sequence 1000 bits long being bisected into a 20-bit subsequence and a 980-bit sequence. If a minimum sequence length for a parcel is 16 bits, the 20-bit subsequence is not bisected further, and that branch of the tree stops at that tier, while the 980-bit sequence is bisected further. Each branch can terminate further bisection when an associated sequence either contains no suitable position for an entry point, or a further bisection would result in a sequence below an acceptable bit length. In other examples, other such criteria for ending the outer bisection enumeration can be used. Once the outer bisection enumeration is completely finished, data for all parcels is known along with the data boundaries between the parcels.

Each box of FIG. 5 can be considered as associated with a bisection operation and a position is associated with an entry point for the data encoded as a parallel entropy codable sequence of video data. Box 512 is associated with bisection of an initial sequence of video data, and a position associated with box 512 will become an entry point after additional data is added to the final subsequences of data (e.g., after selection of all boxes or bisection positions). The additional boxes below box 512 are associated with bisection of subsequences of data in additional tiers. As each position is selected and additional tiers of subsequences are bisected, the subsequences of data become smaller until the final subsequences of data are selected by the final bisection positions. The final complete set of positions (e.g., positions from every box in FIG. 5), define the subsequences of data from the complete set of video data that will become individual parcels. Before the data for the final subsequences are individually codable, additional information (e.g., information associated with the number of bits in a final subsequence) is added to turn the final subsequence data from the video data into the individually entropy codable parcels.

The next operations then code the data and account for the coding overhead in identifying parcel information for the index (e.g., boundaries in the coded video bitstream including the coding overhead, or bit lengths of the coded parcels including all bits for the coded bitstream).

It can be observed from eq. (11) that the knowledge of the minimum value $l_{min}$ can make the uncertainty intervals smaller, and thus the sequence elements can be coded with a smaller number of bits, especially when all values are near $l_{min}$ (see experimental results below).

Using the above, the operations can proceed with the values from the outer bisection enumeration (e.g., the identified positions from the unencoded data to be associated with entry points and parcel boundaries), the data for each subsequence between values can be encoded as a parcel, along with any overhead data. In some aspects, a stack data structure can be used with the values from the outer bisection enumeration (e.g., pre-order tree transversal) with the following operations described using the same notation as above.

For example, using the above notation and a stack data structure to implement the outer bisection enumeration (e.g., per-order tree transversal), the encoding algorithm can be defined, where the number of parcels N determined by the outer bisection enumeration, the total number of bytes S, and $l_{min}$ are encoded using a universal codeword set (e.g., the Elias delta code, or any other such code set). The stack data structure (or stack) is initialized in memory by pushing sets:

$$(i_{min}, i_{max}) = (0, N), [p_{min}, p_{max}] = [0, S]; \qquad (13)$$

As described above, the following operations are then used as long as the stack is not empty:

The stack is popped to retrieve current interval sets:

$$(i_{min}, i_{max}), [p_{min}, p_{max}]; \qquad (14)$$

a new index is defined as a representative value, such as:

$$i = \lfloor (i_{min} + i_{max})/2 \rfloor; \qquad (15)$$

and bisection is used to encode:

$$p_i \in [p_{min} + (i - i_{min}) \cdot l_{min}, \, p_{max} - (i_{max} - i) \cdot l_{min}] \qquad (16)$$

If $(i_{min}, i) \neq \emptyset$ then sets $(i_{min}, i)$, $[p_{min}, p_i]$ are pushed to the stack, and if $(i, i_{max}) \neq \emptyset$ then sets $(i, i_{max})$, $[p_i, p_{max}]$ are pushed to the stack.

In some cases, the operations following equation 13 above are repeated until $(i_{min}, i) = \emptyset$ and $(i, i_{max}) = \emptyset$. At this point, the entire sequence of video data has been encoded (e.g., entropy encoded) into individually decodable parcels (e.g., the parcels 432A, 432B, 432C, through 432N of FIG. 4A) that can be decoded in parallel as the encoded video bitstream, and all needed information is available for the parcel index (e.g., the parcel index 430 of FIG. 4A).

The decoding algorithm can be the same as the encoding algorithm described above, except for defining the new index i, where encoding is replaced by decoding. In some cases, there can only be at most $2 \log_2(N)$ pairs of sets in the stack. The bisection sequence greatly simplifies dealing with incomplete trees.

In some aspects, inner bisection corresponding to defining the new index i described above is defined (e.g., for encoding $p_i \in [p_{min} + (i - i_{min}) \cdot l_{min}, p_{max} - (i_{max} - i) \cdot l_{min}])$ as follows: Given $p_i$ and $p_{min}, p_{max}$, initialize variables $a \leftarrow p_{min}$; $b \leftarrow p_{max}$; $c \leftarrow \lfloor (a+b)/2 \rfloor$. While $c \neq a$ repeat the following operations: If $c \leq p_i$ then encode bit "1" and set $a \leftarrow c$. When $c = a$, encode bit "0" and set $b \leftarrow c$. Update $c \leftarrow \lfloor (a+b)/2 \rfloor$. The decoding algorithm is similar to the above encoding operations. For example, the decoding operations can be defined as follows: given $p_i$ and $p_{min}, p_{max}$, initialize variables $a \leftarrow p_{min}$; $b \leftarrow p_{max}$; $c \leftarrow \lfloor (a+b)/2 \rfloor$. While $c \neq a$ repeat the following operations. If the decoded bit is "1" then set $a \neq c$, otherwise set $b \neq c$. Update $c \neq \lfloor (a+b)/2 \rfloor$, and return decoded value $p_i = a$.

The above examples illustrate aspects of coding operations in accordance with aspects described herein, but it will be apparent that other examples and implementations are possible. The following further illustrate aspects of an example ENBC encoding implementation:

```
// "push" initial interval sets (i_min, i_max) = (0,N), [p_min, p_max] = [0,S]
    stack.push(0, num_parcels, 0, byte_sum);
                                          // encoding loop
    while (!stack.empty( )) {
                                          // "pop" current sets
        stack.pop(idx_min, idx_max, pos_min, pos_max); // (i_min, i_max), [p_min, p_max]
        i = (idx_min + idx_max) >> 1; // new index defined by outer enumeration
        a = pos_min + (i − idx_min) * l_min;// inner bisection search and coding
        b = pos_max − (idx_max − i) * l_min + 1;
        c = (a + b) >> 1;
        while (c != a) {
            if (c <= position[i]) {       // code bits defined by search results
                encode_bit(1);
                a = c;
            }
            else {
                encode_bit(0);
                b = c;
            }
            c = (a + b) >> 1;
        }
                                          // "push" new subsets to stack
        if (i − idx_min > 1)
            stack.push(idx_min, i, pos_min, position[i]);
        if (idx_max − i > 1)
            stack.push(i, idx_max, position[i], pos_max);
    }
```

Similarly, the following illustrates aspects of an example ENBC decoding implementation:

```
// "push" initial interval sets (i_min, i_max) = (0,N), [p_min, p_max] = [0,S]
    stack.push(0, num_parcels, 0, byte_sum);
                                          // decoding loop
    while (!stack.empty( )) {
                                          // "pop" current sets
        stack.pop(idx_min, idx_max, pos_min, pos_max); // (i_min, i_max), [p_min, p_max]
```

-continued

```
i = (idx_min + idx_max) >> 1; // new index defined by outer enumeration
a = pos_min + (i - idx_min) * l_min;// inner bisection search and coding
b = pos_max - (idx_max - i) * l_min + 1;
c = (a + b) >> 1;
while (c != a) {
   if (decode_bit( ) == 1)      // code bits defined by search results
      encode_bit(1);
      a = c;
   else
      b = c;
   }
   c = (a + b) >> 1;
}
position[i] = a;
                              // "push" new subsets to stack
if (i - idx_min > 1)
   stack.push(idx_min, i, pos_min, position[i]);
if (idx_max - i > 1)
   stack.push(i, idx_max, position[i], pos_max);
}
```

The compression methods defined in the previous section apply coding to disjoint subsets of data, using the tree structure shown in FIG. 5 and cumulative sum of eq. (4), to exploit the similarity in the scale of the numbers in the array $\pounds$ (eq. (1)).

This similarity can also be exploited using other tree structures, such as Amplitude Group Partitioning (AGP) where instead of progressively coding partial sums of the values, the maximum magnitudes are coded progressively, since they also help to constrain the number of bits used for each coded number.

Various differences exist between the ENBC techniques described herein (which can use Range Tree Coding (RTC) for coding sequences using value ranges) and the AGP technique. In one example, AGP was defined for symmetric distributions peaked at zero, while the RTC techniques described herein may process positive numbers (e.g., only positive numbers, such as when performing entropy coding), and the distribution may be expected to be asymmetric. For instance, AGP operates only on magnitudes that are lower bounded by zero, while RTC may explicitly employ fixed or variable lower bounds for better compression. In another example, AGP decomposes the magnitudes into two pieces of information for more efficient compression, using for example arithmetic coding. In some cases, RTC does not employ such decomposition, does not need arithmetic coding, and instead can use binary prefix codes (e.g., only binary prefix codes) in some aspects. In yet another example, because AGP strongly constrains the alphabet size for entropy coding, it uses special symbols for representing the case when pairs of elements have the same value. With the large coding alphabet used by RTC, the probability of repeated numbers is very small, and thus there is no requirement that a special case for equality is used.

While NBC uses the bisection algorithm to simplify operations on trees, RTC can also use a simple technique for dealing with binary trees, using arrays organized so that when information of a tree node is stored at position i, information associated with descendants is at positions i and i+1.

Using this convention (and for convenience assuming that the number of elements N is a power of two), an array with maximum and minimum values can be defined as:

$$v_i = \begin{cases} l_{i+1-N}, & N \le i \le 2N-1, \\ \max(v_{2i}, v_{2i+1}), & 1 \le i \le N-1, \end{cases} \quad (17)$$

$$u_i = \begin{cases} l_{i+1-N}, & N \le i \le 2N-1, \\ \min(u_{2i}, u_{2i+1}), & 1 \le i \le N-1, \end{cases} \quad (18)$$

Note that the sequence definitions are self-referential, but this simply means that they are computed in reverse order. Furthermore, the binary arrays can be defined as:

$$y_i = \begin{cases} 1, & v_i = v_{2i}, \\ 0, & v_i > v_{2i}, \end{cases} \quad i = 1, 2, \ldots, N, \quad (19)$$

$$x_i = \begin{cases} 1, & u_i = u_{2i}, \\ 0, & u_i < u_{2i}, \end{cases} \quad i = 1, 2, \ldots, N. \quad (20)$$

A consequence of definitions (17) and (18) includes the following properties:

$$v_1 = \max\{l_1, l_2, \ldots, l_N\} \quad (21)$$

$$v_2 = \max\{l_1, l_2, \ldots, l_{N/2}\}$$

$$v_3 = \max\{l_{N/2+1}, l_{N/2+2}, \ldots, l_N\}$$

$$v_4 = \max\{l_1, l_2, \ldots, l_{N/4}\}$$

$$v_3 = \max\{l_{N/4+1}, l_{N/4+2}, \ldots, l_{N/2}\}$$

$$\vdots$$

and $$u_1 = \min\{l_1, l_2, \ldots, l_N\} \quad (22)$$

$$u_2 = \min\{l_1, l_2, \ldots, l_{N/2}\}$$

$$u_3 = \min\{l_{N/2+1}, l_{N/2+2}, \ldots, l_N\}$$

$$u_4 = \min\{l_1, l_2, \ldots, l_{N/4}\}$$

$$u_3 = \min\{l_{N/4+1}, l_{N/4+2}, \ldots, l_{N/2}\}$$

$$\vdots$$

Figure 6:
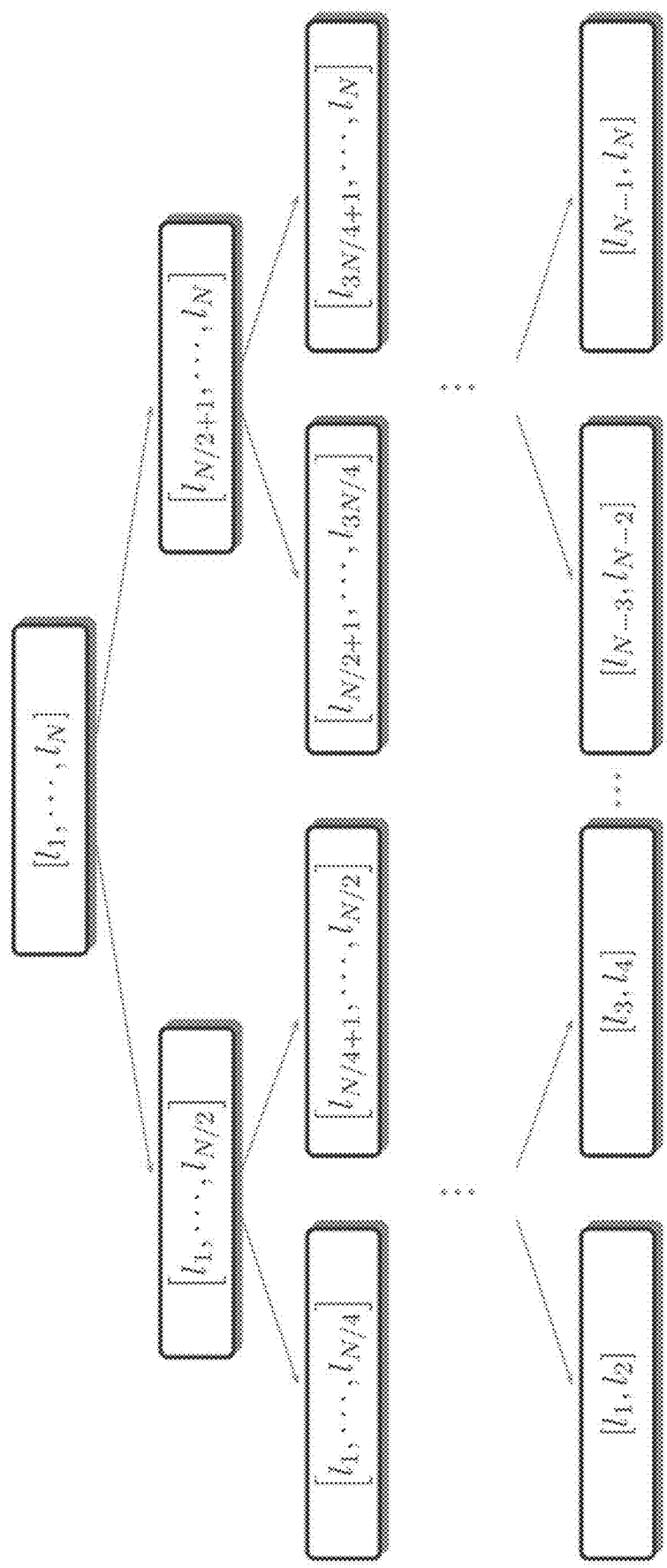
FIG. 6 is a diagram illustrating a tree structure illustrating a recursive partition of sets of values defining arrays with maximum and minimum values, in accordance with aspects described herein.

This means that $u_i$ and $v_i$ contain the minimum and maximum values from nested subset of elements of $\pounds$, using a tree structure shown in FIG. 6. This is similar to the tree diagram of FIG. 5, but related to sets of numbers, instead of intervals related to the cumulative sum of those numbers. For instance, the tree structure of FIG. 6 illustrates recursive partition of sets of values defining the arrays with maximum and minimum values in definitions (17) and (18).

From the array of maximum/minimum values, the coding algorithms can exploit at least the following properties that are valid when the maximum/minimum value of two non-negative integer numbers is known: one of the numbers can be encoded using only one bit, since it can identify a number that is equal to the maximum/minimum value; and the other number is known to be within the range (interval) defined by the known maximum/minimum value.

Using those definitions, two compression methods can be defined, as described below and referred to as Single Lower Bound Range Tree Coding (RTC-S) and Double Bounded Range Tree Coding (RTC-D). In the two compression methods, the availability of a range-based compression method can be assumed, such as an efficient method to compress an integer value n within a given range r):

$$n \in [0, r] = \{0, 1, 2, \ldots, r-1, r\}.$$

For instance, the inner bisection coding methods described above. Additionally or alternatively, in other aspects, prefix codes can be used. Prefix codes (or prefix-free codes), such as Huffman or Golomb codes, are commonly optimized for some probability distribution of the data symbols. However, some systems do not assume a knowledge of a probability distribution. When a number n to be encoded is such that $n \in \{0, 1, 2, \ldots, 2^B-1\}$, a device can efficiently encode that number with a fixed number of bits equal to B. In the general case, when $n \in \{0, 1, 2, \ldots, N_p-1\}$, the number n can be coded using $\lfloor \log_2(N_p) \rfloor$ bits for some values, and $\lfloor \log_2(N_p) \rfloor + 1$ bits for the remaining values.

Some aspects use the following method to specify how values are coded for a simple and efficient system in place of the bisection-based coding examples. Some such examples operate by sequentially increasing the number of bits used for coding values from $\lfloor \log_2(N_p) \rfloor$ bits to $\lfloor \log_2(N_p) \rfloor + 1$, in the first and last values in the set of possible values. Table 1 below shows examples of prefex codes for integer values of $N_p$ from 4 to 8, with FIGS. 7A-7E showing tree representations of those codes.

TABLE 1

| | Binary Codewords | | | | |
|---|---|---|---|---|---|
| n | $N_p = 4$ | $N_p = 5$ | $N_p = 6$ | $N_p = 7$ | $N_p = 8$ |
| 0 | 00 | 000 | 000 | 000 | 000 |
| 1 | 01 | 01 | 010 | 010 | 001 |
| 2 | 10 | 10 | 10 | 100 | 010 |
| 3 | 11 | 11 | 11 | 11 | 011 |
| 4 | — | 001 | 001 | 001 | 100 |
| 5 | — | — | 011 | 011 | 101 |
| 6 | — | — | — | 101 | 110 |
| 7 | — | — | — | — | 111 |

Figure 7A:
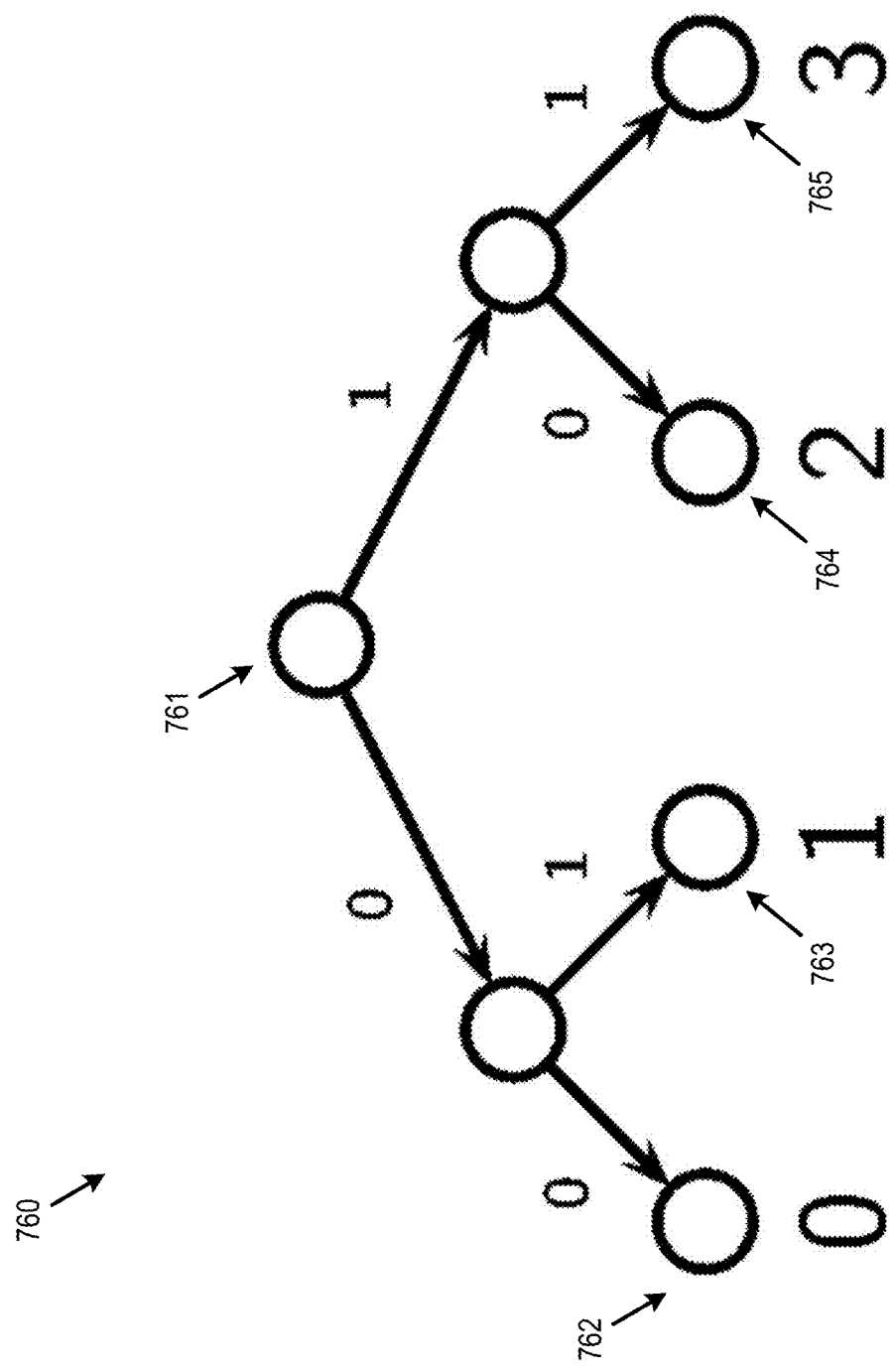
FIG. 7A illustrates aspects of prefix codes that can be used with aspects described herein.

FIG. 7A illustrates aspects of prefix codes that can be used with examples described herein. FIG. 7A is a tree representation 760 of the code values for $N_p=4$. The path from starting position 761 to the n value positions 762-765 show how each code value is generated. For the n=0 code, the path from starting position 761 to the n=0 position 761 gives a code of 00. Similarly, the paths from starting position 761 to n=1 position 762, n=2 position 763, and n=3 position 765 are 01, 10, and 11, respectively.

Figure 7B:
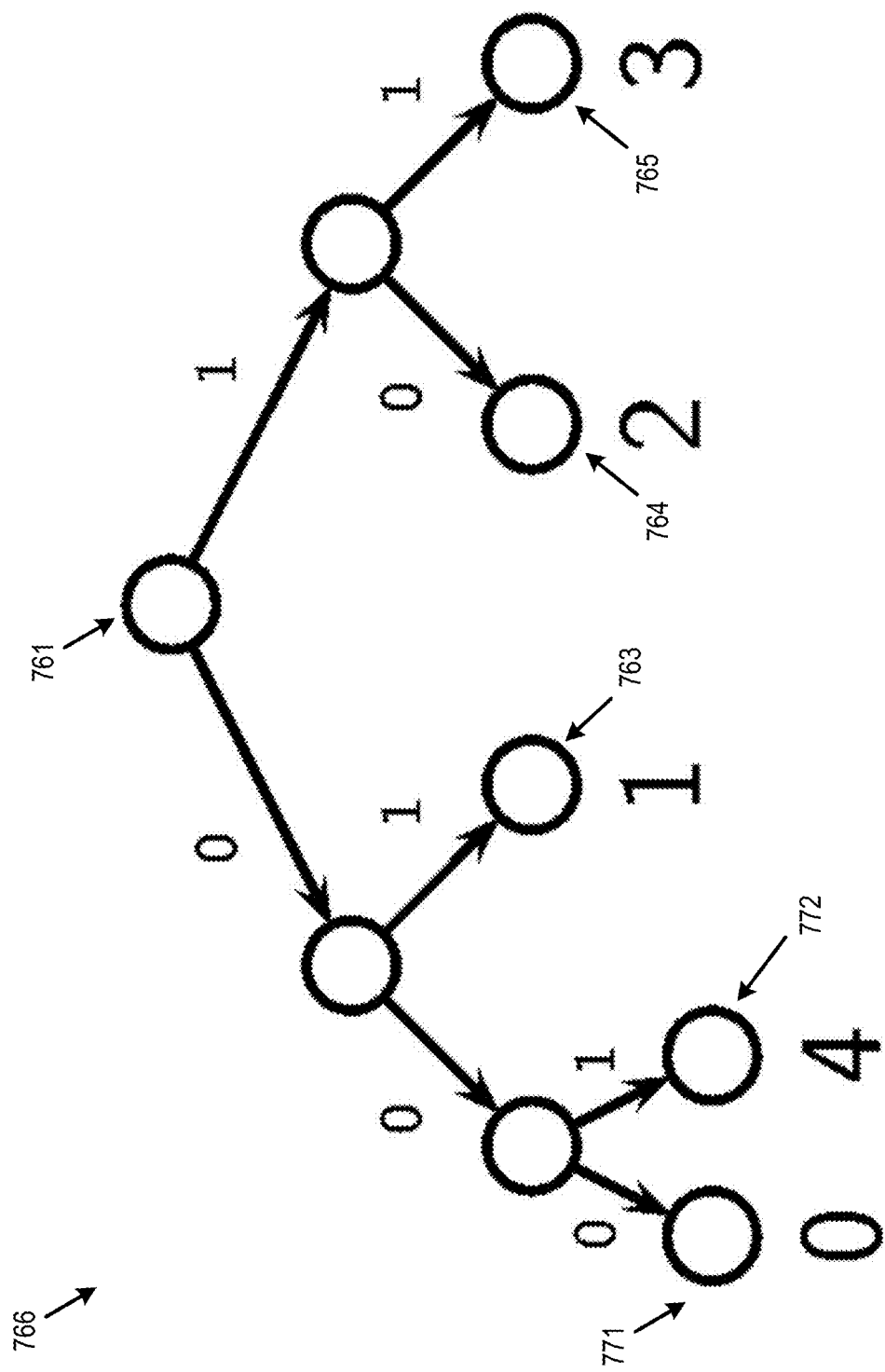
FIG. 7B illustrates aspects of prefix codes that can be used with aspects described herein.

FIG. 7B illustrates aspects of prefix codes that can be used with examples described herein. FIG. 7B is a tree representation 768 of the code values for $N_p=5$. As shown by tree representation 770 and the paths from starting position 760 to positions 763, 764, and 765, the codes for values n=1, n=2, and n=3 are the same for $N_p=5$ as for $N_p=4$. The new n=4 position 772 not present for $N_p=4$ is 001, and n=0 position 771 has an additional bit for a value of 000.

Figure 7C:
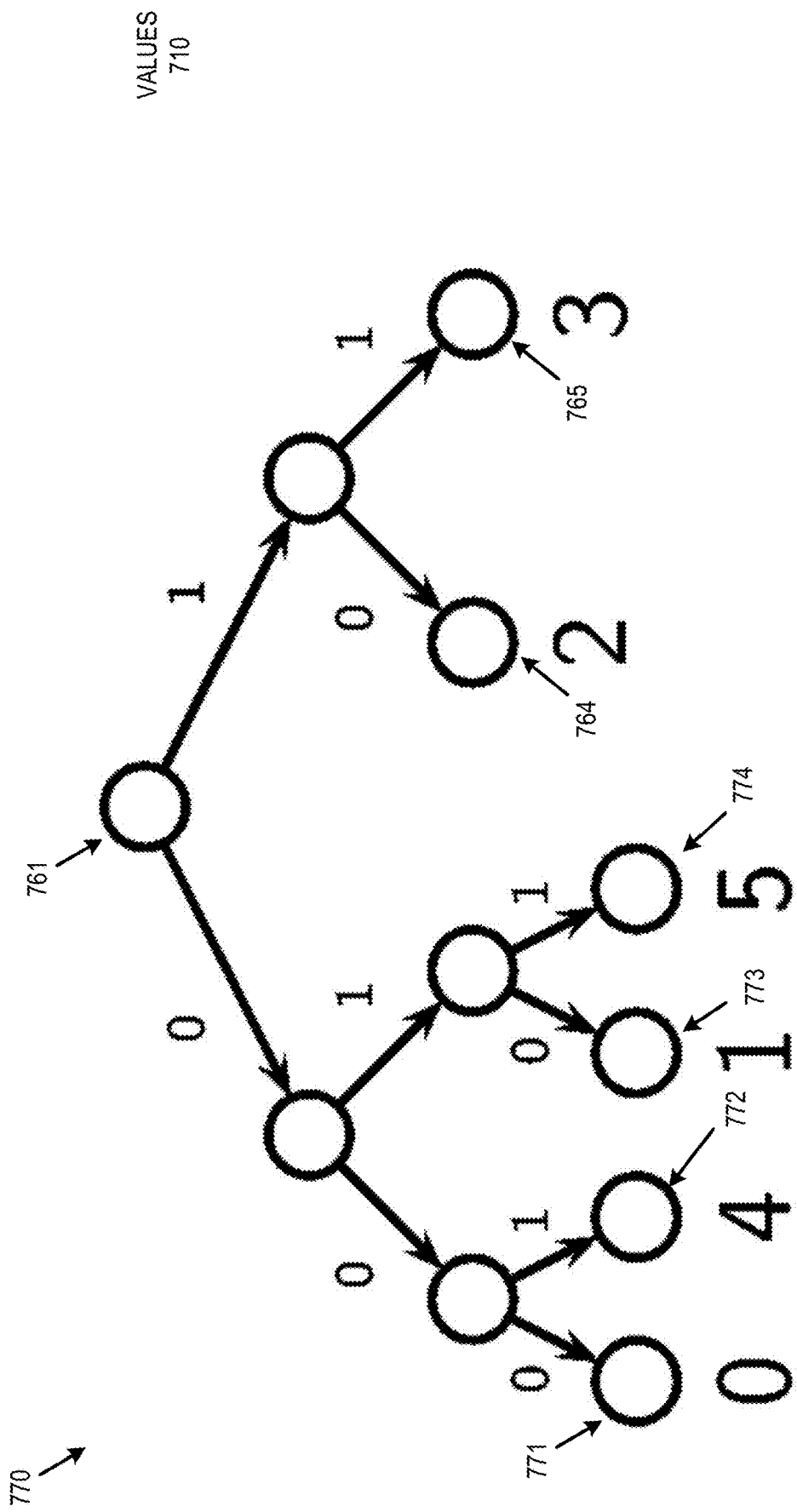
FIG. 7C illustrates aspects of prefix codes that can be used with aspects described herein.
Figure 7D:
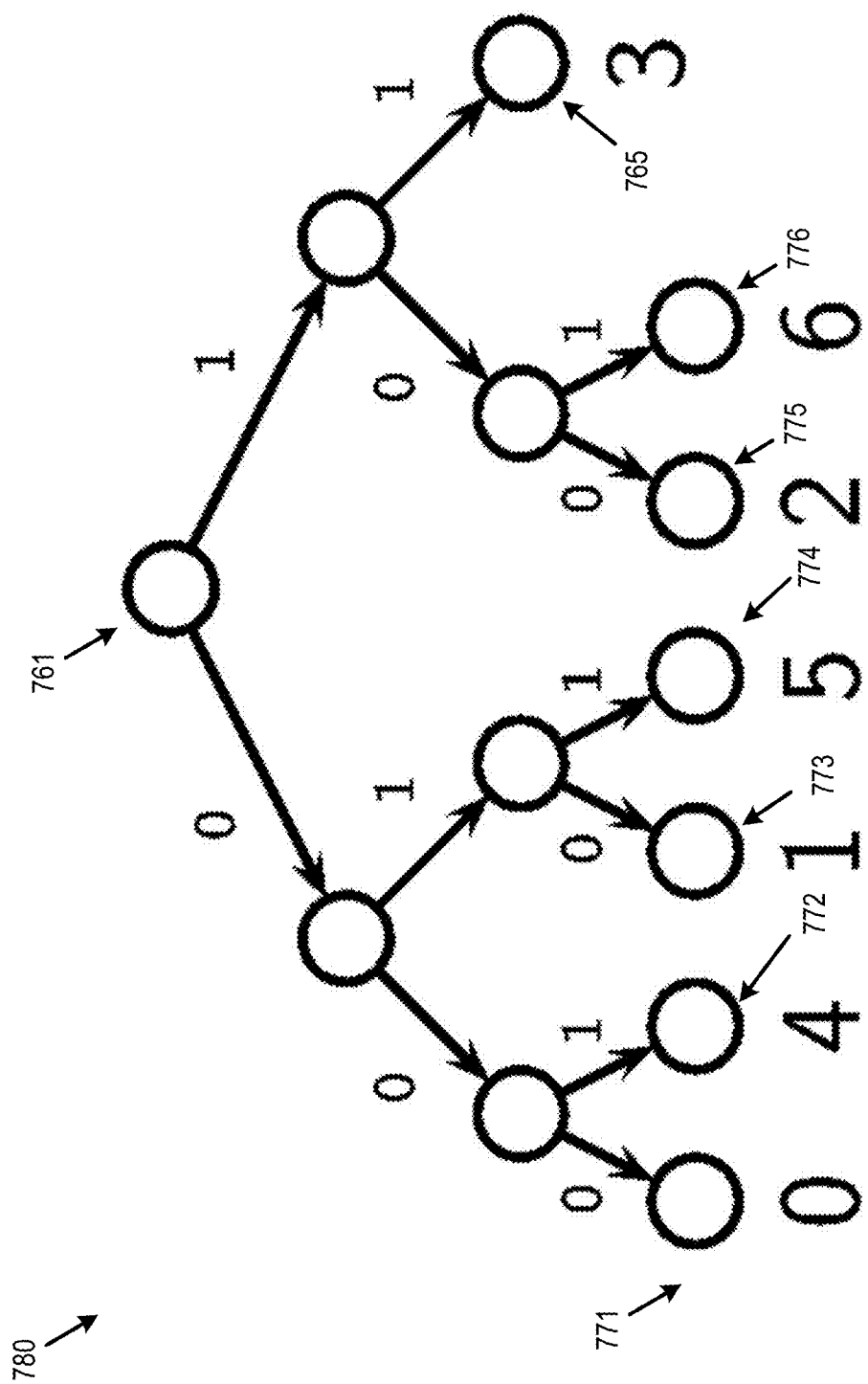
FIG. 7D illustrates aspects of prefix codes that can be used with aspects described herein.
Figure 7E:
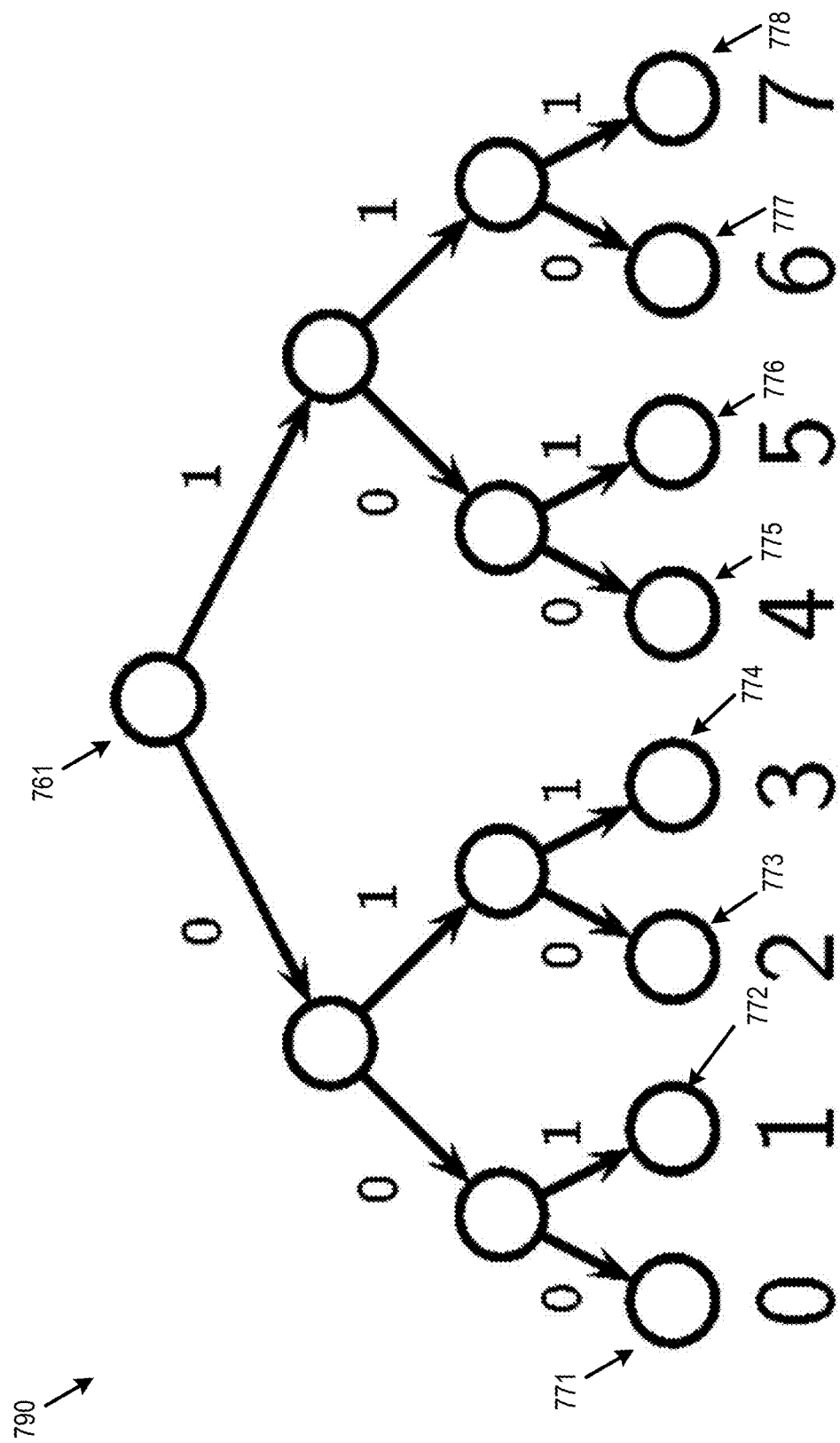
FIG. 7E illustrates aspects of prefix codes that can be used with aspects described herein.

FIG. 7C illustrates aspects of prefix codes that can be used with examples described herein. FIG. 7D illustrates aspects of prefix codes that can be used with examples described herein. FIG. 7E illustrates aspects of prefix codes that can be used with examples described herein. Each of these figures show corresponding tree representations 770, 780, and 790 illustrating the code values for $N_p=6$-8. At each increasing $N_p$ value tree representation, the lowest value position in the lowest full branch tier is replaced with two values in the tier below. From $N_p=5$ to $N_p=6$, the position 763 is replaced by two positions 773 and 774 branching from that position. From $N_p=6$ to $N_p=7$, the position 764 is replaced by two positions 775 and 776 branching from that position. From $N_p=6$ to $N_p=7$, the position 765 is replaced by two positions 777 and 778 branching from that position. For each of the illustrated trees, the path branching from initial position 761 to the lowest tier position of each branch gives the code value for a corresponding n value.

The illustrated codes above are different from the well-known canonical Huffman codes, where the number of bits increases with coded value. Canonical Huffman codes are easier to encode and decode without generating a list of codewords and their number of bits. However, the codes illustrated allows a similarly simple set of prefix codes a shown by the following encoding and decoding algorithm descriptions.

An example encoding algorithm is:

1. Input: values of n and $N_p$ such that $n \in \{0, 1, 2, \ldots, N_p - 1\}$;
2. Compute $B = \lfloor \log_2(N_p) \rfloor$ and $M = 2^B$;
3. Encode $k = n \mod M$ using B bits;
4. If $k + M < N_p$ then:
   a. Encode $\lfloor k/M \rfloor$ with one bit.

An example corresponding decoding algorithm is:

1. Input: values of $N_p$;
2. Compute $B = \lfloor \log_2(N_p) \rfloor$ and $M = 2^B$;
3. Decode k using B bits, and set $n = k$;
4. If $k + M < N_p$ then:
   a. Decode one bit, and if its value is 1 then set $n = k + M$;
5. Return value n.

Some examples described herein can then use the above-described coding and decoding index elements in place of the bisection-based coding described in other portions of this description.

As noted previously, using the definitions defined above, two compression methods can be defined, including as Single Lower Bound Range Tree Coding (RTC-S) and Double Bounded Range Tree Coding (RTC-D). In one example, RTC-S compresses sequence $\mathcal{L} = (l_1, l_2, l_3, \ldots, l_N)$ using the following operations: (1) Compute $l_{min}$ using eq. (10), $v_1, v_2, \ldots, v_{2N}$ using eq. (17), and $y_1, y_2, \ldots, y_N$ using eq. (19); (2) Encode the number of parcels N and $v_1$, using a universal codeword set (e.g., the Elias delta code or other code), and encode $l_{min} \in [0, v_1]$ using a range-based method;

(3) For i=1, 2, ..., N, such that $v_i \neq l_{min}$: (a) Encode binary element $y_i$ using one bit; (b) Encode $v_{2i+y_i} \in [l_{min}, v_i+1-y_i]$ using a range-based method.

While providing good compression results, the RTC-S method provides a simple algorithm from a computational perspective that can be implemented with very short functions. Nevertheless, the RTC-S method is quite effective, at least in part because it combines information that is applicable to many data elements, and sequentially using that information to more efficiently code those values. RTC-S is also computationally very efficient, because it can use a single counting loop to code all data with an efficient tree organization. The following is an illustrative example of a complete Python implementation of an encoder and decoder implementing RTC-S:

```
def RTC_S_Encode(N, l, enc):                    # encoder function
    v = [0] * (N * 2)                           # initialization
    y = [0] * N
    v[N:2*N] = l[0:N]
    l_min = min(l)                              # computation of l_min and arrays v and y
    for i in range(N - 1, 0, -1):
        if v[2*i] >= v[2*i+1]:
            y[i], v[i] = 1, v[2*i]
        else:
            y[i], v[i] = 0, v[2*i+1]
    enc.universal_encode(v[1])                  #encoding v[1] and l_min
    enc.range_encode(l_min, v[1])
    for i in range(1, N):                       # progressive coding of tree-organized data
        if v[i] != l_min:
            enc.bit_encode(y[i])
            enc.range_encode(v[i] - v[2*i+y[i]] + y[i] - 1,\
                v[i] - l_min + y[i] - 1)
def RTC_S_Decode(N, dec):                       # decoder function
    l = [0] * N                                 # initialization
    l[1] = dec.universal_decode( )              # decoding v[1] and l_min
    l_min = dec.range_decode(l[1])
                                                # in-place decoding of data array
    for i in range(1, N):
        j = 2 * i if 2 * i < N else 2 * i - N
        l[j] = l[j+1] = l[i]
        if l[i] != l_min
            y = dec.bit_decode( )
            l[j+y] -= dec.range_decode(l[i] - l_min + y - 1) - y + 1
    return l                                    # returns array of decoded numbers
```

As illustrated by the Python implementations of the RTC-S encoding and decoding algorithms, the encoder uses arrays for storing tree-related information, but decoding can be done in-place.

While RTC-S uses a single value min as the lower bound to the range coding functions, the second compression method RTC-D uses the same tree-based approach to encode and update, but applied to both upper and lower bounds. In one example, RTC-D compresses sequence $\mathcal{L} = (l_1, l_2, l_3, \ldots, l_N)$ using the following operations: (1) Compute $v_1, v_2, \ldots, v_{2N}$ and $u_1, u_2, \ldots, u_{2N}$ using eqs. (17) and (18), respectively, and $y_1, y_2, \ldots, y_N$ and $x_1, x_2, \ldots, x_N$ using eqs. (19) and (20), respectively; (2) Encode the number of parcels N and $v_1$, using a universal codeword set (e.g., the Elias delta code or other code), and encode $u_i \in [0, v_1]$ using a range-based method; (3) For i=1, 2, ..., N, such that $v_i \neq u_i$: (a) Encode binary element $x_i$ using one bit; (b) If 2i<N: (i) Encode binary element $y_i$ using one bit; (ii) Encode $v_{2i+y_i} \in [u_i, v_i+1-y_i]$ using a range-based method; (iii) Encode $u_{2i+x_i} \in [u_i, v_{2i+x_i}+1-x_i]$ using a range-based method. The following is an illustrative example of a complete Python implementation of an encoder and decoder implementing RTC-D:

```
def RTC_D_Encode(N, l, enc):                    # encoder function
    u = [0] * (N * 2)                           # initialization
    v = [0] * N
    x = [0] * N
    y = [0] * N
    u[N:2*N] = l[0:N]
    v[N:2*N] = l[0:N]
    for i in range(N - 1, 0, -1):               # computation
                                                # of arrays u, v, x, y
        if u[2*i] <= u[2*i+1]:
            x[i], u[i] = 1, u[2*i]
        else:
            x[i], u[i] = 0, u[2*i+1]
        if v[2*i] >= v[2*i+1]:
```

```
        y[i], v[i] = 1, v[2*i]
    else:
        y[i], v[i] = 0, v[2*i+1]
    enc.universal_encode(v[1])           # encoding v[1] and u[1]
    enc.range_encode(u[1], v[1])
    for i in range(1, N):                # progressive coding
                                         # of tree-organized data
        if u[i] != v[i]:
            enc.bit_encode(y[i], 1)
            if 2 * i < N:
                enc.bit_encode(x[i])
                enc.range_encode(v[i] - v[2*i+y[i]] + y[i] - 1,\
                    v[i] - u[i] + y[i] - 1)
                enc.range_encode(u[2*i+x[i]] - u[i] + x[i],\
                    v[2*i+x[i]] - u[i] + x[i])
def RTC_D_Decode(N, dec):                #decoder function
    l = [0] * N                          # initialization
    u = [0] * N
    l[1] = dec.universal_decode( )       # decoding v[1] and u[1]
    u[1] = dec.range_decode(l[1])
    for i in range(1, N):                # in-place decoding of data array
        if l[i] == u[i]:
            if 2 * i < N:
                l[2*i] = l[2*i+1] = u[2*i] = u[2*i+1] = l[i]
            else:
                l[2*i-N] = l[2*i-N+1] = l[i]
        else:
            y = dec.bit_decode( )
            if 2 * i < N:
                x = dec.bit_decode( )
                l[2*i] = l[2*i+1] = l[i]
                u[2*i] = u[2*i+1] = u[i]
                l[2*i+y] -= dec.range_decode(l[i] - u[i] + y - 1) - y + 1
            else:
                l[2*i-N+1-y] = l[i]
                l[2*i-N+1-y] = u[i]
    return l                             # returns array of decoded numbers
```

As illustrated by the Python implementations of the RTC-D coding algorithm above, decoding is performed in-place, with array l replacing v, and with temporary array u.

Experimental results are provided comparing the performance of the proposed ENBC method and the proposed RTC-S and RTC-D methods to an NBC method. For the testing, pseudo-random numbers are used with log-normal distributions. Because it can be more suitable to represent parcel sizes measured in kilobytes or megabytes, base 2 is used for the logarithm. For example, a random variable Z with normal distribution (e.g., $Z \sim \mathcal{N}(\mu, \sigma^2)$) is assumed, and the elements in the sequence of parcel sizes $\mathcal{L} = (l_1, l_2, l_3, \ldots, l_N)$ are assumed to be samples of random variable:

$$L = 2^Z, \quad (23)$$

Figure 8:
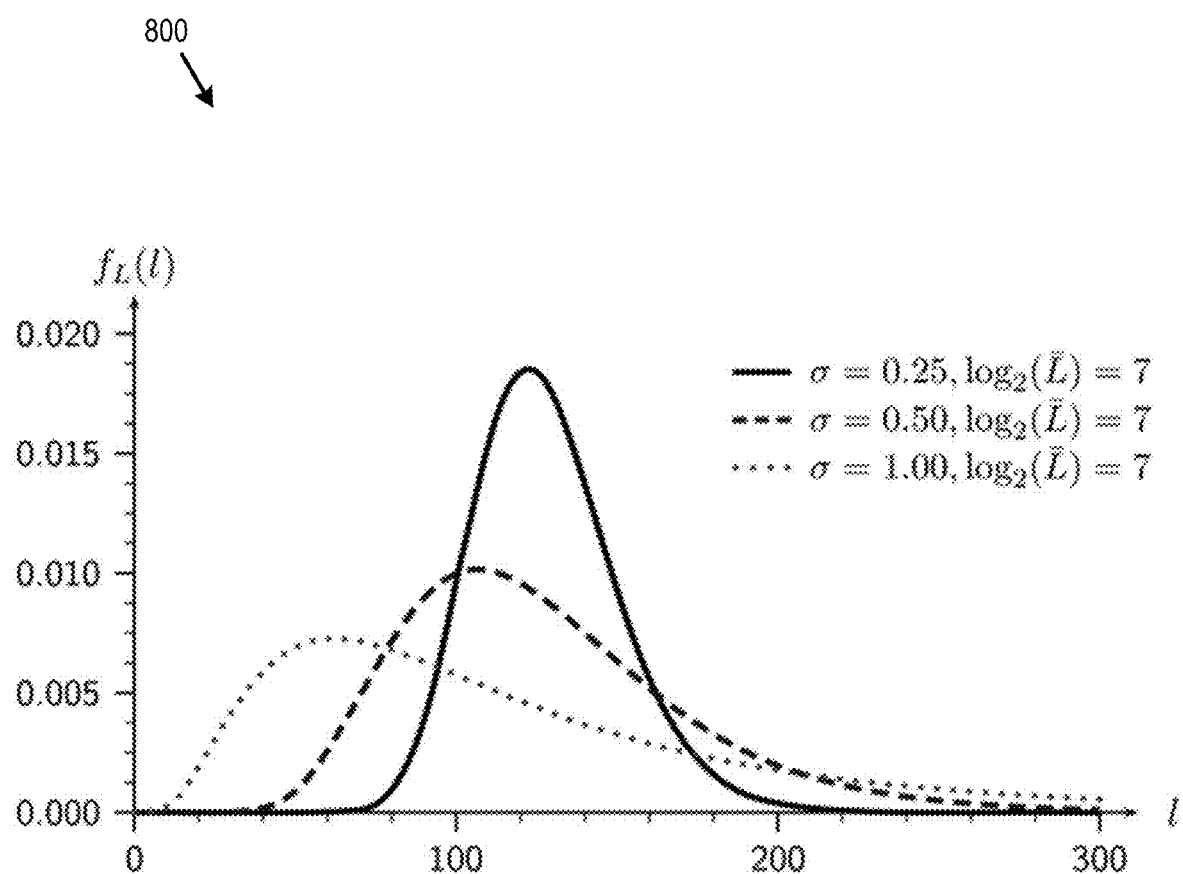
FIG. 8 is a graph illustrating examples of log-normal probability distribution functions, in accordance with aspects described herein.

FIG. 8 is a graph 800 illustrating examples of log-normal probability distribution functions from this distribution. The mean value used in the illustrative example is as follows:

$$\overline{L}(\mu, \sigma) = 2^{\mu + ln(2)\sigma^2/2}, \quad (23)$$

and entropy is $$H_L(\mu, \sigma) = \mu + \log_2(\sigma \ln(2)\sqrt{2e\pi}). \quad (25)$$

or $$H_L(\mu, \sigma) = \log_2(\overline{L}) + \log_2(\sigma) - \frac{\ln(2)\sigma^2}{2} + \log_2(\ln(2)\sqrt{2e\pi}). \quad (26)$$

The compression methods (RTC-S and RTC-D) can be tested by rounding samples of log-normal random variables to create sequences with parcel size $\mathcal{L} = (l_1, l_2, l_3, \ldots, l_N)$, while varying distribution parameters $\overline{L}$ and $\sigma$. The performance of the compression methods can be measured by the difference between the bit rate (e.g., in bits per data element) and the source entropy.

Figure 9:
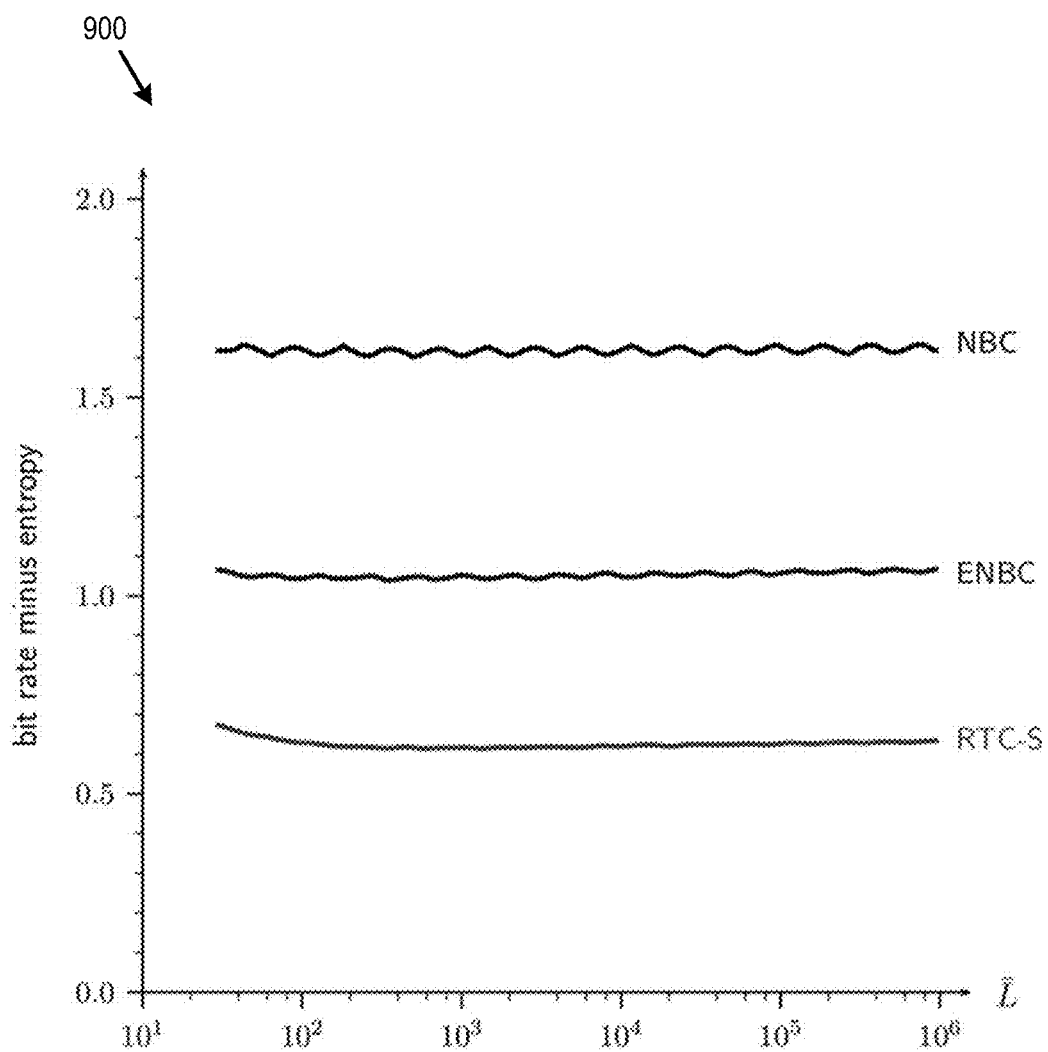
FIG. 9 is a graph illustrating differences between compression rates in bits per symbol minus source entropy, in accordance with aspects described herein.

FIG. 9 is a graph 900 providing an illustrative example of results obtained by varying parameter $\overline{L}$ with $\sigma=0.5$, N=1024, on 65,536 arrays. For instance, the graph 900 illustrates the difference between compression rate in bits per symbol minus the source entropy, on log-normal distribution with $\sigma=0.5$, N=1024, for the proposed compression methods. It can be observed that, even with parameter $\overline{L}$ varying by 16 powers of two (more than four orders of magnitude), the difference between obtained bits rates and entropy is remarkably constant. Oscillations can be observed in the graph 900, which are caused by the dependence of the range coding algorithm on how much parameter $\overline{L}$ differs from power of two, but they are very small for the NBC method, smaller for ENBC, and not visible with RTC-S. This shows that the proposed compression methods are indeed "universal," in the sense that they work equally well, in an automatic manner, for nearly all sufficiently large scales of the elements in $\mathcal{L}$. Considering this fact, the next results are computed by averaging the differences between bit rates and entropy in the logarithmic interval $\log_2(\overline{L}) \in [5, 20]$.

Figure 10:
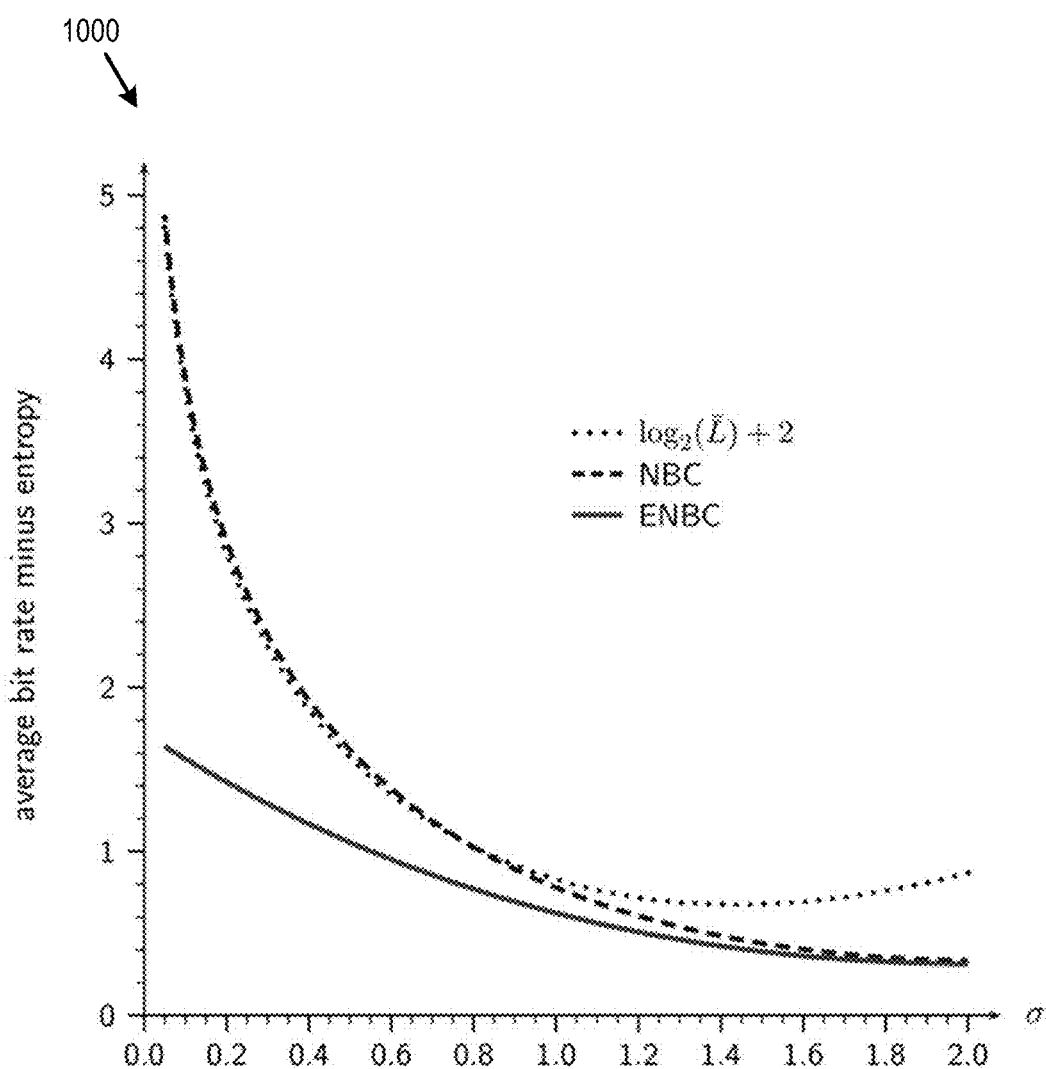
FIG. 10 is a graph illustrating further examples of log-normal probability distribution functions, in accordance with aspects described herein.

FIG. 10 is a graph 1000 illustrating examples of log-normal probability distribution functions. The distribution functions in the graph 1000 illustrate how the averages of the differences between bit rates and entropy change with parameter σ, for compression methods NBC and ENBC. It can be observed that the NBC average bit rate can be reasonably well approximated by:

$$R \approx \log_2(\overline{L}) + 2. \quad (27)$$

However, it can be observed in FIG. 10 that while this approximation is remarkably good for low values of σ, the difference from the entropy grows quite quickly, showing a weakness in NBC coding and motivation for developing the new coding methods. The results from the newly proposed ENBC, on the other hand, are significantly better and more consistent for small values of σ, and approach the same results or NBC for larger values.

Figure 11:
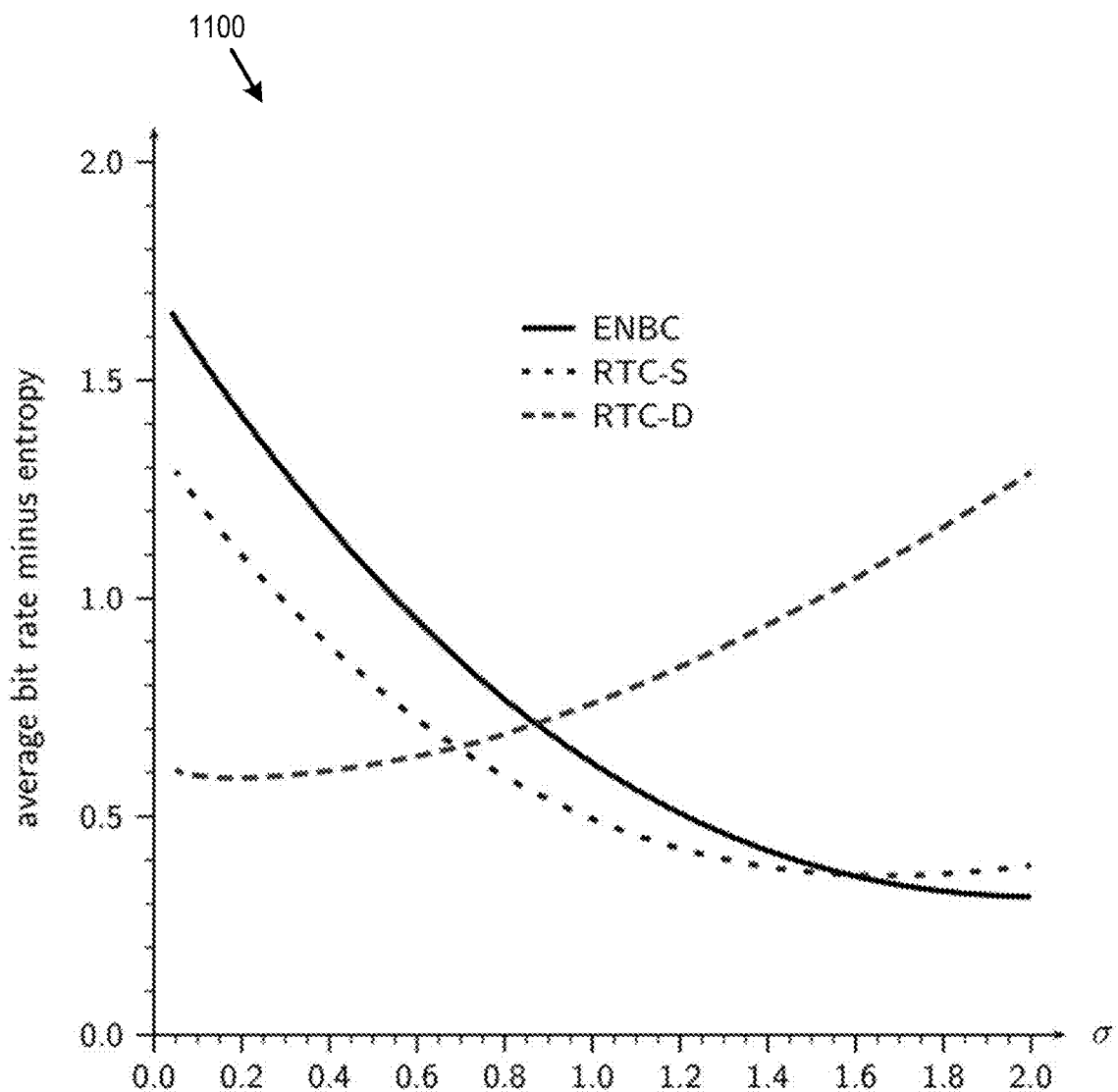
FIG. 11 is a graph illustrating a comparison of compression methods applied to sequences with a log-normal distribution, in accordance with aspects described herein.

FIG. 11 is a graph 1100 providing an illustrative example of results obtained with the new RTC-S and RTC-D compression methods applied to sequences with log-normal distribution, compared to ENBC. In some cases, RTC-D is significantly better for lower values of σ, but may be less efficient when values of σ increases, due to the overhead of coding minimum values that are very small. RTC-S can perform better than ENBC for most values, and only slightly worse for the largest values of σ.

In some aspects, because the RTC-S and RTC-D methods can perform well at different ranges of σ, a new method referred to as Adaptive Range Tree Coding (RTC-A) can be performed. For example, RTC-A can switch adaptively between RTC-S and RTC-D. In some cases, such as due to the value σ not being assumed to be known, an example condition that can be used to select RTC-D can be when:

$$\max(l_1, l_2, l_3, \ldots, l_N) < 32 \times \min(l_1, l_2, l_3, \ldots, l_N) \quad (28)$$

and select RTC-S otherwise.

Figure 12:
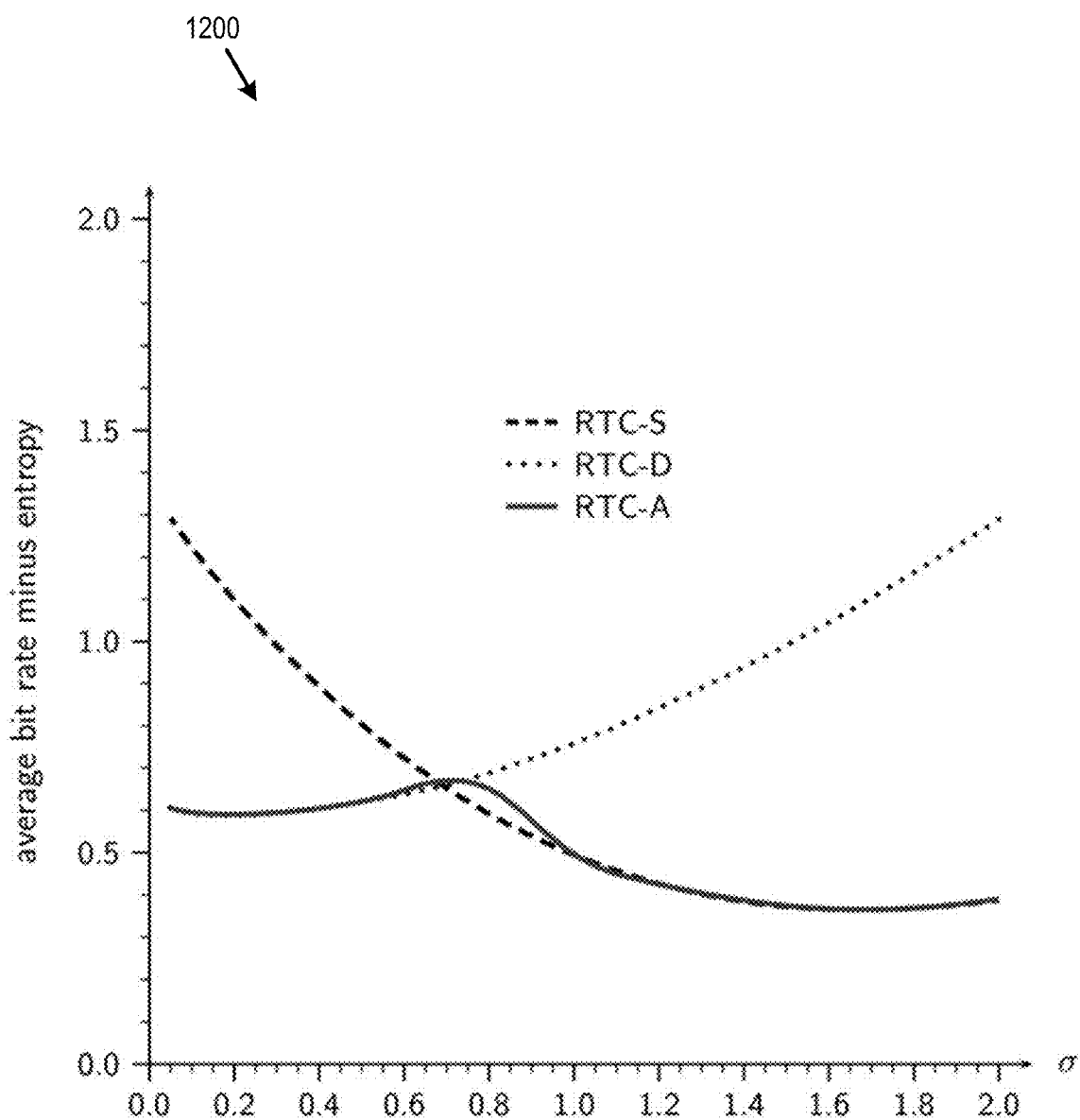
FIG. 12 is a graph illustrating a combination of compression methods to create an adaptive method, which switches coding methods depending on the ratio between maximum and minimum values, in accordance with aspects described herein.

FIG. 12 is a graph 1200 providing an illustrative example of results obtained using the RTC-S algorithm implementing the combination of compression methods. For instance, as noted above, RTC-A can switch between RTC-S and RTC-D coding methods depending on the ratio between maximum and minimum values. It can be observed that the thresholding approach shown above in eq. (28) results in a smooth transition in compression performance, yielding better results more consistently.

From FIG. 9 and FIG. 10, it can be observed that the NBC compression method works equally well, nearly independently of the scale of the integers being coded, can have its bit rate estimated with $\log_2(\overline{L})+2$, and the difference between the bit rate and the entropy increases very quickly when the variance gets small. ENBC can overcome at least the last problem, and the two new RTC-S and RTC-D coding methods can maintain good performance independently of the scale, but that include lower bounds during coding. It is experimentally shown that these algorithm additions significantly improve compression, and without the fast growth in the difference between bit rates and entropy when the variance approaches zero.

Figure 13A:
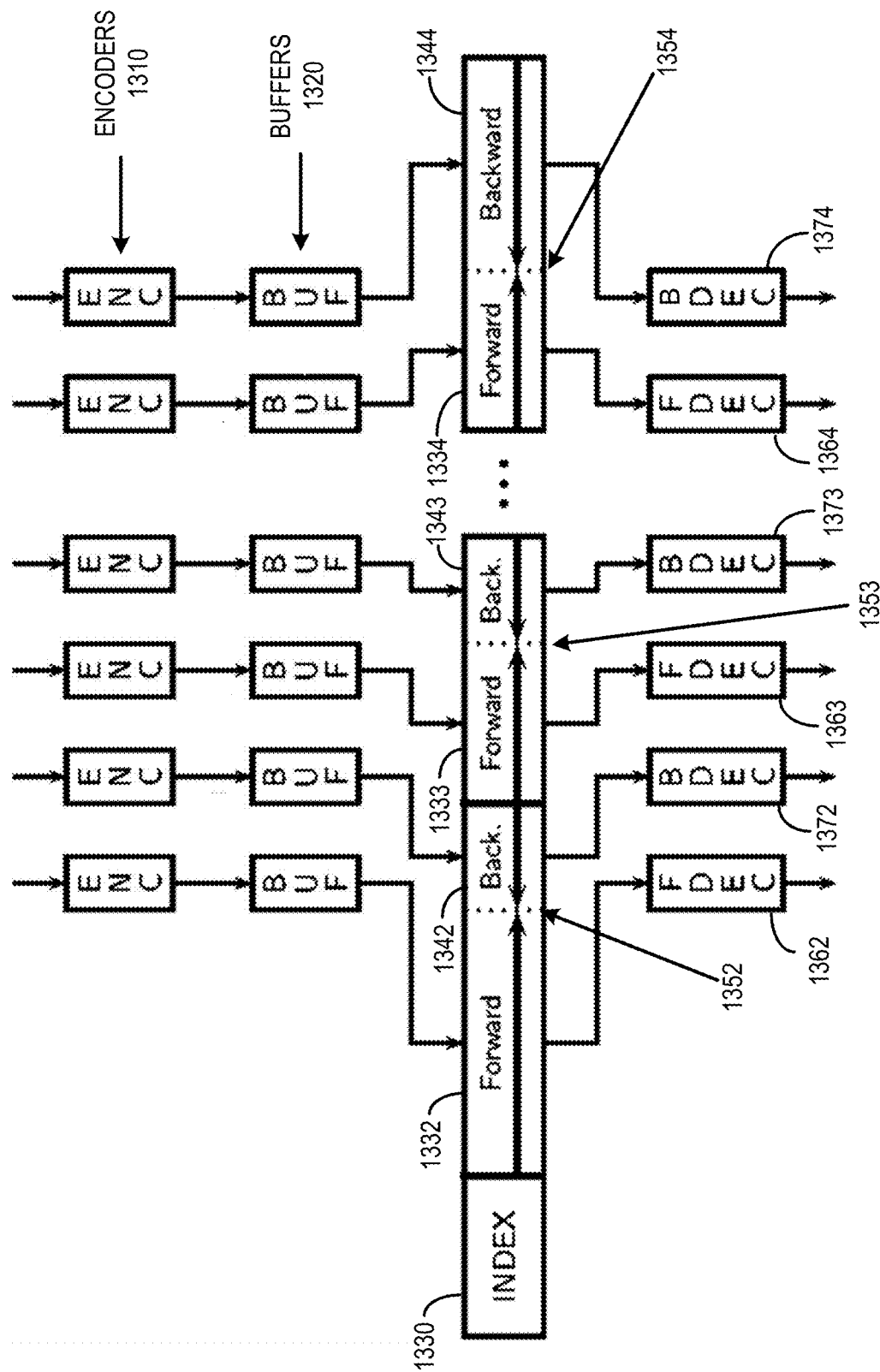
FIG. 13A is a diagram illustrating aspects of parallel coding for independently entropy codable parcels, in accordance with aspects described herein.

FIG. 13A is a diagram illustrating aspects of parallel coding for independently entropy codable parcels in accordance with examples described herein. FIG. 13A illustrates a diagram similar to the diagram of FIG. 4A, with additional improvements to reduce coding overhead for parallelization of entropy coding. As described above, an index identifies parcels and entry points, either using a number of bits and a position for each parcel, or using entry points (e.g., each of which can be used to identify the other data, with entry points identifiable from parcel bits and positions, and parcel bits and positions identifiable from entry points). Because adjacent parcels share a common boundary, a single entry point can be used to define the position of two parcels. In such an example, parcels can be defined either as forward parcels or backwards parcels. Encoder units 1310 and buffers 1320 can operate just as the encoder units and buffers of FIG. 4A, but rather than an entry point identified at a start or end of each parcel as described in FIG. 4B, pairs of parcels can be identified in association with the shared boundary between the parcels, and the entry points in index 1330 can be halved.

For example, as shown, FIG. 13A includes forward parcels 1332, 1333, and 1334, and backwards parcels 1342, 1343, and 1344. The parcels form pairs joined at entry points 1352, 1353, and 1354, such that a first pair of parcels 1332 and 1342 are joined by entry point 1352, a second pair of parcels 1333 and 1343 are joined by entry point 1353, and a third pair of parcels 1334 and 1344 are joined by entry point 1354. Defining forward and backward parcels as pairs with a shared entry point as shown allows bidirectional byte packing for parallel entropy coding, with half the number of entry points in index 1330 compared with index 430 without bidirectional byte packing. The forward parcels are then decoded by forward decoder units 1362, 1363, and 1364, and backward parcels are decoded by backward decoder units 1372, 1373, and 1374. The decoders can operate with the implementations described above, but with forward decoders incrementing the byte counter from during decoding, and backwards decoders decrementing the byte counter to decode the corresponding parcels. Just as above, parcel pairs remain independently decodable, and do not need to be decoded by specific pairs of decoder units. In some examples, decoders can be configured to decode either forward or backwards parcels, while in other units, decoders are customized to efficiently decode either forward or backwards parcels, but not both, as illustrated by FIG. 13A. Such examples further improve the operations of a coding system and devices in the coding system by reducing overhead, improving throughput, and reducing power consumption (e.g., as associated with the reduced overhead).

Figure 13B:
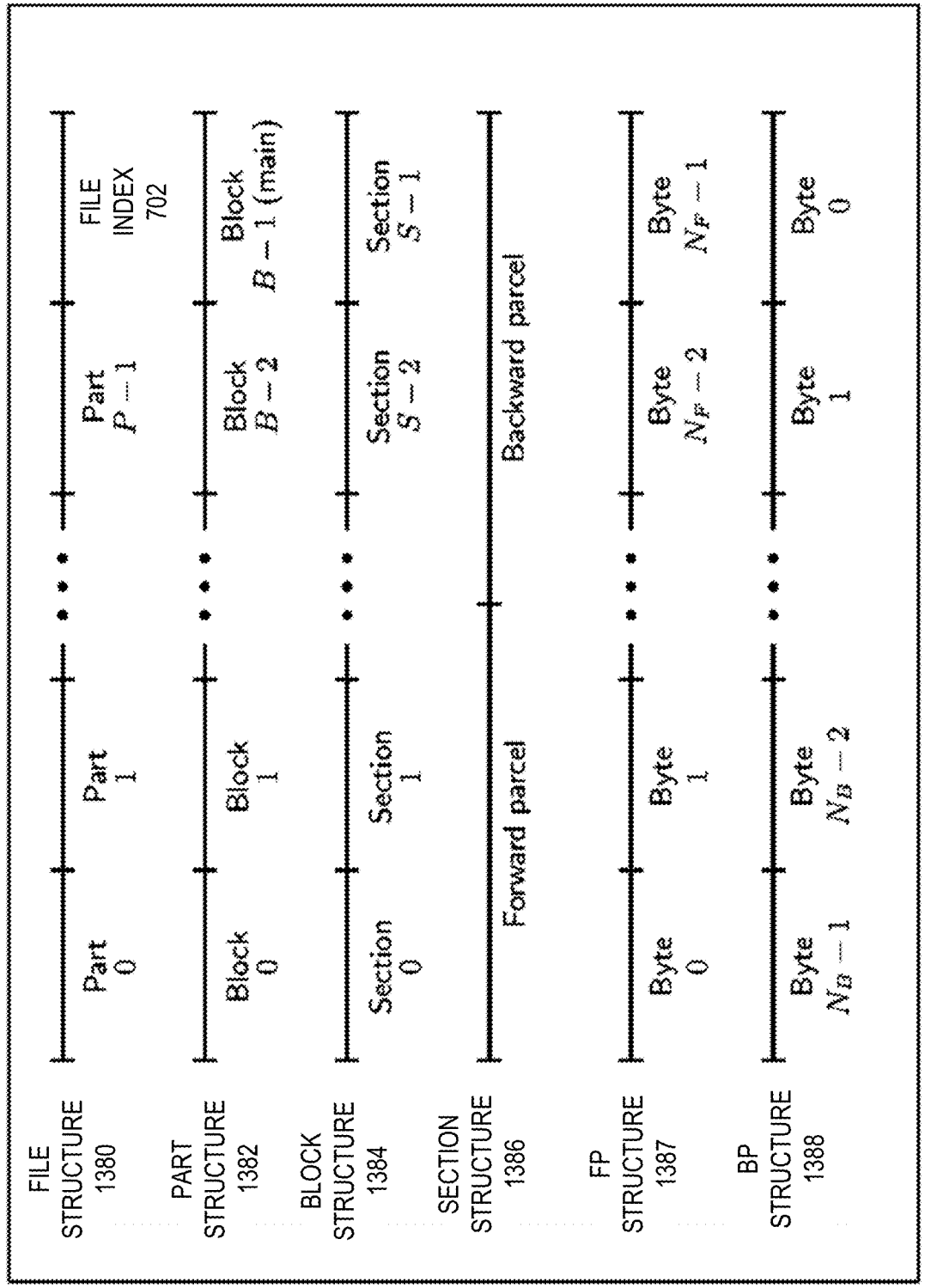
FIG. 13B illustrates a file structure for use with parallel coding of independently entropy codable parcels of a sequence of video data, in accordance with aspects described herein.

FIG. 13B illustrates a file structure 1380 for use with parallel coding of independently entropy codable parcels of a sequence of video data in accordance with examples described herein. The file structure 1380 includes P parts along with a file index 702, similar to index 1330 as described above. The parts of file structure 1382 in the example of FIG. 7 include B blocks, and the blocks of block structure 1384 each contain S sections. The example structure for parallel entropy coding provides a unified hierarchical organization that can be used with the parcels described above, and with minimal overhead. The structure can allow user control of file open and close operations, and start and stop operations at any part element of file structure 1380 (e.g., part 0, part 1, part P–1, etc.). In some implementations, for example, the part elements can be used for video frames, and blocks of part structure 1382 (e.g., block 0, block 1, block B–2, etc., of any part element using part structure 1382 in file structure 1380) can be associated with video codec function calls. A main block can include scalars for a part, with individual non-main blocks containing vector data. In some implementations, sector and parcel usage can be automated using neural network coding in conjunction with the above described parallel entropy coding operations.

The section structure 1386 includes structure for a parcel pair including a forward parcel and a backwards parcel as described above. In some situations, an odd number of parcels may be present, such that a section may contain only a forward or a backwards parcel, but the pair structure of the sections allows byte packing as described above with respect to FIG. 13A. Each forward parcel can then have Nf bytes as defined by forward parcel structure 1387, and each backwards parcel can have Nb bytes as defined by backwards parcel structure 1388. As described above, thresholds can be placed on the number of bytes, and in some examples, the thresholds can be the same or different for forward parcels and backwards parcels. In either case, the threshold can include both an upper and a lower limit on the number of bytes allowable for a given parcel to allow orderly bisection of video data, and to simplify coding and improve the operation of coding devices by limiting the variation in parcel sizes to be coded.

Figure 14A:
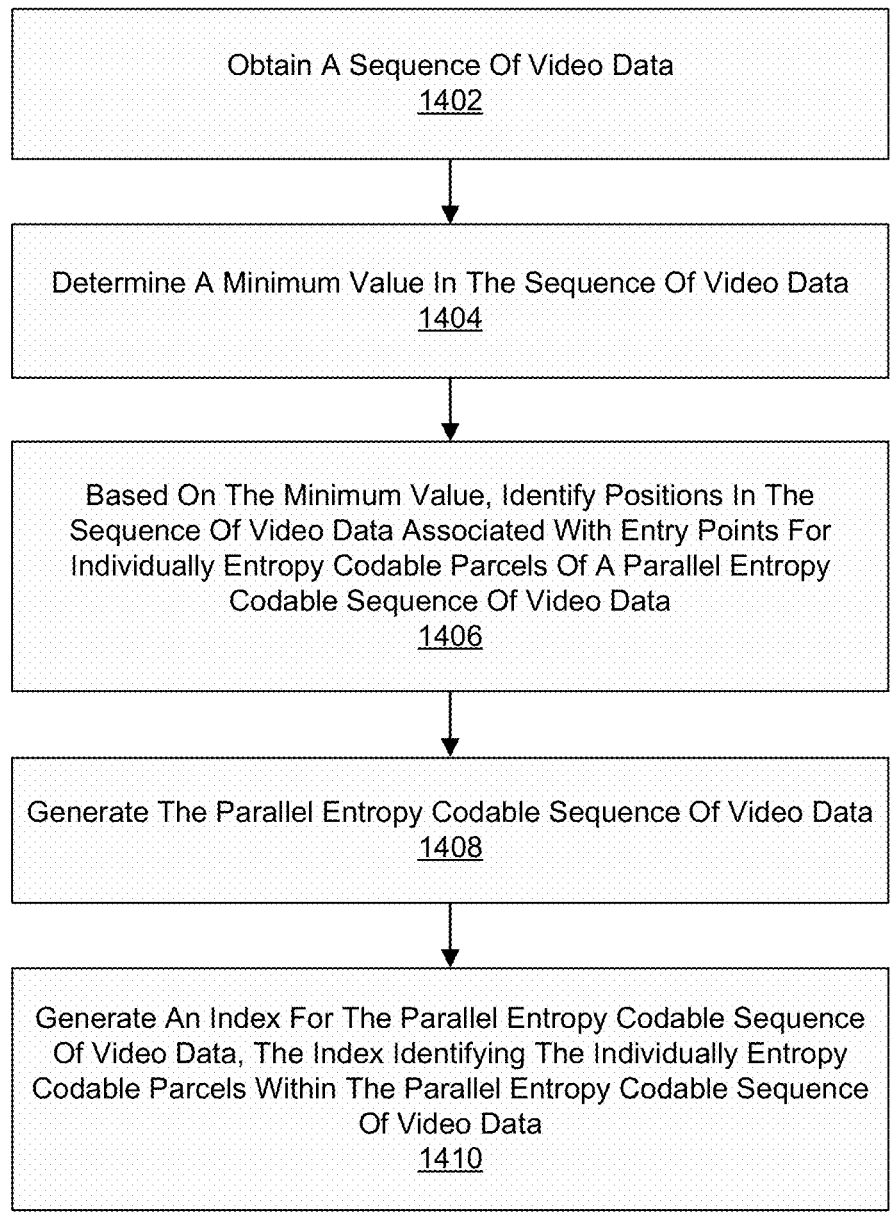
FIG. 14A is a flowchart illustrating an example of a process for processing video data, in accordance with some examples.

FIG. 14A is a flowchart illustrating an example of a process 1400 of processing video using the ENBC techniques described herein. The process 1400 can be performed by a computing device configured to encode video data, such as an encoding device (e.g., the encoding device 204 of FIG. 2, the machine learning coding system 310 of FIG. 3, the encoder portion 362 of the machine learning coding system 310, the system of FIG. 13A, etc.) or a component (e.g., a codec, chipset, one or more processors, any combination thereof, and/or other component) of the encoding device. In some cases, computing device is, includes, or can be part of a mobile device (e.g., a mobile phone), an extended reality (XR) device (e.g., a virtual reality (VR) device or augmented reality (AR) device), a vehicle or component or system of a vehicle, a network-connected wearable such as a watch, or other type of computing device. The operations of the process 1400 may be implemented as software components that are executed and run on one or more processors (e.g., the processor 1710 of FIG. 17, or other processor(s)). Further, the transmission and reception of signals by the computing device in the process 1400 may be enabled, for example, by one or more antennas, one or more transceivers (e.g., wireless transceiver(s)), and/or other communication components (e.g., the communication interface 1740 of FIG. 17, or other antennae(s), transceiver(s), and/or component(s)).

At block 1402, the computing device (or component thereof) can obtain a sequence of video data. At block 1404, the computing device (or component thereof) can determine a minimum value (e.g., (min) in the sequence of video data. For instance, as described previously, the computing device can determine a minimum value in the whole sequence as $l_{min}=\min\{l_1, l_2, l_3, \ldots, l_N\}$.

At block 1406, the computing device (or component thereof) can, based on the minimum value, identify positions in the sequence of video data associated with entry points for individually entropy codable parcels of a parallel entropy codable sequence of video data. In some aspects, to identify the positions in the sequence of video data associated with the entry points based on the minimum value, the computing device (or component thereof) can constrain values for the positions in the sequence of video data associated with the entry points based on the minimum value. In some cases, to identify the positions in the sequence of video data associated with the entry points, the computing device (or component thereof) can perform a bisection enumeration (e.g., the outer and/or inner outer bisection enumerations described above) of the sequence of video data. In one illustrative example, as described above, for integer sets (for indexes (i) and positions (p)) $(i_{min}, i_{max})$, $[p_{min}, p_{max}]$, $(i_{min}, i_{max})=\{i_{min}+1, i_{min}+2, \ldots, i_{max}-2, i_{max}-1\}$ and $[p_{min}, p_{max}]=\{p_{min}, p_{min}+1, \ldots, p_{max}-1, p_{max}\}$, the minimum value $l_{min}$ can be used to further constrain values as follows: $i \in (i_{min}, i_{max}) \Rightarrow p_i \in [p_{min}+(i-i_{min}) \cdot l_{min}, p_{max}-(i_{max}-i) \cdot l_{min}]$. In some cases, to perform the bisection enumeration, the computing device (or component thereof) can bisect the sequence of video data to identify an initial position of the positions (where the initial position is associated with a first entry point and subsequences divided by the initial position) and bisect tiers of subsequences to identify a remaining portion of the positions. An illustrative example of such bisection enumeration is shown in FIG. 5. In some examples, the individually entropy codable parcels include corresponding data from the sequence of video data determined by the positions, and the information associated with the individually entropy codable parcels. For instance, the information associated with the individually entropy codable parcels can include information associated with a magnitude of a binary representation of the corresponding data from the sequence of video data. In some aspects, a difference between a largest parcel and a smallest parcel of the individually entropy codable parcels is less than a threshold difference.

At block 1408, the computing device (or component thereof) can generate the parallel entropy codable sequence of video data. In some cases, the computing device (or component thereof) can generate the parallel entropy codable sequence of video data at least in part by performing a bisection search to encode information associated with the individually entropy codable parcels with data from the sequence of video data determined by the positions to generate the individually entropy codable parcels.

At block 1410, the computing device (or component thereof) can generate an index for the parallel entropy codable sequence of video data, the index identifying the individually entropy codable parcels within the parallel entropy codable sequence of video data. In some cases, the index identifies the individually entropy codable parcels using the entry points as identified following encoding of the sequence of video data in an encoded bitstream. Additionally or alternatively, in some cases, the index identifies the individually entropy codable parcels including identifying a bit length and a position of each parcel in an encoded video bitstream generated from the sequence of video data In some aspects, to generate the parallel entropy codable sequence, the computing device (or component thereof) can identify a number of parcels to define a set of individually entropy codable parcels from a first parcel to a last parcel having sizes between a minimum parcel size and a maximum parcel size as constrained by the minimum value. For instance, parcel sizes of the number of parcels can sum to a size of the parallel entropy codable sequence. In some cases, to generate the parallel entropy codable sequence of video data, the computing device (or component thereof) can further initialize a stack in the at least one memory including a number of parcels and a magnitude of a binary representation of corresponding data for the number of parcels. The computing device (or component thereof) can generate the parallel entropy codable sequence of video data at least in part by performing the following operations until the stack is empty: analyzing the stack to retrieve current interval sets (e.g., popping stack to retrieve current interval sets $(i_{min}, i_{max})$, $[p_{min}, p_{max}]$); selecting a parcel by defining a new index for the parcel as a representative value (e.g., an average of the current interval sets or other representative value, such as $i=\lfloor(i_{min}+i_{max})/2\rfloor$) of the current interval sets; using bisection to encode bits of the parcel based on the minimum value (e.g., using bisection to encode $p_i \in [p_{min}+(i-i_{min}) \cdot 1_{min}, p_{max}-(i_{max}-i) \cdot 1_{min}]$); updating the stack with sets from the first parcel to the parcel when the parcel is not the first parcel; and updating the stack with sets from the parcel to the last parcel when the parcel is not the last parcel.

In some cases, the computing device (or component thereof) can initialize the stack with a universal codeword set (e.g., the Elias delta code, or any other such code set). In some cases, to use bisection to encode the bits of the parcel based on the minimum value, the computing device (or component thereof) can initialize a first variable to the minimum parcel size as constrained by the minimum value, a second variable to the maximum parcel size as constrained by the minimum value, and a third variable to an average of the minimum parcel size and the maximum parcel size. For instance, as described, given $p_i$ and $p_{min}, p_{max}$, the computing device (or component thereof) can initialize variables $a \leftarrow p_{min}$ (as an example of the first variable), $b \leftarrow p_{max}$ (as an example of the second variable), and $c \leftarrow \lfloor(a+b)/2\rfloor$ (as an example of the third variable). As another example, according to some aspects, the first, second, and third variables can be determined as follows (where a is an example of the first variable, b is an example of the second variable, and c is an example of the third variable):

$$a = \text{pos\_min} + (i - \text{idx\_min}) * 1\_\text{min};$$

$$b = \text{pos\_max} - (\text{idx\_max} - i) * 1\_\text{min} + 1;$$

$$c = (a + b) \gg 1;$$

The computing device (or component thereof) can access a value for a magnitude (e.g., $p_i$ or position[i]) of a binary representation of the parcel. In some cases, the computing device (or component thereof) can encode a first bit when the third variable is less than or equal to the value. For instance, as noted above, if $c \leq p_i$, then the computing device (or component thereof) can encode bit "1" and set $a \leftarrow c$ (e.g., if (c<=position[i]), then encode_bit(1) and a=c). In some cases, the computing device (or component thereof) can encode a second bit when the third variable is greater than the value. For instance, as described above, if $c > p_i$, then the computing device (or component thereof) can encode bit "0" and set $b \leftarrow c$ (e.g., if (c>position[i]), then encode_bit(0) and b=c). The computing device (or component thereof) can update the third variable to a new average (or other representative value) of the first variable and the second variable. For example, as described previously, the computing device (or component thereof) can update $c \leftarrow \lfloor(a+b)/2\rfloor$ (e.g., c=(a+b)>>1 based on the updated first variable a or updated second variable b).

In some aspects, the computing device (or component thereof) can define parcels of the individually entropy codable parcels as forward parcels or backwards parcels (e.g., as shown in FIG. 13A). In such aspects, a corresponding parcel pair can include a corresponding forward parcel and a corresponding backwards parcel defined using a single shared entry point in the index. In some cases, the index includes N/2 entry points when a number of the individually entropy codable parcels is even, and the index includes [(N−1)/2]+1 entry points when the number of the individually entropy codable parcels is odd. In some examples, the computing device (or component thereof) can store the individually entropy codable parcels in at least one memory structured as a file. The file can have a file structure including the index and a plurality of parts, with each part including a plurality of blocks, each block including a plurality of sections, and each section including a forward parcel structure and a backward parcel structure for a corresponding forward parcel and the corresponding backwards parcel of the corresponding parcel pair. In some cases, the computing device (or component thereof) can transmit the file (or output the file for transmission) including the index and the individually entropy codable parcels for transmission.

In some cases, the computing device includes a transmitter configured to transmit the sequence of video data as entropy encoded using the index and the individually entropy codable parcels. In some cases, the computing device includes a display coupled to the at least one processor and configured to display images of the sequence of video data.

FIG. 14B is a flowchart illustrating another example of a process 1450 of processing video using the ENBC techniques described herein. The process 1400 can be performed by a computing device configured to decode video data, such as a decoding device (e.g., the decoding device 212 of FIG. 2, the machine learning coding system 310 of FIG. 3, the decoder portion 366 of the machine learning coding system 310, the system of FIG. 13A, etc.) or a component (e.g., a codec, chipset, one or more processors, any combination thereof, and/or other component) of the decoding device. In some cases, computing device is, includes, or can be part of a mobile device (e.g., a mobile phone), an extended reality (XR) device (e.g., a virtual reality (VR) device or augmented reality (AR) device), a vehicle or component or system of a vehicle, a network-connected wearable such as a watch, or other type of computing device. The operations of the process 1400 may be implemented as software components that are executed and run on one or more processors (e.g., the processor 1710 of FIG. 17, or other processor(s)). Further, the transmission and reception of signals by the computing device in the process 1400 may be enabled, for example, by one or more antennas, one or more transceivers (e.g., wireless transceiver(s)), and/or other communication components (e.g., the communication interface 1740 of FIG. 17, or other antennae(s), transceiver(s), and/or component(s)).

At block 1452, the computing device (or component thereof) can obtain a stream of encoded video data including an index and a parallel entropy codable sequence of video data, the parallel entropy codable sequence of video data including individually entropy codable parcels identifiable using the index.

At block 1454, the computing device (or component thereof) can decode the index for data associated with the individually entropy codable parcels.

At block 1456, the computing device (or component thereof) can identify the individually entropy codable parcels from the stream of encoded video data using the data from the index and a minimum value associated with the parallel entropy codable sequence of video data.

At block 1458, the computing device (or component thereof) can decode the individually entropy codable parcels from the stream of encoded video data in parallel using the data as decoded from the index.

Figure 17:
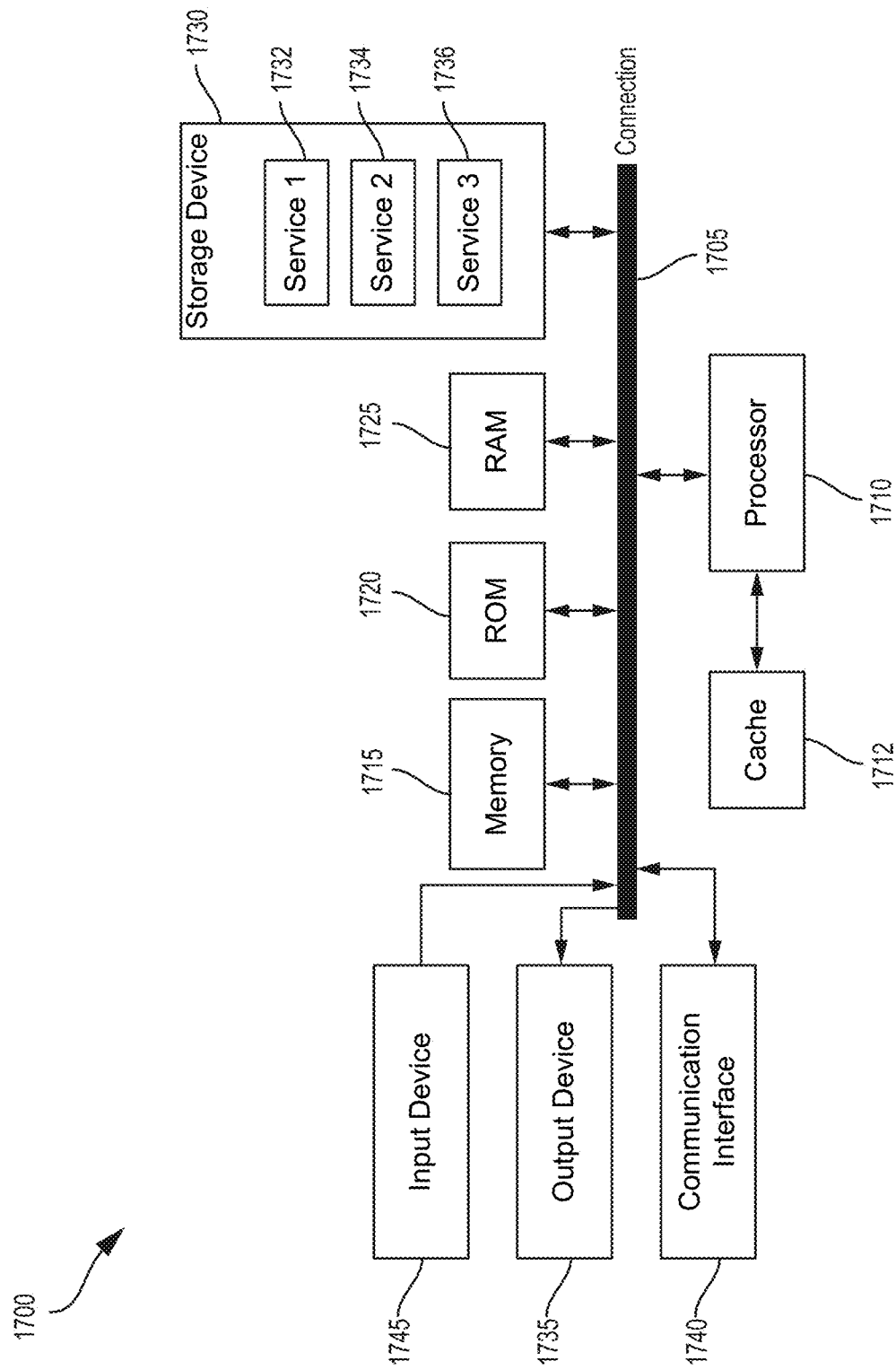
FIG. 17 illustrates an example computing device architecture of an example computing device which can implement the various techniques described herein.

In some examples, the processes described herein (e.g., process 1400, process 1450, and/or other process described herein) may be performed by a computing device or apparatus, such as a computing device having the computing device architecture 1700 shown in FIG. 17. In some examples, the computing device can include a mobile device (e.g., a mobile phone, a tablet computing device, etc.), a wearable device, an extended reality device (e.g., a virtual reality (VR) device, an augmented reality (AR) device, or a mixed reality (MR) device), a personal computer, a laptop computer, a video server, a television, a vehicle (or a computing device of a vehicle), robotic device, and/or any other computing device with the resource capabilities to perform the processes described herein, including process 1400 and/or process 1450.

In some cases, the computing device or apparatus may include various components, such as one or more input devices, one or more output devices, one or more processors, one or more microprocessors, one or more microcomputers, one or more transmitters, receivers or combined transmitter-receivers (e.g., referred to as transceivers), one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), neural processing units (NPUs), and/or other suitable electronic circuits), and/or can include and/or be implemented using computer software, firmware, or any combination thereof, to perform the various operations described herein.

The process 1400 and the process 1450 are illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein (including process 1400, process 1450, and/or other processes described herein) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

As noted previously, some video coding systems utilize neural networks or other machine learning systems to compress video and/or image data. Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 15A:
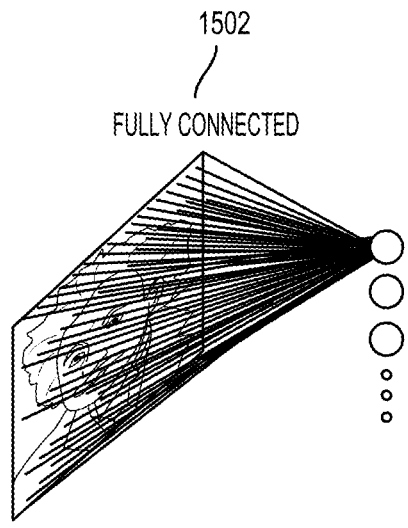
FIG. 15A illustrates an example of a fully connected neural network, in accordance with some examples.
Figure 15B:
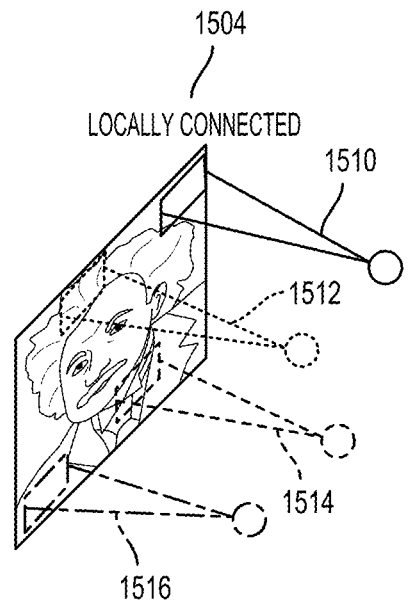
FIG. 15B illustrates an example of a locally connected neural network, in accordance with some examples.

The connections between layers of a neural network may be fully connected or locally connected. FIG. 15A illustrates an example of a fully connected neural network 1502. In a fully connected neural network 1502, a neuron in a first layer may communicate its output to every neuron in a second layer, so that each neuron in the second layer will receive input from every neuron in the first layer. FIG. 15B illustrates an example of a locally connected neural network 1504. In a locally connected neural network 1504, a neuron in a first layer may be connected to a limited number of neurons in the second layer. More generally, a locally connected layer of the locally connected neural network 1504 may be configured so that each neuron in a layer will have the same or a similar connectivity pattern, but with connections strengths that may have different values (e.g., 1510, 1512, 1514, and 1516). The locally connected connectivity pattern may give rise to spatially distinct receptive fields in a higher layer, because the higher layer neurons in a given region may receive inputs that are tuned through training to the properties of a restricted portion of the total input to the network.

Figure 15C:
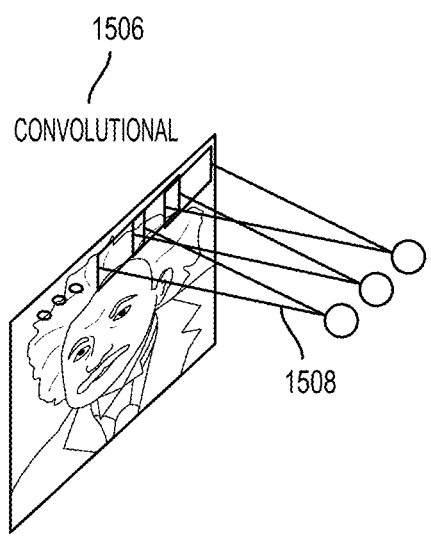
FIG. 15C illustrates an example of a convolutional neural network, in accordance with some examples.

One example of a locally connected neural network is a convolutional neural network. FIG. 15C illustrates an example of a convolutional neural network 1506. The convolutional neural network 1506 may be configured such that the connection strengths associated with the inputs for each neuron in the second layer are shared (e.g., 1508). Convolutional neural networks may be well suited to problems in which the spatial location of inputs is meaningful. Convolutional neural network 1506 may be used to perform one or more aspects of video compression and/or decompression, according to aspects of the present disclosure.

Figure 15D:
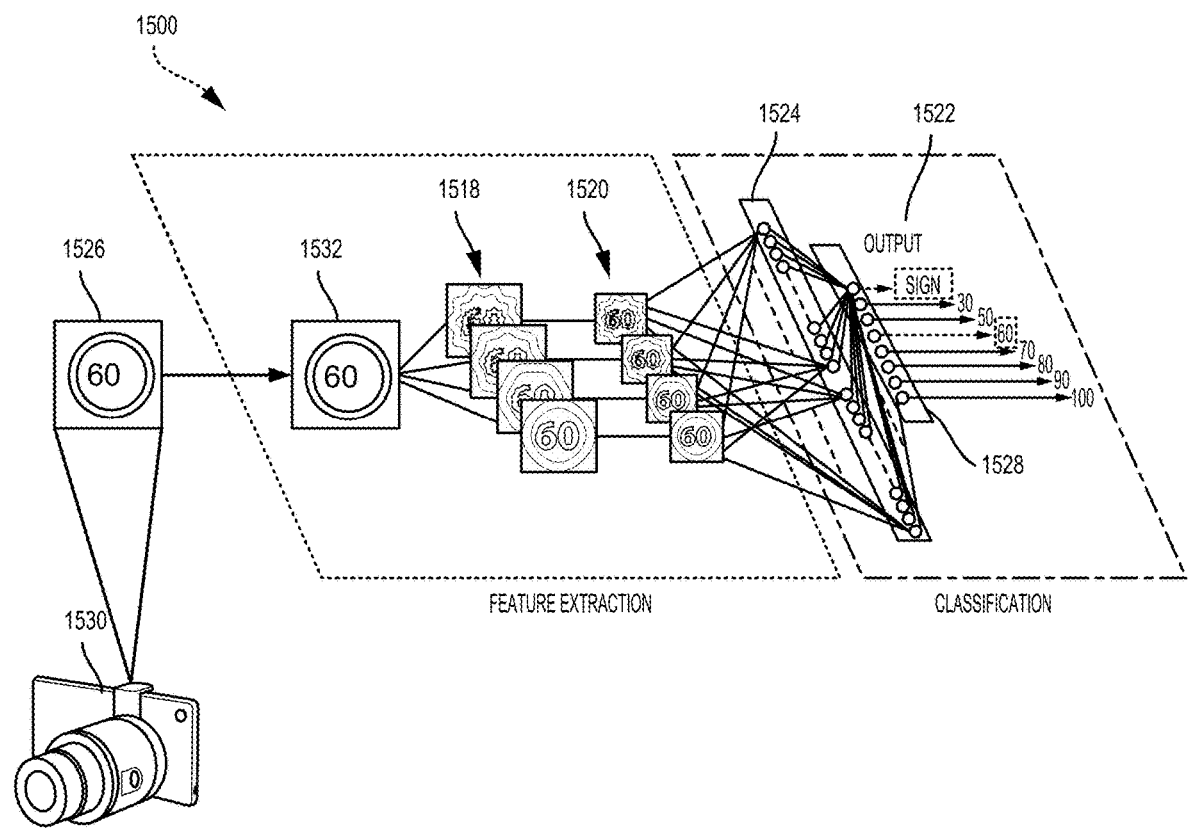
FIG. 15D illustrates a detailed example of a deep convolutional network (DCN) designed to recognize visual features from an image, in accordance with some examples.

One type of convolutional neural network is a deep convolutional network (DCN). FIG. 15D illustrates a detailed example of a DCN 1500 designed to recognize visual features from an image 1526 input from an image capturing device 1530, such as a car-mounted camera. The DCN 1500 of the current example may be trained to identify traffic signs and a number provided on the traffic sign. Of course, the DCN 1500 may be trained for other tasks, such as identifying lane markings or identifying traffic lights.

The DCN 1500 may be trained with supervised learning. During training, the DCN 1500 may be presented with an image, such as the image 1526 of a speed limit sign, and a forward pass may then be computed to produce an output 1522. The DCN 1500 may include a feature extraction section and a classification section. Upon receiving the image 1526, a convolutional layer 1532 may apply convolutional kernels (not shown) to the image 1526 to generate a first set of feature maps 1518. As an example, the convolutional kernel for the convolutional layer 1532 may be a 5×5 kernel that generates 28×28 feature maps. In the present example, because four different feature maps are generated in the first set of feature maps 1518, four different convolutional kernels were applied to the image 1526 at the convolutional layer 1532. The convolutional kernels may also be referred to as filters or convolutional filters.

The first set of feature maps 1518 may be subsampled by a max pooling layer (not shown) to generate a second set of feature maps 1520. The max pooling layer reduces the size of the first set of feature maps 1518. That is, a size of the second set of feature maps 1520, such as 14×14, is less than the size of the first set of feature maps 1518, such as 28×28. The reduced size provides similar information to a subsequent layer while reducing memory consumption. The second set of feature maps 1520 may be further convolved via one or more subsequent convolutional layers (not shown) to generate one or more subsequent sets of feature maps (not shown).

In the example of FIG. 15D, the second set of feature maps 1520 is convolved to generate a first feature vector 1524. Furthermore, the first feature vector 1524 is further convolved to generate a second feature vector 1528. Each feature of the second feature vector 1528 may include a number that corresponds to a possible feature of the image 1526, such as "sign," "60," and "100." A softmax function (not shown) may convert the numbers in the second feature vector 1528 to a probability. As such, an output 1522 of the DCN 1500 is a probability of the image 1526 including one or more features.

In the present example, the probabilities in the output 1522 for "sign" and "60" are higher than the probabilities of the others of the output 1522, such as "30," "40," "50," "70," "80," "90," and "100". Before training, the output 1522 produced by the DCN 1500 is likely to be incorrect. Thus, an error may be calculated between the output 1522 and a target output. The target output is the ground truth of the image 1526 (e.g., "sign" and "60"). The weights of the DCN 1500 may then be adjusted so the output 1522 of the DCN 1500 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 1522 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information associated with the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 1520) receiving input from a range of neurons in the previous layer (e.g., feature maps 1518) and from each of the multiple channels. The values in the feature map may be further processed with a non-linearity, such as a rectification, max (0,x). Values from adjacent neurons may be further pooled, which corresponds to down sampling, and may provide additional local invariance and dimensionality reduction.

Figure 16:
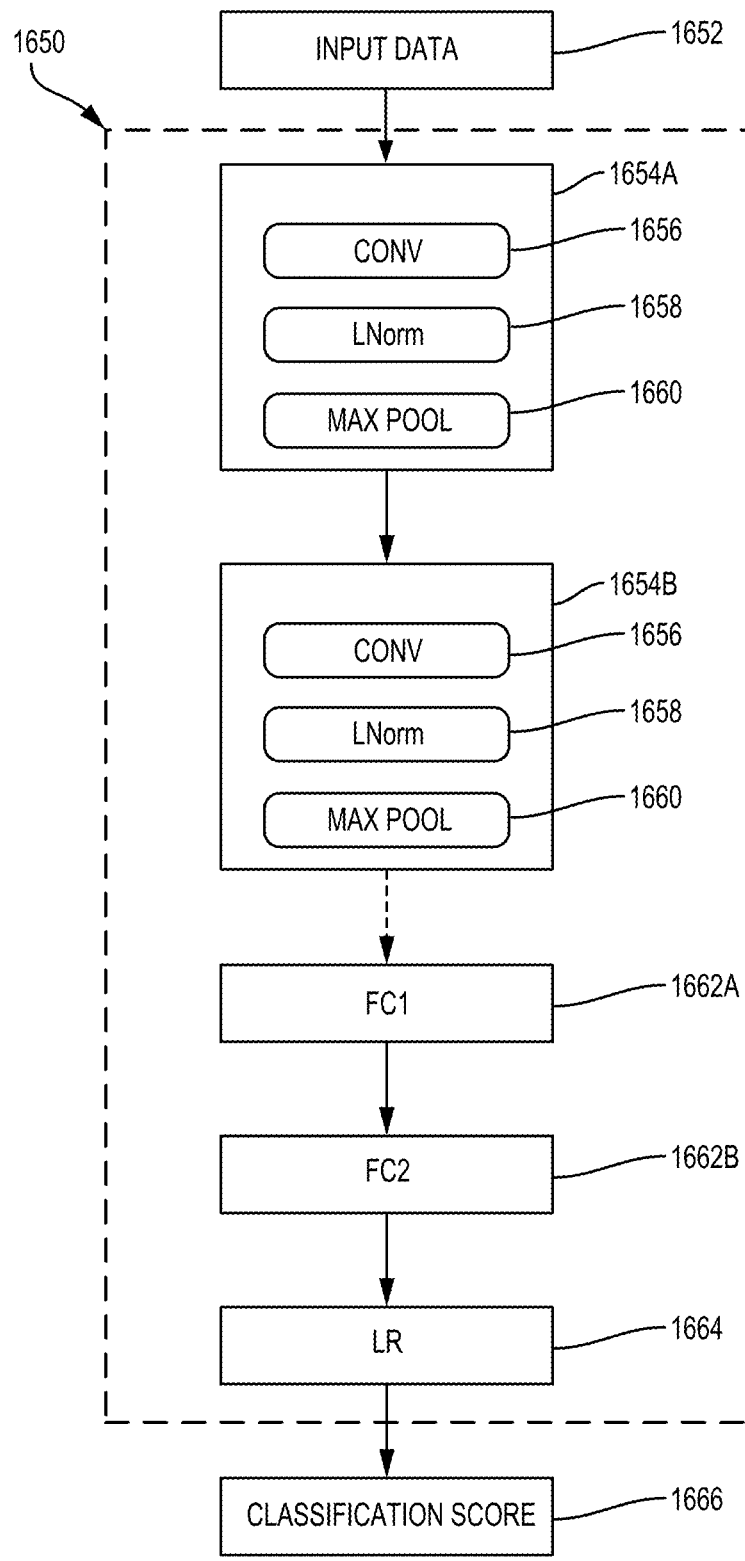
FIG. 16 is a block diagram illustrating a deep convolutional network (DCN), in accordance with some examples.

FIG. 16 is a block diagram illustrating an example of a deep convolutional network 1650. The deep convolutional network 1650 may include multiple different types of layers based on connectivity and weight sharing. As shown in FIG. 16, the deep convolutional network 1650 includes the convolution blocks 1654A, 1654B. Each of the convolution blocks 1654A, 1654B may be configured with a convolution layer (CONV) 1656, a normalization layer (LNorm) 1658, and a max pooling layer (MAX POOL) 1660.

The convolution layers 1656 may include one or more convolutional filters, which may be applied to the input data 1652 to generate a feature map. Although only two convolution blocks 1654A, 1654B are shown, the present disclosure is not so limiting, and instead, any number of convolution blocks (e.g., blocks 1654A, 1654B) may be included in the deep convolutional network 1650 according to design preference. The normalization layer 1658 may normalize the output of the convolution filters. For example, the normalization layer 1658 may provide whitening or lateral inhibition. The max pooling layer 1660 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative aspects, the parallel filter banks may be loaded on the DSP 106 or an ISP 116 of an SOC 100. In addition, the deep convolutional network 1650 may access other processing blocks that may be present on the SOC 100, such as sensor processor 114 and navigation module 120, dedicated, respectively, to sensors and navigation.

The deep convolutional network 1650 may also include one or more fully connected layers, such as layer 1662A (labeled "FC1") and layer 1662B (labeled "FC2"). The deep convolutional network 1650 may further include a logistic regression (LR) layer 1664. Between each layer 1656, 1658, 1660, 1662A, 1662B, 1664 of the deep convolutional network 1650 are weights (not shown) that are to be updated. The output of each of the layers (e.g., 1656, 1658, 1660, 1662A, 1662B, 1664) may serve as an input of a succeeding one of the layers (e.g., 1656, 1658, 1660, 1662A, 1662B, 1664) in the deep convolutional network 1650 to learn hierarchical feature representations from input data 1652 (e.g., images, audio, video, sensor data and/or other input data) supplied at the first of the convolution blocks 1654A. The output of the deep convolutional network 1650 is a classification score 1666 for the input data 1652. The classification score 1666 may be a set of probabilities, where each probability is the probability of the input data including a feature from a set of features.

FIG. 17 illustrates an example computing device architecture 1700 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing device architecture 1700 can be used as part of the system 200 of FIG. 2 and/or the system 300 of FIG. 3. The components of computing device architecture 1700 are shown in electrical communication with each other using connection 1705, such as a bus. The example computing device architecture 1700 includes a processing unit (CPU or processor) 1710 and computing device connection 1705 that couples various computing device components including computing device memory 1715, such as read only memory (ROM) 1720 and random access memory (RAM) 1725, to processor 1710.

Computing device architecture 1700 can include a cache of high-speed memory connected directly with, in close proximity to, or integrated as part of processor 1710. Computing device architecture 1700 can copy data from memory 1715 and/or the storage device 1730 to cache 1712 for quick access by processor 1710. In this way, the cache can provide a performance boost that avoids processor 1710 delays while waiting for data. These and other modules can control or be configured to control processor 1710 to perform various actions. Other computing device memory 1715 may be available for use as well. Memory 1715 can include multiple different types of memory with different performance characteristics. Processor 1710 can include any general purpose processor and a hardware or software service, such as service 1 1732, service 2 1734, and service 3 1736 stored in storage device 1730, configured to control processor 1710 as well as a special-purpose processor where software instructions are incorporated into the processor design. Processor 1710 may be a self-contained system, containing multiple cores or processors, a bus, memory controller, cache, etc. A multi-core processor may be symmetric or asymmetric.

To enable user interaction with the computing device architecture 1700, input device 1745 can represent any number of input mechanisms, such as a microphone for speech, a touch-sensitive screen for gesture or graphical input, keyboard, mouse, motion input, speech and so forth. Output device 1735 can also be one or more of a number of output mechanisms known to those of skill in the art, such as a display, projector, television, speaker device, etc. In some instances, multimodal computing devices can enable a user to provide multiple types of input to communicate with computing device architecture 1700. Communication interface 1740 can generally govern and manage the user input and computing device output. There is no restriction on operating on any particular hardware arrangement and therefore the basic features here may easily be substituted for improved hardware or firmware arrangements as they are developed.

Storage device 1730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1725, read only memory (ROM) 1720, and hybrids thereof. Storage device 1730 can include services 1732, 1734, 1736 for controlling processor 1710. Other hardware or software modules are contemplated. Storage device 1730 can be connected to the computing device connection 1705. In one aspect, a hardware module that performs a particular function can include the software component stored in a computer-readable medium in connection with the necessary hardware components, such as processor 1710, connection 1705, output device 1735, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors, and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates, and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for encoding video data, the apparatus comprising: at least one memory; and at least one processor coupled to the at least one memory, the at least one processor configured to: obtain a sequence of video data; determine a minimum value in the sequence of video data; based on the minimum value, identify positions in the sequence of video data associated with entry points for individually entropy codable parcels of a parallel entropy codable sequence of video data; generate the parallel entropy codable sequence of video data; and generate an index for the parallel entropy codable sequence of video data, the index identifying the individually entropy codable parcels within the parallel entropy codable sequence of video data.

Aspect 2. The apparatus of Aspect 1, wherein, to identify the positions in the sequence of video data associated with the entry points based on the minimum value, the at least one processor is configured to: constrain values for the positions in the sequence of video data associated with the entry points based on the minimum value.

Aspect 3. The apparatus of any one of Aspects 1 or 2, wherein, to identify the positions in the sequence of video data associated with the entry points, the at least one processor is configured to perform a bisection enumeration of the sequence of video data.

Aspect 4. The apparatus of Aspect 3, wherein the at least one processor is configured to generate the parallel entropy codable sequence of video data at least in part by performing a bisection search to encode information associated with the individually entropy codable parcels with data from the sequence of video data determined by the positions to generate the individually entropy codable parcels.

Aspect 5. The apparatus of Aspect 4, wherein, to perform the bisection enumeration, the at least one processor is configured to: bisect the sequence of video data to identify an initial position of the positions, wherein the initial position is associated with a first entry point and subsequences divided by the initial position; and bisect tiers of subsequences to identify a remaining portion of the positions.

Aspect 6. The apparatus of any one of Aspects 4 or 5, wherein the individually entropy codable parcels include corresponding data from the sequence of video data determined by the positions, and the information associated with the individually entropy codable parcels.

Aspect 7. The apparatus of Aspect 6, wherein the information associated with the individually entropy codable parcels includes information associated with a magnitude of a binary representation of the corresponding data from the sequence of video data.

Aspect 8. The apparatus of any one of Aspects 1 to 7, wherein a difference between a largest parcel and a smallest parcel of the individually entropy codable parcels is less than a threshold difference.

Aspect 9. The apparatus of any one of Aspects 1 to 8, wherein, to generate the parallel entropy codable sequence, the at least one processor is configured to: identify a number of parcels to define a set of individually entropy codable parcels from a first parcel to a last parcel having sizes between a minimum parcel size and a maximum parcel size as constrained by the minimum value, wherein parcel sizes of the number of parcels sums to a size of the parallel entropy codable sequence.

Aspect 10. The apparatus of Aspect 9, wherein, to generate the parallel entropy codable sequence of video data, the at least one processor is configured to: initialize a stack in the at least one memory including a number of parcels and a magnitude of a binary representation of corresponding data for the number of parcels; and generate the parallel entropy codable sequence of video data at least in part by performing the following operations until the stack is empty: analyzing the stack to retrieve current interval sets; selecting a parcel by defining a new index for the parcel as a representative value of the current interval sets; using bisection to encode bits of the parcel based on the minimum value; updating the stack with sets from the first parcel to the parcel when the parcel is not the first parcel; and updating the stack with sets from the parcel to the last parcel when the parcel is not the last parcel.

Aspect 11. The apparatus of Aspect 10, wherein the representative value of the current interval sets is an average of the current interval sets.

Aspect 12. The apparatus of any one of Aspects 10 or 11, wherein the at least one processor is configured to initialize the stack with a universal codeword set.

Aspect 13. The apparatus of any one of Aspects 10 to 12, wherein, to use bisection to encode the bits of the parcel based on the minimum value, the at least one processor is configured to: initialize a first variable to the minimum parcel size as constrained by the minimum value, a second variable to the maximum parcel size as constrained by the minimum value, and a third variable to an average of the minimum parcel size and the maximum parcel size; access a value for a magnitude of a binary representation of the parcel; encode a first bit when the third variable is less than or equal to the value; encode a second bit when the third variable is greater than the value; and update the third variable to a new average of the first variable and the second variable.

Aspect 14. The apparatus of any one of Aspects 1 to 13, wherein the at least one processor is configured to: define parcels of the individually entropy codable parcels as forward parcels or backwards parcels; wherein a corresponding parcel pair includes a corresponding forward parcel and a corresponding backwards parcel defined using a single shared entry point in the index.

Aspect 15. The apparatus of Aspect 14, wherein the index includes N/2 entry points when a number of the individually entropy codable parcels is even, and the index includes [(N−1)/2]+1 entry points when the number of the individually entropy codable parcels is odd.

Aspect 16. The apparatus of any one of Aspects 14 or 15, wherein the at least one processor is configured to: store the individually entropy codable parcels in the at least one memory structured as a file having a file structure including the index and a plurality of parts, each part including a plurality of blocks, each block including a plurality of sections, and each section including a forward parcel structure and a backward parcel structure for a corresponding forward parcel and the corresponding backwards parcel of the corresponding parcel pair.

Aspect 17. The apparatus of Aspect 16, wherein the at least one processor is configured to output the file including the index and the individually entropy codable parcels for transmission.

Aspect 18. The apparatus of any one of Aspects 1 to 17, wherein the index identifies the individually entropy codable parcels using the entry points as identified following encoding of the sequence of video data in an encoded bitstream.

Aspect 19. The apparatus of any one of Aspects 1 to 18, wherein the index identifies the individually entropy codable parcels including identifying a bit length and a position of each parcel in an encoded video bitstream generated from the sequence of video data.

Aspect 20. The apparatus of any one of Aspects 1 to 19, further comprising a transmitter coupled to the at least one processor and configured to transmit the sequence of video data as entropy encoded using the index and the individually entropy codable parcels.

Aspect 21. The apparatus of any one of Aspects 1 to 20, further comprising a display coupled to the at least one processor and configured to display images of the sequence of video data.

Aspect 22. A method of encoding video data, the method comprising: obtaining a sequence of video data; determining a minimum value in the sequence of video data; based on the minimum value, identifying positions in the sequence of video data associated with entry points for individually entropy codable parcels of a parallel entropy codable sequence of video data; generating the parallel entropy codable sequence of video data; and generating an index for the parallel entropy codable sequence of video data, the index identifying the individually entropy codable parcels within the parallel entropy codable sequence of video data.

Aspect 23. The method of Aspect 22, wherein identifying the positions in the sequence of video data associated with the entry points based on the minimum value comprises: constraining values for the positions in the sequence of video data associated with the entry points based on the minimum value.

Aspect 24. The method of any one of Aspects 22 or 23, wherein identifying the positions in the sequence of video data associated with the entry points comprises performing a bisection enumeration of the sequence of video data.

Aspect 25. The method of Aspect 24, further comprising generating the parallel entropy codable sequence of video data at least in part by performing a bisection search to encode information associated with the individually entropy codable parcels with data from the sequence of video data determined by the positions to generate the individually entropy codable parcels.

Aspect 26. The method of Aspect 25, wherein performing the bisection enumeration comprises: bisecting the sequence of video data to identify an initial position of the positions, wherein the initial position is associated with a first entry point and subsequences divided by the initial position; and bisecting tiers of subsequences to identify a remaining portion of the positions.

Aspect 27. The method of any one of Aspects 25 or 26, wherein the individually entropy codable parcels include corresponding data from the sequence of video data determined by the positions, and the information associated with the individually entropy codable parcels.

Aspect 28. The method of Aspect 27, wherein the information associated with the individually entropy codable parcels includes information associated with a magnitude of a binary representation of the corresponding data from the sequence of video data.

Aspect 29. The method of any one of Aspects 22 to 28, wherein a difference between a largest parcel and a smallest parcel of the individually entropy codable parcels is less than a threshold difference.

Aspect 30. The method of any one of Aspects 22 to 29, wherein generating the parallel entropy codable sequence comprises: identifying a number of parcels to define a set of individually entropy codable parcels from a first parcel to a last parcel having sizes between a minimum parcel size and a maximum parcel size as constrained by the minimum value, wherein parcel sizes of the number of parcels sums to a size of the parallel entropy codable sequence.

Aspect 31. The method of Aspect 30, wherein generating the parallel entropy codable sequence of video data comprises: initializing a stack in at least one memory including a number of parcels and a magnitude of a binary representation of corresponding data for the number of parcels; and generating the parallel entropy codable sequence of video data at least in part by performing the following operations until the stack is empty: analyzing the stack to retrieve current interval sets; selecting a parcel by defining a new index for the parcel as a representative value of the current interval sets; using bisection to encode bits of the parcel based on the minimum value; updating the stack with sets from the first parcel to the parcel when the parcel is not the first parcel; and updating the stack with sets from the parcel to the last parcel when the parcel is not the last parcel.

Aspect 32. The method of Aspect 31, wherein the representative value of the current interval sets is an average of the current interval sets.

Aspect 33. The method of any one of Aspects 31 or 32, further comprising initializing the stack with a universal codeword set.

Aspect 34. The method of any one of Aspects 31 to 33, wherein using bisection to encode the bits of the parcel based on the minimum value comprises: initializing a first variable to the minimum parcel size as constrained by the minimum value, a second variable to the maximum parcel size as constrained by the minimum value, and a third variable to an average of the minimum parcel size and the maximum parcel size; accessing a value for a magnitude of a binary representation of the parcel; encoding a first bit when the third variable is less than or equal to the value; encoding a second bit when the third variable is greater than the value; and updating the third variable to a new average of the first variable and the second variable.

Aspect 35. The method of any one of Aspects 22 to 34, further comprising: defining parcels of the individually entropy codable parcels as forward parcels or backwards parcels; wherein a corresponding parcel pair includes a corresponding forward parcel and a corresponding backwards parcel defined using a single shared entry point in the index.

Aspect 36. The method of Aspect 35, wherein the index includes N/2 entry points when a number of the individually entropy codable parcels is even, and the index includes [(N−1)/2]+1 entry points when the number of the individually entropy codable parcels is odd.

Aspect 37. The method of any one of Aspects 35 or 36, further comprising: storing the individually entropy codable parcels in at least one memory structured as a file having a file structure including the index and a plurality of parts, each part including a plurality of blocks, each block including a plurality of sections, and each section including a forward parcel structure and a backward parcel structure for a corresponding forward parcel and the corresponding backwards parcel of the corresponding parcel pair.

Aspect 38. The method of Aspect 37, further comprising transmitting the file including the index and the individually entropy codable parcels.

Aspect 39. The method of any one of Aspects 22 to 38, wherein the index identifies the individually entropy codable parcels using the entry points as identified following encoding of the sequence of video data in an encoded bitstream.

Aspect 40. The method of any one of Aspects 22 to 39, wherein the index identifies the individually entropy codable parcels including identifying a bit length and a position of each parcel in an encoded video bitstream generated from the sequence of video data.

Aspect 41. The method of any one of Aspects 22 to 40, further comprising transmitting the sequence of video data as entropy encoded using the index and the individually entropy codable parcels.

Aspect 42. The method of any one of Aspects 22 to 41, further comprising displaying images of the sequence of video data.

Aspect 43: A computer-readable storage medium storing instructions that, when executed, cause one or more processors to perform any of the operations of aspects 22 to 42.

Aspect 44: An apparatus comprising means for performing any of the operations of aspects 22 to 42.

Aspect 45. An apparatus for decoding video data, the apparatus comprising: at least one memory; and at least one processor coupled to the at least one memory, the at least one processor configured to: obtain a stream of encoded video data including an index and a parallel entropy codable sequence of video data, the parallel entropy codable sequence of video data including individually entropy codable parcels identifiable using the index; decode the index for data associated with the individually entropy codable parcels; identify the individually entropy codable parcels from the stream of encoded video data using the data from the index and a minimum value associated with the parallel entropy codable sequence of video data; and decode the individually entropy codable parcels from the stream of encoded video data in parallel using the data as decoded from the index.

Aspect 46. A method of decoding video data, the method comprising: obtaining a stream of encoded video data including an index and a parallel entropy codable sequence of video data, the parallel entropy codable sequence of video data including individually entropy codable parcels identifiable using the index; decoding the index for data associated with the individually entropy codable parcels; identifying the individually entropy codable parcels from the stream of encoded video data using the data from the index and a minimum value associated with the parallel entropy codable sequence of video data; and decoding the individually entropy codable parcels from the stream of encoded video data in parallel using the data as decoded from the index.

Aspect 47: A computer-readable storage medium storing instructions that, when executed, cause one or more processors to: obtain a stream of encoded video data including an index and a parallel entropy codable sequence of video data, the parallel entropy codable sequence of video data including individually entropy codable parcels identifiable using the index; decode the index for data associated with the individually entropy codable parcels; identify the individually entropy codable parcels from the stream of encoded video data using the data from the index and a minimum value associated with the parallel entropy codable sequence of video data; and decode the individually entropy codable parcels from the stream of encoded video data in parallel using the data as decoded from the index.

Aspect 48: An apparatus for decoding video data is provided, the apparatus comprising: means for obtaining a stream of encoded video data including an index and a parallel entropy codable sequence of video data, the parallel entropy codable sequence of video data including individually entropy codable parcels identifiable using the index; means for decoding the index for data associated with the individually entropy codable parcels; means for identifying the individually entropy codable parcels from the stream of encoded video data using the data from the index and a minimum value associated with the parallel entropy codable sequence of video data; and means for decoding the individually entropy codable parcels from the stream of encoded video data in parallel using the data as decoded from the index.

What is claimed is:

1. An apparatus for encoding video data, the apparatus comprising:
   at least one memory; and
   at least one processor coupled to the at least one memory, the at least one processor configured to:
      obtain a sequence of video data, the sequence comprising a plurality of data elements;
      determine a minimum value of the data elements in the sequence of video data;
      based on the minimum value, identify positions in the sequence of video data associated with entry points for individually entropy codable parcels of a parallel entropy codable sequence of video data, wherein, to identify the positions in the sequence of video data associated with the entry points, the at least one processor is configured to perform a bisection enumeration of the sequence of video data based on the minimum value;
      generate the parallel entropy codable sequence of video data; and
      generate an index for the parallel entropy codable sequence of video data, the index identifying the individually entropy codable parcels within the parallel entropy codable sequence of video data.

2. The apparatus of claim 1, wherein, to identify the positions in the sequence of video data associated with the entry points based on the minimum value, the at least one processor is configured to:
   constrain values for the positions in the sequence of video data associated with the entry points based on the minimum value.

3. The apparatus of claim 1, wherein the at least one processor is configured to generate the parallel entropy codable sequence of video data at least in part by performing a bisection search to encode information associated with the individually entropy codable parcels with data from the sequence of video data determined by the positions to generate the individually entropy codable parcels.

4. The apparatus of claim 3, wherein, to perform the bisection enumeration, the at least one processor is configured to:
   bisect the sequence of video data to identify an initial position of the positions, wherein the initial position is associated with a first entry point and subsequences divided by the initial position; and
   bisect tiers of subsequences to identify a remaining portion of the positions.

5. The apparatus of claim 3, wherein the individually entropy codable parcels include corresponding data from the sequence of video data determined by the positions, and the information associated with the individually entropy codable parcels.

6. The apparatus of claim 5, wherein the information associated with the individually entropy codable parcels includes information associated with a magnitude of a binary representation of the corresponding data from the sequence of video data.

7. The apparatus of claim 1, wherein a difference between a largest parcel and a smallest parcel of the individually entropy codable parcels is less than a threshold difference.

8. The apparatus of claim 1, wherein, to generate the parallel entropy codable sequence, the at least one processor is configured to:
   identify a number of parcels to define a set of individually entropy codable parcels from a first parcel to a last parcel having sizes between a minimum parcel size and a maximum parcel size as constrained by the minimum value, wherein parcel sizes of the number of parcels sums to a size of the parallel entropy codable sequence.

9. The apparatus of claim 8, wherein, to generate the parallel entropy codable sequence of video data, the at least one processor is configured to:
   initialize a stack in the at least one memory including a number of parcels and a magnitude of a binary representation of corresponding data for the number of parcels; and
   generate the parallel entropy codable sequence of video data at least in part by performing the following operations until the stack is empty:
      analyzing the stack to retrieve current interval sets;
      selecting a parcel by defining a new index for the parcel as a representative value of the current interval sets;
      using bisection to encode bits of the parcel based on the minimum value;
      updating the stack with sets from the first parcel to the parcel when the parcel is not the first parcel; and
      updating the stack with sets from the parcel to the last parcel when the parcel is not the last parcel.

10. The apparatus of claim 9, wherein the representative value of the current interval sets is an average of the current interval sets.

11. The apparatus of claim 9, wherein the at least one processor is configured to initialize the stack with a universal codeword set.

12. The apparatus of claim 9, wherein, to use bisection to encode the bits of the parcel based on the minimum value, the at least one processor is configured to:

initialize a first variable to the minimum parcel size as constrained by the minimum value, a second variable to the maximum parcel size as constrained by the minimum value, and a third variable to an average of the minimum parcel size and the maximum parcel size;

access a value for a magnitude of a binary representation of the parcel;

encode a first bit when the third variable is less than or equal to the value;

encode a second bit when the third variable is greater than the value; and update the third variable to a new average of the first variable and the second variable.

13. The apparatus of claim 1, wherein the at least one processor is configured to:

define parcels of the individually entropy codable parcels as forward parcels or backwards parcels;

wherein a corresponding parcel pair includes a corresponding forward parcel and a corresponding backwards parcel defined using a single shared entry point in the index.

14. The apparatus of claim 13, wherein the index includes N/2 entry points when a number of the individually entropy codable parcels is even, and the index includes [(N−1)/2]+1 entry points when the number of the individually entropy codable parcels is odd.

15. The apparatus of claim 13, wherein the at least one processor is configured to:

store the individually entropy codable parcels in the at least one memory structured as a file having a file structure including the index and a plurality of parts, each part including a plurality of blocks, each block including a plurality of sections, and each section including a forward parcel structure and a backward parcel structure for a corresponding forward parcel and the corresponding backwards parcel of the corresponding parcel pair.

16. The apparatus of claim 15, wherein the at least one processor is configured to output the file including the index and the individually entropy codable parcels for transmission.

17. The apparatus of claim 1, wherein the index identifies the individually entropy codable parcels using the entry points as identified following encoding of the sequence of video data in an encoded bitstream.

18. The apparatus of claim 1, wherein the index identifies the individually entropy codable parcels including identifying a bit length and a position of each parcel in an encoded video bitstream generated from the sequence of video data.

19. The apparatus of claim 1, further comprising a transmitter coupled to the at least one processor and configured to transmit the sequence of video data as entropy encoded using the index and the individually entropy codable parcels.

20. The apparatus of claim 1, further comprising a display coupled to the at least one processor and configured to display images of the sequence of video data.

21. An apparatus for decoding video data, the apparatus comprising:

at least one memory; and at least one processor coupled to the at least one memory, the at least one processor configured to:

obtain a stream of encoded video data representing data elements of a sequence of the video data, the stream including an index and a parallel entropy codable sequence of video data, the parallel entropy codable sequence of video data including individually entropy codable parcels identifiable using the index, the data elements of the sequence of the video data having a minimum value;

decode the index for data associated with the individually entropy codable parcels;

identify the individually entropy codable parcels from the stream of encoded video data using the data from the index and the minimum value of the data elements, wherein, to identify the positions in the sequence of video data associated with the entry points, the at least one processor is configured to perform a bisection enumeration of the sequence of video data based on the minimum value; and decode the individually entropy codable parcels from the stream of encoded video data in parallel using the data as decoded from the index.

22. The apparatus of claim 21, wherein a difference between a largest parcel and a smallest parcel of the individually entropy codable parcels is less than a threshold difference.

23. The apparatus of claim 21, wherein parcels of the individually entropy codable parcels are defined as forward parcels or backwards parcels, and wherein a corresponding parcel pair includes a corresponding forward parcel and a corresponding backwards parcel defined using a single shared entry point in the index.

24. The apparatus of claim 23, wherein the index includes N/2 entry points when a number of the individually entropy codable parcels is even, and the index includes [(N−1)/2]+1 entry points when the number of the individually entropy codable parcels is odd.

25. The apparatus of claim 21, wherein the at least one processor is configured to:

initialize a first variable to the minimum parcel size as constrained by the minimum value, a second variable to the maximum parcel size as constrained by the minimum value, and a third variable to an average of the minimum parcel size and the maximum parcel size;

decode a bit;

set a value of the first variable to a value of the third variable when the bit is equal to 1;

set a value of the second variable to the value of the third variable when the bit is equal to 0; and update the third variable to a new average of the first variable and the second variable.

26. The apparatus of claim 21, wherein the index identifies the individually entropy codable parcels using entry points for the individually entropy codable parcels.

27. The apparatus of claim 21, wherein the index identifies the individually entropy codable parcels including identifying a bit length and a position of each parcel in an encoded video bitstream generated from the sequence of video data.

28. A method of encoding video data, the method comprising:
- obtaining a sequence of video data;
- determining a minimum value of data elements in the sequence of video data;
- based on the minimum value, identifying positions in the sequence of video data associated with entry points for individually entropy codable parcels of a parallel entropy codable sequence of video data, wherein, to identify the positions in the sequence of video data associated with the entry points, performing a bisection enumeration of the sequence of video data based on the minimum value;
- generating the parallel entropy codable sequence of video data; and
- generating an index for the parallel entropy codable sequence of video data, the index identifying the individually entropy codable parcels within the parallel entropy codable sequence of video data.

29. A method of decoding video data, the method comprising:
- obtaining a stream of encoded video data representing data elements of a sequence of the video data, the stream including an index and a parallel entropy codable sequence of video data, the parallel entropy codable sequence of video data including individually entropy codable parcels identifiable using the index, the data elements of the sequence of the video data having a minimum value;
- decoding the index for data associated with the individually entropy codable parcels;
- identifying the individually entropy codable parcels from the stream of encoded video data using the data from the index and a the minimum value of the data elements, wherein, to identify the positions in the sequence of video data associated with the entry points, performing a bisection enumeration of the sequence of video data based on the minimum value; and
- decoding the individually entropy codable parcels from the stream of encoded video data in parallel using the data as decoded from the index.

\* \* \* \* \*